(12) United States Patent
Xiong

(10) Patent No.: US 12,317,138 B2
(45) Date of Patent: May 27, 2025

(54) METHOD FOR IMPLEMENTING MULTICAST BROADCAST SERVICE HANDOVER AND RELATED DEVICES

(71) Applicant: TENCENT TECHNOLOGY (SHENZHEN) COMPANY LIMITED, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 274 days.

(21) Appl. No.: 17/989,423

(22) Filed: Nov. 17, 2022

(65) Prior Publication Data
US 2023/0082364 A1   Mar. 16, 2023

Related U.S. Application Data

(63) Continuation of application No. PCT/CN2022/075643, filed on Feb. 9, 2022.

(30) Foreign Application Priority Data

Feb. 10, 2021 (CN) .......................... 202110184907.8

(51) Int. Cl.
*H04W 36/00* (2009.01)
*H04W 36/26* (2009.01)

(52) U.S. Cl.
CPC ... *H04W 36/0007* (2018.08); *H04W 36/0016* (2013.01); *H04W 36/0033* (2013.01); *H04W 36/26* (2013.01)

(58) Field of Classification Search
CPC ......... H04W 36/0007; H04W 36/0016; H04W 36/0033; H04W 36/26; H04W 4/06; H04W 36/0011; H04W 36/08
See application file for complete search history.

(56) References Cited

U.S. PATENT DOCUMENTS

2020/0092923 A1   3/2020 Abraham et al.
2020/0344576 A1  10/2020 Li et al.
(Continued)

FOREIGN PATENT DOCUMENTS

CN   111556540 A   8/2020
CN   112243199 A   1/2021
(Continued)

OTHER PUBLICATIONS

3GPP TR 23.757 V1.2.0, "3rd Generation Partnership Project; Technical Specification Group Services and System Aspects; Study on architectural enhancements for 5G multicast-broadcast services (Release 17)" (Year: 2020).*
(Continued)

*Primary Examiner* — Sun Jong Kim
(74) *Attorney, Agent, or Firm* — ANOVA LAW GROUP PLLC

(57) ABSTRACT

A method for implementing multicast broadcast service handover includes: acquiring a protocol data unit (PDU) session associated with a multicast broadcast service (MBS) session, single network slice selection assistance information (S-NSSAI) of the PDU session being the same as S-NSSAI of the MBS session, a data network name (DNN) of the PDU session being the same as a DNN of the MBS session; acquiring an MBS session identity of the MBS session; acquiring policy rule information corresponding to the activated MBS session from a policy control function (PCF) according to the MBS session identity, one or more pieces of policy rule information being provided; and establishing a quality of service flow corresponding to the activated MBS session on the PDU session according to the policy rule information corresponding to the activated MBS session, one or more quality of service flows being provided.

20 Claims, 15 Drawing Sheets

(56) References Cited

U.S. PATENT DOCUMENTS

2023/0050709 A1  2/2023  Lei
2023/0319649 A1* 10/2023 Zhu .................. H04W 36/0016
                                                   370/312
2023/0345310 A1* 10/2023 Li ......................... H04W 76/40

FOREIGN PATENT DOCUMENTS

CN      112954613 A    6/2021
WO     2019136128 A1   7/2019

OTHER PUBLICATIONS

China National Intellectual Property Administration (CNIPA) Office Action 1 for 202110184907.8 Jan. 18, 2023 30 Pages (including translation).

Huawei et al."140 3GPP TSG-WG SA2 Meeting #141 e-meeting»", "« 52-2006299, KL1: Update of sol. 3: resolving open issue(s)»", Sep. 1, 2020 (Sep. 1, 2020).

Huawei et al."«3GPP TSG-SA2 Meeting #128»", "«52-186583 , solution for K12: Default GBR QoS Flow»", Jul. 6, 2018 (Jul. 6, 2018).

ZTE"«5A WG2 Meeting #S2-141E»", "«152-2007515" KI#I, discussion and interim conclusion on the several aspect of key issue #1."»", Oct. 23, 2020 (Oct. 23, 2020).

Qualcomm Inc" « 3GPP TSG-RAN WG2 Meeting #113e»", "«R2-2100414,NR Multicast Broadcastl mobility enhancements with service continuity» ", Jan. 15, 2021 (Jan. 15, 2021).

The World Intellectual Property Organization (WIPO) International Search Report for PCT/CN2022/075643 May 7, 2022 6 Pages (including translation).

CATT ., "KI #1, New Sol: MBS session joining via PDU session establishment and modification procedures", Jun. 1-12, 2020, SA WG2 Meeting #S2-139E, Elbonia.

Ericsson ., "On support of mobility between MBS supporting and non-MBS supporting gNBs", Jan. 25, 2021, 3GPP TSG-RAN WG3 Meeting #111-e.

* cited by examiner

METHOD FOR IMPLEMENTING MULTICAST BROADCAST SERVICE HANDOVER AND RELATED DEVICES

RELATED APPLICATION(S)

This application is a continuation application of PCT Patent Application PCT/CN2022/075643 filed on Feb. 9, 2022, which claims priority to Chinese Patent Application No. 202110184907.8, entitled "METHOD FOR IMPLEMENTING MULTICAST BROADCAST SERVICE HANDOVER AND RELATED DEVICES" and filed with the National Intellectual Property Administration, PRC on Feb. 10, 2021, all of which are incorporated herein by reference in entirety.

FIELD OF THE TECHNOLOGY

The present disclosure relates to the field of communication processing technologies, and in particular, to a method for implementing multicast broadcast service handover, a session management function device, a policy control function device, and a computer-readable storage medium.

BACKGROUND

Unicast is one-to-one communication. A unicast source transfers pieces of different content to different user equipments (UE) through a router. For example, and shown in FIG. 1, five pieces of different content are respectively transferred to UE 1, UE 2, UE 3, UE 4, and UE 5. The unicast communication provides that different content can be transferred to different users.

Multicast refers to the transfer of the same content to authorized user equipments. For example, a multicast source in FIG. 1 simultaneously transfers the same content to authorized UE 6, UE 7, and UE 8. Multicast is particularly suitable for online video conferencing, online video-on-demand, and other application scenarios. Multicast can both deliver data to all target nodes at once and deliver data to only specific objects (authorized UEs).

Broadcast is also the transfer of the same content to a plurality of user equipments. However, there is no selection of user equipment in broadcast.

In the $5^{th}$ generation mobile telecommunication technology (5G, $5^{th}$ generation mobile networks or $5^{th}$ generation wireless systems) multicast broadcast service (MBS), only some base stations may support an MBS (for example, an MBS multicast service and/or an MBS broadcast service) and some may not. When UE moves from one 5G base station (hereinafter referred to as a source base station or a source radio access network (RAN)) or cell supporting an MBS service to a 5G base station (hereinafter referred to as a target base station or a target RAN) or cell not supporting an MBS service, the UE may switch to a unicast transmission mode when or in response to a determination that the UE has joined the MBS service beforehand, and continue to transmit data corresponding to the MBS service in this unicast transmission mode after MBS service transmission is activated, thereby implementing the continuity of the MBS service.

Before the handover of the UE, an MBS Session (short for a multicast session or a broadcast session, which may also be referred to as a multicast broadcast service session, hereinafter referred to as an MBS session, and may include, for example, an MBS multicast session and/or an MBS broadcast session) may be associated with one protocol data unit (PDU) session (hereinafter referred to as a PDU Session), the PDU Session is switched to a target cell or a target RAN, and service data corresponding to the MBS Session is transmitted through the PDU session.

SUMMARY

Embodiments of the present disclosure provide a method for implementing multicast broadcast service handover, a session management function device, a policy control function device, and a computer-readable storage medium, so that the continuity of an MBS service can be implemented in a handover procedure of user equipment from a source base station supporting an MBS to a target base station not supporting an MBS.

In one aspect, the present disclosure provides a method for implementing multicast broadcast service handover. The method is applied to an SMF corresponding to user equipment. A source base station to which the user equipment is connected before handover supports an MBS. The user equipment has established an MBS session (short for a multicast session or a broadcast session, which may also be referred to as a multicast broadcast service session) with the source base station before the handover. A target base station to which the user equipment is connected after the handover does not supporting an MBS. The method includes: acquiring a protocol data unit (PDU) session associated with the MBS session, single network slice selection assistance information (S-NSSAI) of the PDU session being the same as S-NSSAI of the MBS session, a data network name (DNN) of the PDU session being the same as a DNN of the MBS session; acquiring an MBS session identity of the MBS session; acquiring policy rule information corresponding to the activated MBS session from a PCF according to the MBS session identity, one or more pieces of policy rule information being provided; and establishing a quality of service flow corresponding to the activated MBS session on the PDU session according to the policy rule information corresponding to the activated MBS session, one or more quality of service flows being provided.

In another aspect, the present disclosure provides a session management function device, including: one or more processors; and a storage apparatus, configured to store one or more programs, the one or more programs, when executed by the one or more processors, causing the one or more processors to implement the method in the embodiments.

In yet another aspect, the present disclosure provides a method for implementing multicast broadcast service handover, applied to a PCF corresponding to user equipment, a source base station to which the user equipment is connected before handover supporting an MBS, the user equipment having established an MBS session with the source base station before the handover, a target base station to which the user equipment is connected after the handover not supporting an MBS. The method includes: after the user equipment is handed over from the source base station to the target base station, transferring policy rule information corresponding to the activated MBS session to an SMF, one or more pieces of policy rule information being provided, so that the SMF establishes a quality of service flow corresponding to the activated MBS session on a PDU session associated with the MBS session according to the policy rule information corresponding to the activated MBS session, one or more quality of service flows being provided. S-NSSAI of the PDU session is the same as S-NSSAI of the MBS session, and a DNN of the PDU session is the same as a DNN of the MBS session.

In yet another aspect, the present disclosure provides a computer-readable storage medium, storing a computer program, the computer program, when executed by a processor, implementing the method in the embodiments.

In the technical solutions provided in some embodiments of the present disclosure, in one aspect, after UE is handed over from a source base station supporting an MBS service to a target base station not supporting an MBS service, when or in response to a determination that the source base station supports the MBS and the target base station does not support the MBS, the SMF may directly acquire policy rule information of an activated MBS session through a PCF, so that a quality of service (QoS) flow corresponding to the activated MBS session may be established on a PDU session associated with the MBS session, thereby simplifying a procedure of acquiring the policy rule information of the activated MBS session. In another aspect, this mode has minimal modification to a 5G system and implements switching of UE from an MBS session to a unicast PDU session during handover of the UE between a source base station supporting an MBS service and a target base station not supporting an MBS service, thereby implementing the continuity of an MBS service.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

Figure 1:
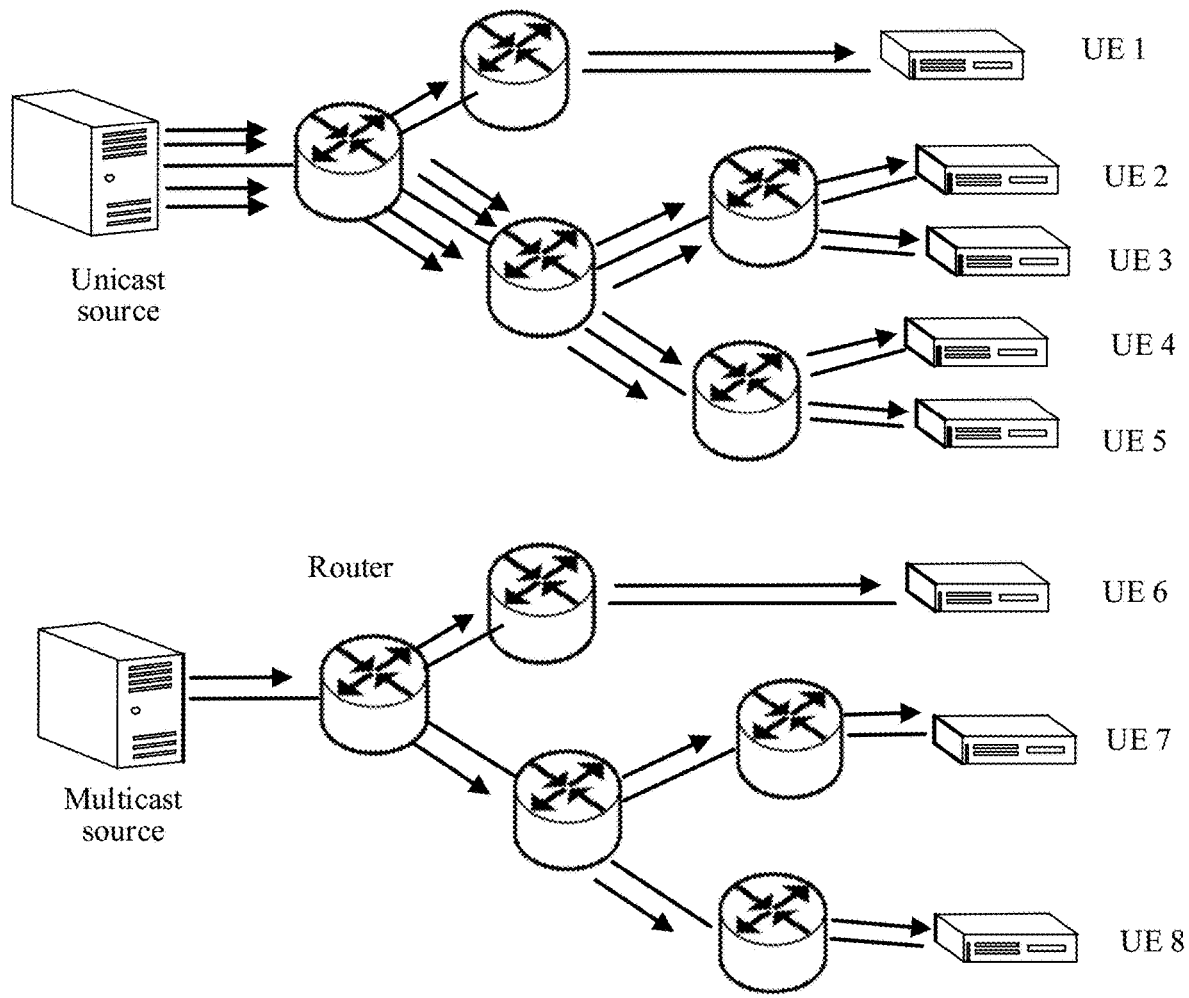
FIG. 1 is a schematic diagram of comparison between IP transmission of unicast and IP transmission of multicast.
Figure 2:
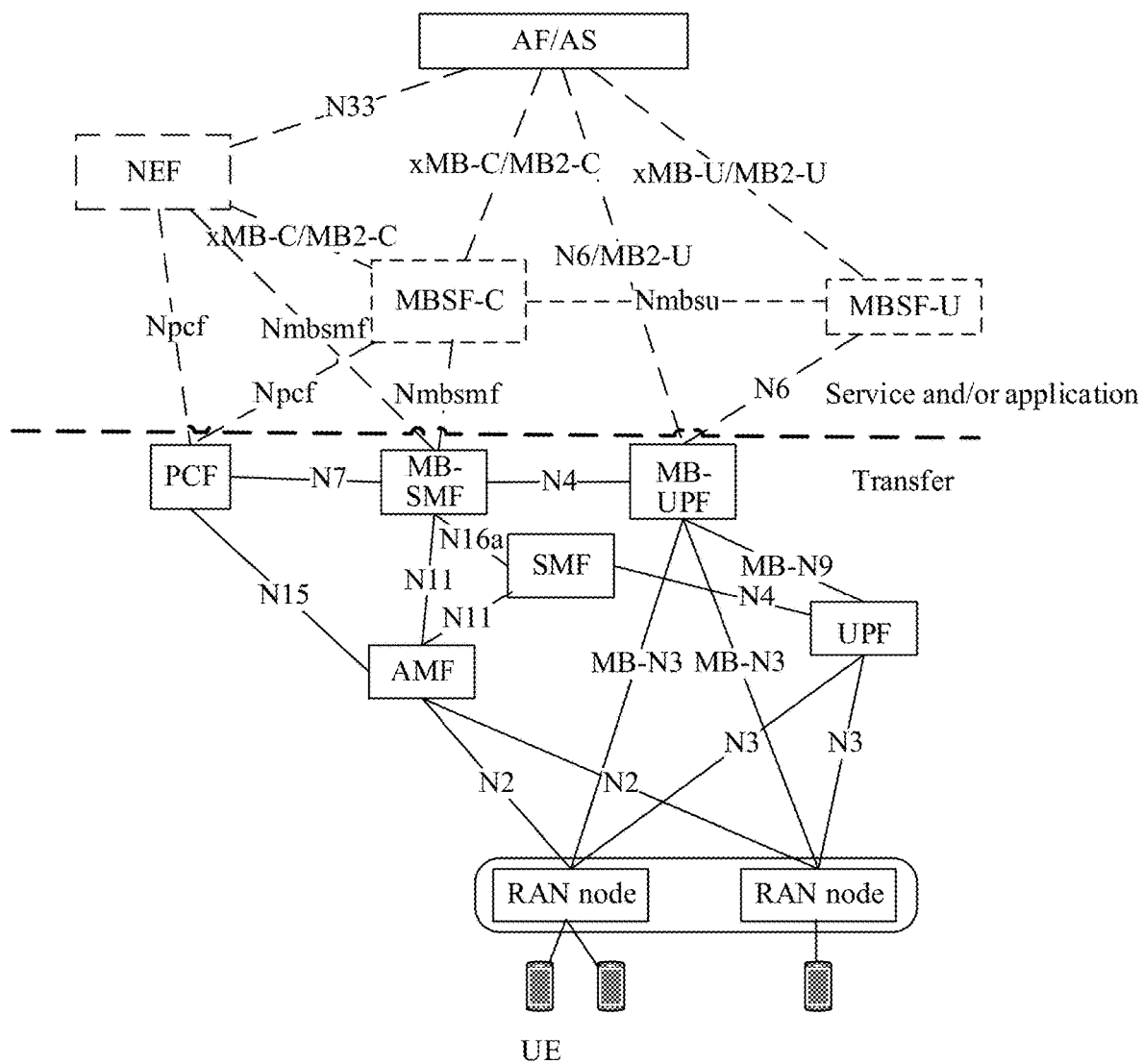
FIG. 2 is a schematic diagram of an architecture of a 5G MBS.

The architecture of a 5G MBS is shown in FIG. 2. As shown in FIG. 2, a user plane function (UPF) interacts with a session management function (SMF) through an N4 interface, receives MBS service data from a multicast broadcast user plane function (MB-UPF) through an MB-N9 (Multicast Broadcast-N9, multicast broadcast-N9) interface, and may further transmit MBS service data to a 5G radio access network (an NG-RAN, a RAN node in FIG. 2) through an N3 interface. The UPF and the MB-UPF may be logically independent, or may share the same UPF entity. The SMF may select a multicast broadcast-session management function (MB-SMF) for an MBS session, and may interact with the MB-SMF to obtain information related to the MBS session. The SMF and the MB-SMF are logically independent or may share the same entity. A unified data repository (UDR) or a network function (NF) repository function (NRF) supports the discovery of an MB-SMF for an MBS session and stores the identity (ID) of a selected MB-SMF (that is, an MB-SMF ID).

A multicast broadcast service function (MBSF) may include an MBSF user plane function (MBSF-U) and an MBSF control plane function (MBSF-C). The MBSF-C/U is not indispensable unless in the following two conditions. In the first condition, when services of a 5G MBS and a 4G or 3G multimedia broadcast/multicast service (MBMS) are interconnected, that is, when a 5G application function (AF) and a 4G or 3G MBMS application server (AS) are the same entity, see FIG. 2. Alternatively, in the second condition, when an operator may perform media processing (for example, processing such as transcoding of a video or check of content) of an MBS service.

The SMF and the UPF may participate in a process of a 5G MBS session, of which the related description is provided in the following embodiments.

In FIG. 2, NEF stands for a network exposure function. PCF stands for a policy control function, and Npcf refers to an Npcf message for acquiring a service provided by the PCF. AMF stands for an access and mobility management function.

Figure 3:
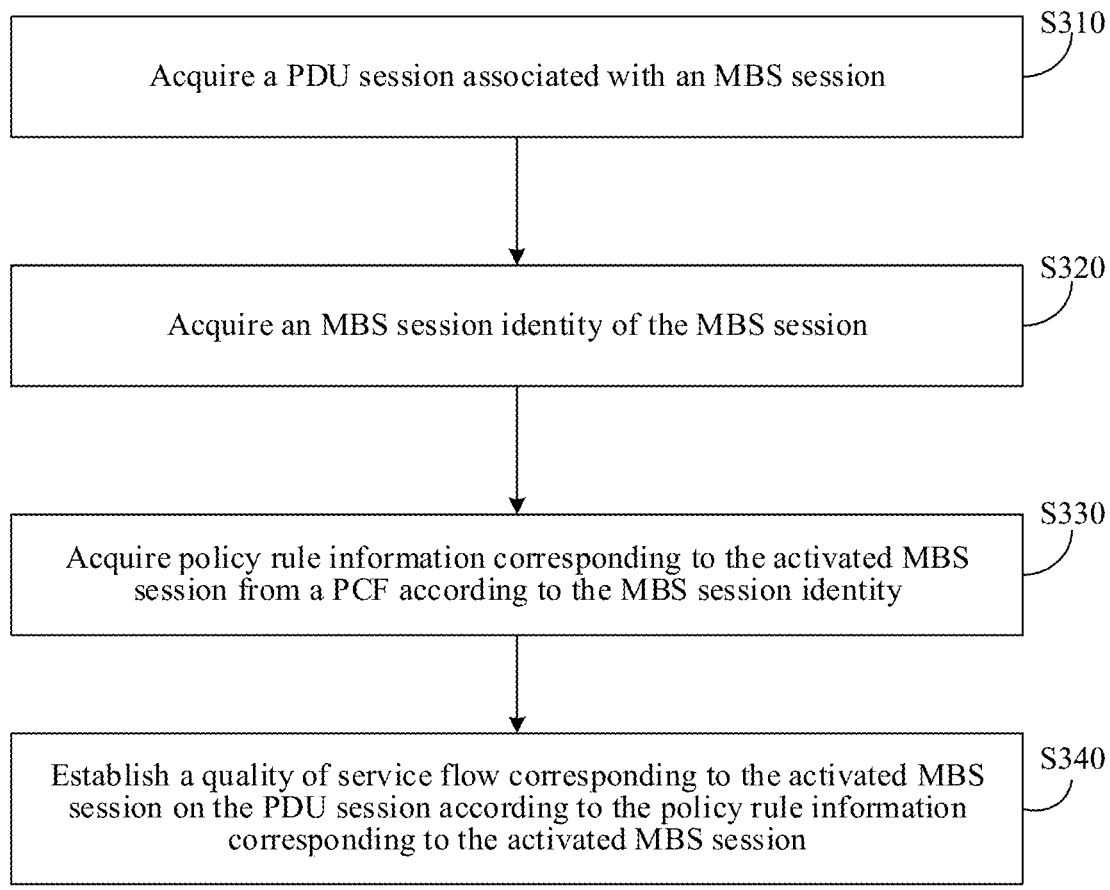
FIG. 3 is a schematic flowchart of a method for implementing multicast broadcast service handover according to certain embodiment(s) of the present disclosure.

FIG. 3 is a schematic flowchart of a method for implementing multicast broadcast service handover according to an embodiment of the present disclosure. The method provided in the embodiments in FIG. 3 may be applied to an SMF corresponding to user equipment (UE). A source base station to which the user equipment is connected before handover supports an MBS. The user equipment has established an MBS session with the source base station before the handover. A target base station to which the user equipment is connected after the handover does not support an MBS.

In the embodiments of the present disclosure, the MBS session may include an MBS multicast session and/or an MBS broadcast session.

In the embodiments of the present disclosure, a base station to which the UE is connected before handover is referred to as a source base station, and a base station to which the UE is connected after the handover is referred to as a target base station. In the following exemplary description, an example in which the source base station and the target base station are both NG-RANs in a 5G system and are respectively referred to as a source NG-RAN (or an S-NG-RAN) and a target NG-RAN (or a T-NG-RAN) is used for exemplary description. However, the present disclosure is not limited thereto.

The solution provided in the embodiments of the present disclosure is both applicable to an MBS multicast session and applicable to an MBS broadcast session. In the following exemplary description, when or in response to a determination that an MBS multicast session is used as an example for exemplary description, the description may be extended to MBS broadcast sessions for adaptive modification of corresponding parameters and messages.

As shown in FIG. 3, the method provided in the embodiments of the present disclosure may include the following steps:

Step 310: Acquire a PDU session associated with the MBS session, S-NSSAI of the PDU session being the same as S-NSSAI of the MBS session, a DNN of the PDU session being the same as a DNN of the MBS session.

In the embodiments of the present disclosure, a PDU session associated with an MBS session may be established on both the side of a source base station and the side of a target base station. This is not limited in the present disclosure. In the following exemplary description, an example in which the PDU session associated with the MBS session is established on the side of the target base station after the handover is used.

The PDU Session established on the side of the target base station side/the side of the source base station is used to replace an MBS session such as an MBS multicast/broadcast session on the source base station. Therefore, a combination of S-NSSAI and a DNN of the PDU Session is the same as a combination of S-NSSAI and a DNN of the original MBS Multicast/Broadcast Session. In this way, the continuity of an MBS service can be kept.

In the embodiments of the present disclosure, when or in response to a determination that the user equipment has established a plurality of MBS sessions with the source base station before the handover, a corresponding PDU session is respectively associated for each MBS session. S-NSSAI of each MBS session is the same as S-NSSAI of the PDU session corresponding to the MBS session, and a DNN of each MBS session is the same as a DNN of the PDU session corresponding to the MBS session.

Step S320: Acquire an MBS session identity of the MBS session.

Step S330: Acquire policy rule information (which may be all policy rule information corresponding to the activated MBS session) corresponding to the activated MBS session from a PCF according to the MBS session identity, one or more pieces of policy rule information being provided.

In the embodiments of the present disclosure, each MBS session may be activated before handover or may be activate after handover. This is not limited in the present disclosure. An action that UE explicitly intends to join an MBS but no service data transfer has been started is defined as "register", "join" or "establish". An action that the UE has joined the MBS and the transfer of MBS service data has been initiated is defined as "activated" or "service initiated". That is, an MBS session is "activated" only when a QoS Flow has been established. An MBS session is only established when no QoS Flow has been established and there is no MB-UPF.

In an exemplary embodiment, the PCF may include a multicast broadcast-policy control function (MB-PCF). The user equipment may have activated the MBS session at the source base station and have not established a PDU session associated with the MBS session before the handover. The acquiring policy rule information corresponding to the activated MBS session from a PCF according to the MBS session identity may include: in a procedure of establishing the PDU session on a side of the target base station after the handover, transmitting a first session management policy control obtaining request message to the MB-PCF, the first session management policy control obtaining request message carrying the MBS session identity and a data set identity indicating policy data; and receiving a first session management policy control obtaining response message returned by the MB-PCF in response to the first session management policy control obtaining request message, the first session management policy control obtaining response message including the policy rule information corresponding to the activated MBS session.

In an exemplary embodiment, the first session management policy control obtaining request message may include a first session management policy control create request message, and the first session management policy control obtaining response message may include a first session management policy control create response message; or the first session management policy control obtaining request message may include a first session management policy control get request message, and the first session management policy control obtaining response message may include a first session management policy control get response message; or the first session management policy control obtaining request message may include a first multicast broadcast session management policy control get request message, and the first session management policy control obtaining response message may include a first multicast broadcast session management policy control get response message.

When or in response to a determination that the user equipment has activated the MBS session at the source base station before the handover, the SMF acquires the policy rule information corresponding to the activated MBS session by using the MB-PCF, and the PDU session associated with the MBS session has not been established, a procedure of establishing a PDU session on the side of the target base station after the handover, reference may be made to FIG. 6 below for details.

In an exemplary embodiment, the PCF may include an MB-PCF. The user equipment has not activated the MBS session at the source base station and has not established a PDU session associated with the MBS session before the handover. Before the acquiring policy rule information corresponding to the activated MBS session from a PCF according to the MBS session identity, the method may further include: in a procedure of establishing the PDU session on a side of the target base station after the handover, transmitting a second session management policy control obtaining request message to the MB-PCF, the second session management policy control obtaining request message carrying the MBS session identity and a data set identity indicating policy data; receiving a second session management policy control obtaining response message returned by the MB-PCF in response to the second session management policy control obtaining request message, the second session management policy control obtaining response message not including the policy rule information corresponding to the activated MBS session; and determining, according to the second session management policy control obtaining response message, that the MBS session has not been activated.

In an exemplary embodiment, the second session management policy control obtaining request message may include a second session management policy control create request message, and the second session management policy control obtaining response message may include a second session management policy control create response message; or the second session management policy control obtaining request message may include a second session management policy control get request message, and the second session management policy control obtaining response message may include a second session management policy control get response message; or the second session management policy control obtaining request message may include a second multicast broadcast session management policy control get request message, and the second session management policy control obtaining response message may include a second multicast broadcast session management policy control get response message.

When or in response to a determination that the user equipment has not activated the MBS session at the source base station before the handover, the SMF acquires the policy rule information corresponding to the activated MBS session by using the MB-PCF, and the PDU session associated with the MBS session has not been established, a procedure of establishing a PDU session on the side of the target base station after the handover, reference may be made to FIG. 6 below.

In an exemplary embodiment, the acquiring policy rule information corresponding to the activated MBS session from a PCF according to the MBS session identity may include: after the MBS session is activated, triggering a modification procedure of the PDU session; in the modification procedure of the PDU session, receiving a first session management policy control update notification request message from the MB-PCF, the first session management policy control update notification request message including the policy rule information corresponding to the activated MBS session; and returning a first session management policy control update notification response message to the MB-PCF in response to the first session management policy control update notification request message.

In an exemplary embodiment, the acquiring policy rule information corresponding to the activated MBS session from a PCF according to the MBS session identity may include: after the MBS session is activated, triggering a modification procedure of the PDU session; in the modification procedure of the PDU session, receiving a first multicast broadcast session management policy control update notification request message from the MB-PCF, the first multicast broadcast session management policy control update notification request message including the policy rule information corresponding to the activated MBS session; and returning a first multicast broadcast session management policy control update notification response message to the MB-PCF in response to the first multicast broadcast session management policy control update notification request message.

Figure 7:
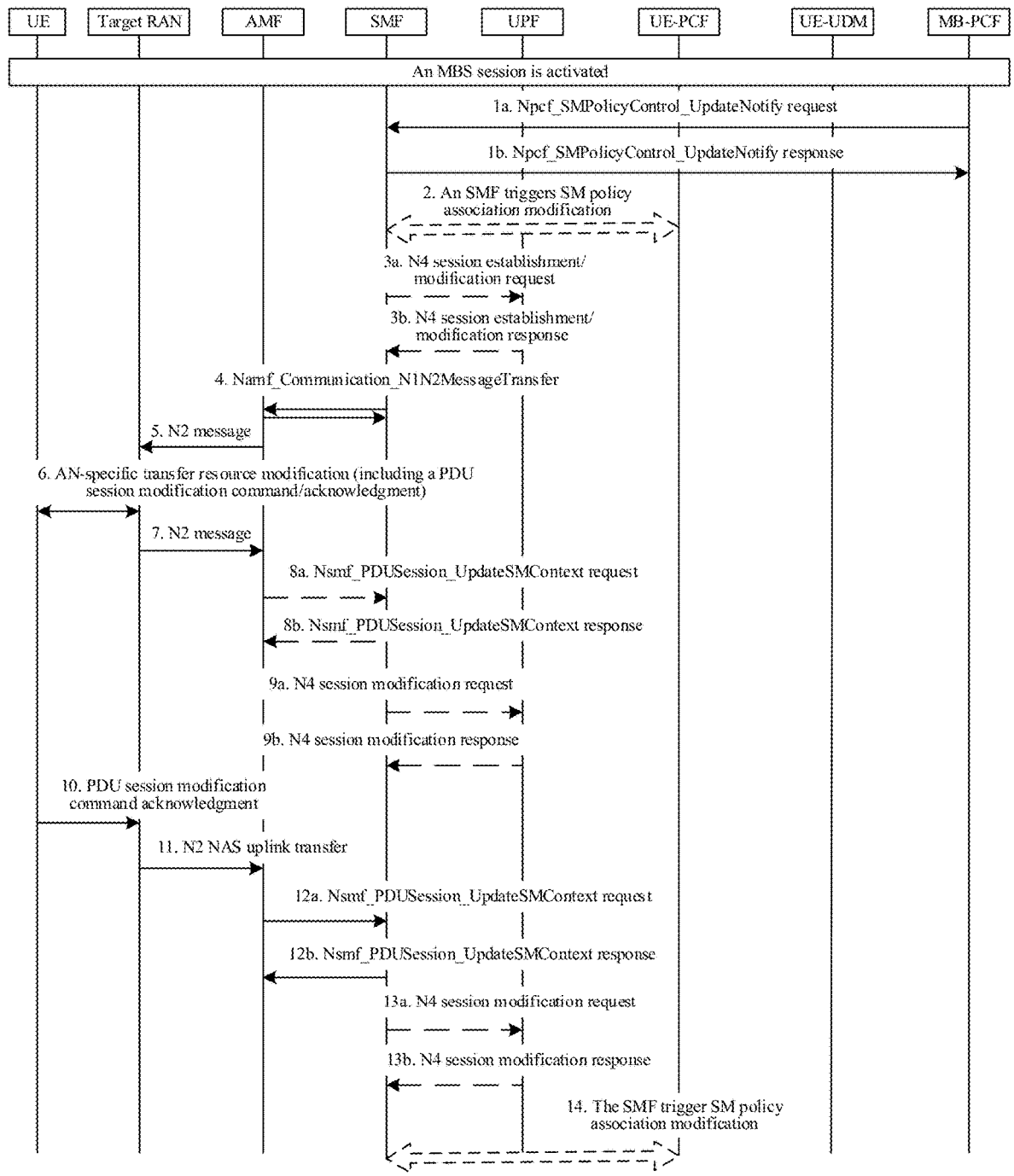
FIG. 7 is a schematic diagram of a process of triggering modification of a PDU session on a side of a target NG-RAN according to certain embodiment(s) of the present disclosure.

When or in response to a determination that the user equipment has not activated the MBS session at the source base station before the handover, the SMF acquires the policy rule information corresponding to the activated MBS session by using the MB-PCF, and the PDU session associated with the MBS session has not been established, a PDU session is established on the side of the target base station after the handover, and for a modification procedure of the PDU session, reference may be made to FIG. 7 below for details.

In an exemplary embodiment, before the acquiring policy rule information corresponding to the activated MBS session from a PCF according to the MBS session identity, the method may further include: transmitting a first NF discovery request message to an NRF, the first NF discovery request message carrying the MBS session identity and a network type indicating an MBS UDM; receiving a first NF discovery request response message returned by the NRF in response to the first NF discovery request message, the first NF discovery request response message carrying an MB-UDM identity; transmitting an MBS session context get request message to an MB-UDM according to the MB-UDM identity, the MBS session context get request message carrying the MBS session identity; and receiving an MBS session context get response message returned by the MB-UDM in response to the MBS session context get request message, the MBS session context get response message carrying an MB-PCF identity of the MB-PCF. For a discovery procedure of an MB-PCF by an SMF, reference may be made to FIG. 8 below for details.

In an exemplary embodiment, before the acquiring policy rule information corresponding to the activated MBS session from a PCF according to the MBS session identity, the method may further include: transmitting a second NF discovery request message to an NRF, the second NF discovery request message carrying the MBS session identity and a network type indicating an MBS PCF; and receiving a second NF discovery request response message returned by the NRF in response to the second NF discovery request message, the second NF discovery request response message carrying an MB-PCF identity of the MB-PCF. For another discovery procedure of an MB-PCF by an SMF, reference may be made to FIG. 9 below for details.

In an exemplary embodiment, the PCF may include a UE-PCF. The user equipment has activated the MBS session at the source base station and has not established a PDU session associated with the MBS session before the handover. The acquiring policy rule information corresponding to the activated MBS session from a PCF according to the MBS session identity may include: in a procedure of establishing the PDU session on a side of the target base station after the handover, transmitting a third session management policy control obtaining request message to the UE-PCF, the third session management policy control obtaining request message carrying the MBS session identity and a data set identity indicating policy data, so that the UE-PCF acquires the policy rule information corresponding to the activated MBS session from an MB-UDR according to the MBS session identity and the data set identity indicating policy data; and receiving a third session management policy control obtaining response message returned by the UE-PCF in response to the third session management policy control obtaining request message, the third session management policy control obtaining response message carrying the policy rule information corresponding to the activated MBS session.

In an exemplary embodiment, the third session management policy control obtaining request message may include a third session management policy control create request message, and the third session management policy control obtaining response message may include a third session management policy control create response message; or the third session management policy control obtaining request message may include a third session management policy control get request message, and the third session management policy control obtaining response message may include a third session management policy control get response message; or the third session management policy control obtaining request message may include a third multicast broadcast session management policy control get request message, and the third session management policy control obtaining response message may include a third multicast broadcast session management policy control get response message.

When or in response to a determination that the user equipment has activated the MBS session at the source base station before the handover, the SMF acquires the policy rule information corresponding to the activated MBS session by using the UE-PCF, and the PDU session associated with the MBS session has not been established, a procedure of establishing a PDU session on the side of the target base station after the handover, reference may be made to FIG. 10 below for details.

In an exemplary embodiment, the PCF may include a UE-PCF. The user equipment has not activated the MBS session at the source base station and has not established a PDU session associated with the MBS session before the handover. Before the acquiring policy rule information corresponding to the activated MBS session from a PCF according to the MBS session identity, the method may further include: in a procedure of establishing the PDU session on a side of the target base station after the handover, transmitting a fourth session management policy control obtaining request message to the UE-PCF, the fourth session management policy control obtaining request message carrying the MBS session identity and a data set identity indicating policy data; receiving a fourth session management policy control obtaining response message returned by the UE-PCF in response to the fourth session management policy control obtaining request message, the fourth session management policy control obtaining response message not carrying the policy rule information corresponding to the activated MBS session; and determining, according to the fourth session management policy control obtaining response message, that the MBS session has not been activated.

In an exemplary embodiment, the fourth session management policy control obtaining request message may include a fourth session management policy control create request message, and the fourth session management policy control obtaining response message may include a fourth session management policy control create response message; or the fourth session management policy control obtaining request message may include a fourth session management policy control get request message, and the fourth session management policy control obtaining response message may include a fourth session management policy control get response message; or the fourth session management policy control obtaining request message may include a fourth multicast broadcast session management policy control get request message, and the fourth session management policy control obtaining response message may include a fourth multicast broadcast session management policy control get response message.

When or in response to a determination that the user equipment has not activated the MBS session at the source base station before the handover, the SMF acquires the policy rule information corresponding to the activated MBS session by using the UE-PCF, and the PDU session associated with the MBS session has not been established, a procedure of establishing a PDU session on the side of the target base station after the handover, reference may be made to FIG. 10 below.

In an exemplary embodiment, the acquiring policy rule information corresponding to the activated MBS session from a PCF according to the MBS session identity may include: after the MBS session is activated, triggering a modification procedure of the PDU session; in the modification procedure of the PDU session, receiving a second session management policy control update notification request message from the UE-PCF, the second session management policy control update notification request message including the policy rule information corresponding to the activated MBS session, the policy rule information corresponding to the activated MBS session being obtained by the UE-PCF from an MB-UDR; and returning a second session management policy control update notification response message to the UE-PCF in response to the second session management policy control update notification request message.

In an exemplary embodiment, the acquiring policy rule information corresponding to the activated MBS session from a PCF according to the MBS session identity may include: after the MBS session is activated, triggering a modification procedure of the PDU session; in the modification procedure of the PDU session, receiving a second multicast broadcast session management policy control update notification request message from the UE-PCF, the second multicast broadcast session management policy control update notification request message including the policy rule information corresponding to the activated MBS session, the policy rule information corresponding to the activated MBS session being obtained by the UE-PCF from an MB-UDR; and returning a second multicast broadcast session management policy control update notification response message to the UE-PCF in response to the second multicast broadcast session management policy control update notification request message.

Figure 15:
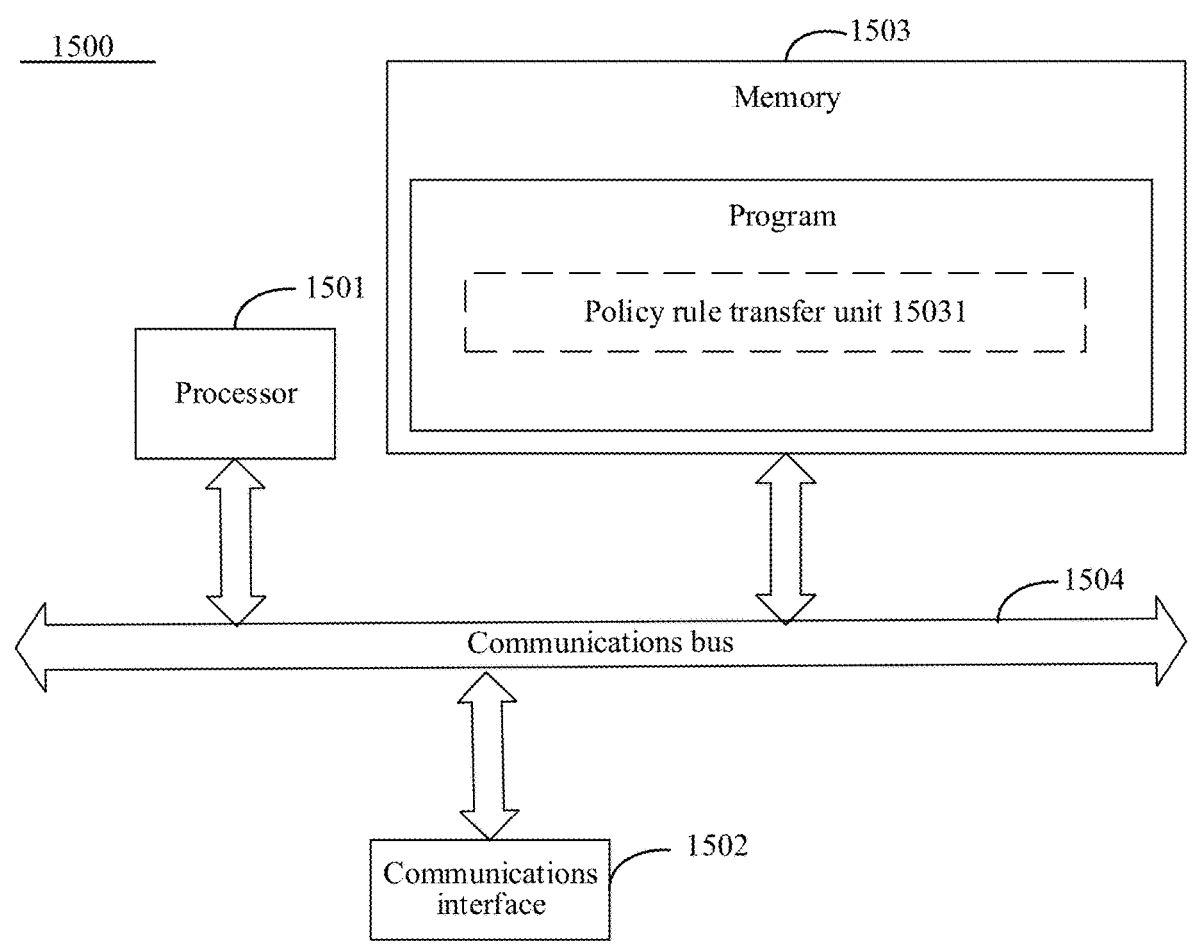
FIG. 15 is a schematic block diagram of a policy control function device according to certain embodiment(s) of the present disclosure.

When or in response to a determination that the user equipment has not activated the MBS session at the source base station before the handover, the SMF acquires the policy rule information corresponding to the activated MBS session by using the UE-PCF, and the PDU session associated with the MBS session has not been established, a PDU session is established on the side of the target base station after the handover, and for a modification procedure of the PDU session, reference may be made to FIG. 15 below for details.

Step S340: Establish a quality of service flow corresponding to the activated MBS session on the PDU session according to the policy rule information corresponding to the activated MBS session, one or more quality of service flows being provided.

In the method for implementing multicast broadcast service handover provided in the embodiments of the present disclosure, in one aspect, after UE is handed over from a source base station supporting an MBS service to a target base station not supporting an MBS service, when or in response to a determination that the source base station supports the MBS and the target base station does not support the MBS, the SMF may directly acquire policy rule information of an activated MB S session through a PCF, so that a quality of service (QoS, which may be all quality of service flows corresponding to the activated MBS session) flow corresponding to the activated MBS session may be established on a PDU session associated with the MBS session, thereby simplifying a procedure of acquiring the policy rule information of the activated MBS session. In another aspect, this mode has minimal modification to a 5G system and implements switching of UE from an MBS session to a unicast PDU session during handover of the UE between a source base station supporting an MBS service and a target base station not supporting an MBS service, thereby implementing the continuity of an MBS service.

Figure 4:
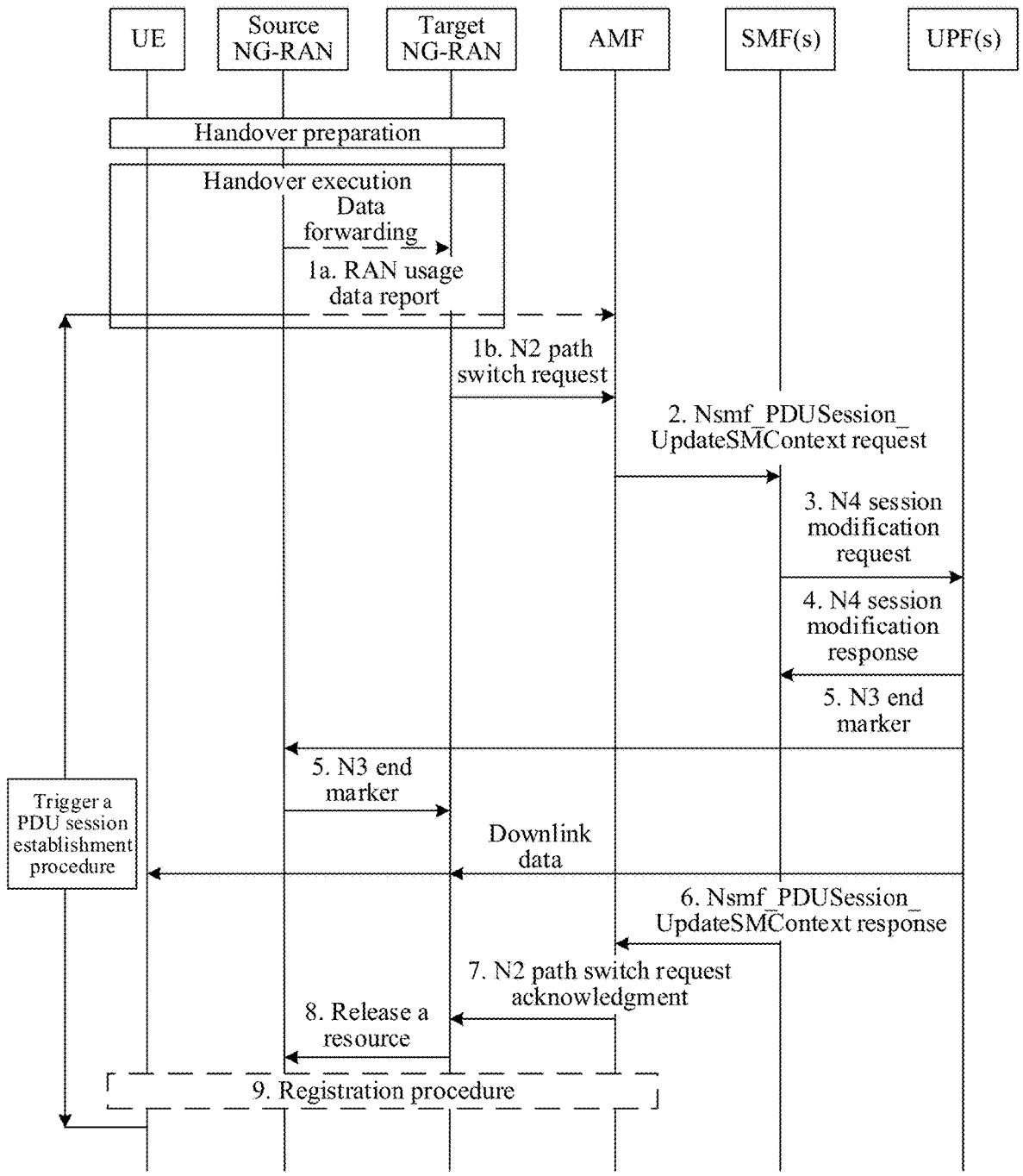
FIG. 4 is a schematic diagram of Xn based inter NG-RAN handover without UPF re-allocation according to certain embodiment(s) of the present disclosure.

For a handover procedure of UE inside the 3$^{rd}$ Generation Partnership Project (3GPP), there are a plurality of handover scenarios. In the embodiments of the present disclosure, two scenarios are listed in FIG. 4 and FIG. 5. However, the method provided in the embodiments of the present disclosure is not limited to the following two scenarios. For example, the method is also applicable to a scenario in which "Xn based inter NG-RAN handover with insertion of intermediate UPF" and "Xn based inter NG-RAN handover with intermediate UPF re-allocation". In the method provided in the embodiments of the present disclosure, a PDU session establishment procedure is added before or after a registration procedure (for example, step 9 in FIG. 4 or step 12 in FIG. 5, or even as shown in FIG. 4, there may be no registration procedure, that is, the registration procedure is optional).

A 5G radio access network includes two nodes: a gNB and an ng-eNB. An Xn interface is used between gNBs, between a ng-eNB and an ng-eNB, and between an ng-eNB and a gNB. The Xn interface is a network interface between NG-RAN nodes.

In the embodiments of the present disclosure, when or in response to a determination that before UE is handed over to a target NG-RAN, an MBS session has been established on a side of a source NG-RAN but has not been activated, that is, no QoS flow has been established, a PDU session establishment procedure may be performed after a registration procedure. However, the present disclosure is not limited thereto. In this scenario, the PDU session establishment procedure may be performed before the registration procedure. When or in response to a determination that before UE is handed over to a target NG-RAN, an MBS session has been established on a side of a source NG-RAN and has been activated, that is, a QoS flow has been established before the handover, a PDU session establishment procedure may be performed before a registration procedure. However, the present disclosure is not limited thereto. In this scenario, the PDU session establishment procedure may be performed after the registration procedure.

In the embodiments of the present disclosure, when or in response to a determination that before UE is handed over to a target base station, a plurality of MBS sessions have been established at a source base station, assuming that some MBS sessions have been activated before the handover, that is, QoS flows have been established, and some other MBS sessions have not been activated before the handover, that is, QoS flows have not been established yet, PDU session establishment procedures corresponding to the some MBS sessions activated before the handover may be performed before the registration procedure, and PDU session establishment procedures corresponding to the some other MBS sessions that have not been activated before the handover may be performed after the registration procedure. In this way, an MBS session with service data may be handed over to a PDU session, so that the response speed of a service can be increased, thereby meeting the timeliness of service switching. However, the present disclosure is not limited thereto. A plurality of PDU session establishment procedures corresponding to a plurality of MBS sessions may be performed in parallel and independently and are not subject to a constraint relationship.

FIG. 4 is a schematic diagram of Xn based inter NG-RAN handover without UPF re-allocation according to an embodiment of the present disclosure.

As shown in FIG. 4, through a handover preparation phase and a handover execution phase, UE is handed over from a source NG-RAN to a target NG-RAN. The source NG-RAN supports an MBS multicast/broadcast session, and the target NG-RAN does not support an MBS multicast/broadcast session. After the UE is handed over from the source NG-RAN to the target NG-RAN, the target NG-RAN transmits a handover complete indication to the UE. After receiving the handover complete indication, the UE may learn that the UE has been successfully connected to the target NG-RAN. Subsequently, the UE may trigger a PDU session establishment procedure shown in FIG. 6.

In the embodiments of the present disclosure, the handover complete indication may be in any form, for example, a related indication of a physical layer, a media access control (MAC) layer or a radio link control (RLC) layer or a message of a radio resource control (RRC) layer transmitted by the target base station to the UE. The form of the handover complete indication is not limited in the present disclosure, provided that the UE can be informed that the UE has been successfully connected to the target base station.

Figure 5:
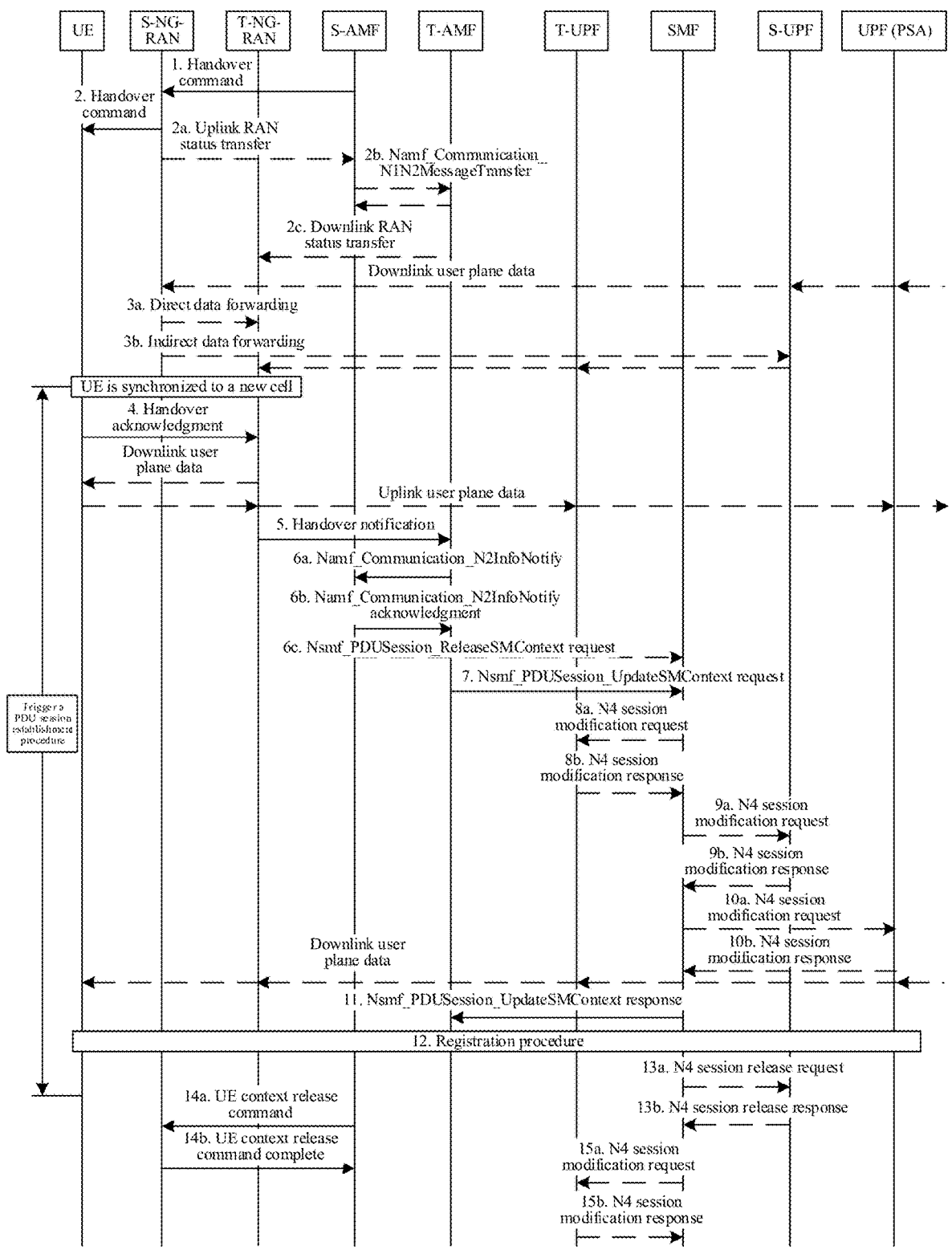
FIG. 5 is a schematic diagram of an execution phase of inter NG-RAN node N2 based handover according to certain embodiment(s) of the present disclosure.

Registration procedures of step 9 in the embodiment in FIG. 4 and step 12 in the embodiment in FIG. 5 refer to that after the UE receives the handover complete indication transmitted by the target base station, when or in response to a determination that the UE is changed to a new tracking area, a registration procedure of registering the user equipment with a network is performed. The UE may trigger the establishment of the PDU session on the side of the target base station before the registration procedure or after the registration procedure.

In certain embodiment(s), when the UE moves into a new TA and the new TA is beyond a current service area (registration area) (formed by one or more TAs) of the UE, a registration procedure with a type of mobility registration update may be performed to allow the UE to be registered with a network such as a 5G system (5GS) again in the new TA.

In an exemplary embodiment, when or in response to a determination that the user equipment moves from the source base station to the target base station in an idle state (Connection Management-IDLE, CM-IDLE), before the UE triggers the establishment of the PDU session on the side of the target base station, the UE may further trigger a service request procedure to allow the user equipment to enter a connected state (Connection Management-CONNECTED, CM-CONNECTED).

For example, when or in response to a determination that the UE moves from a source base station supporting an MBS multicast/broadcast session to another target base station not supporting an MBS multicast/broadcast session in a CM-Idle state, the UE may enter a CM-CONNECTED state through a service request, and a PDU session establishment procedure is performed.

In an exemplary embodiment, when or in response to a determination that the user equipment moves from the source base station to the target base station in an idle state and a current tracking area identity (TAI) of the user equipment is not in a registered TAI list, before triggering the establishment of a PDU session on the side of the target base station, the UE may further perform a registration procedure with a registration type of mobility registration update, to allow the user equipment to enter a connected state.

For example, when or in response to a determination that the UE moves from a source base station supporting an MBS multicast/broadcast session to another target base station not supporting an MBS multicast/broadcast session in a CM-Idle state and the UE discovers that a current TAI is not in a registered TAI list, the UE first performs a registration procedure with a registration type of mobility registration update, and a PDU session establishment procedure is performed when or in response to a determination that a signaling connection is not released.

Figure 6:
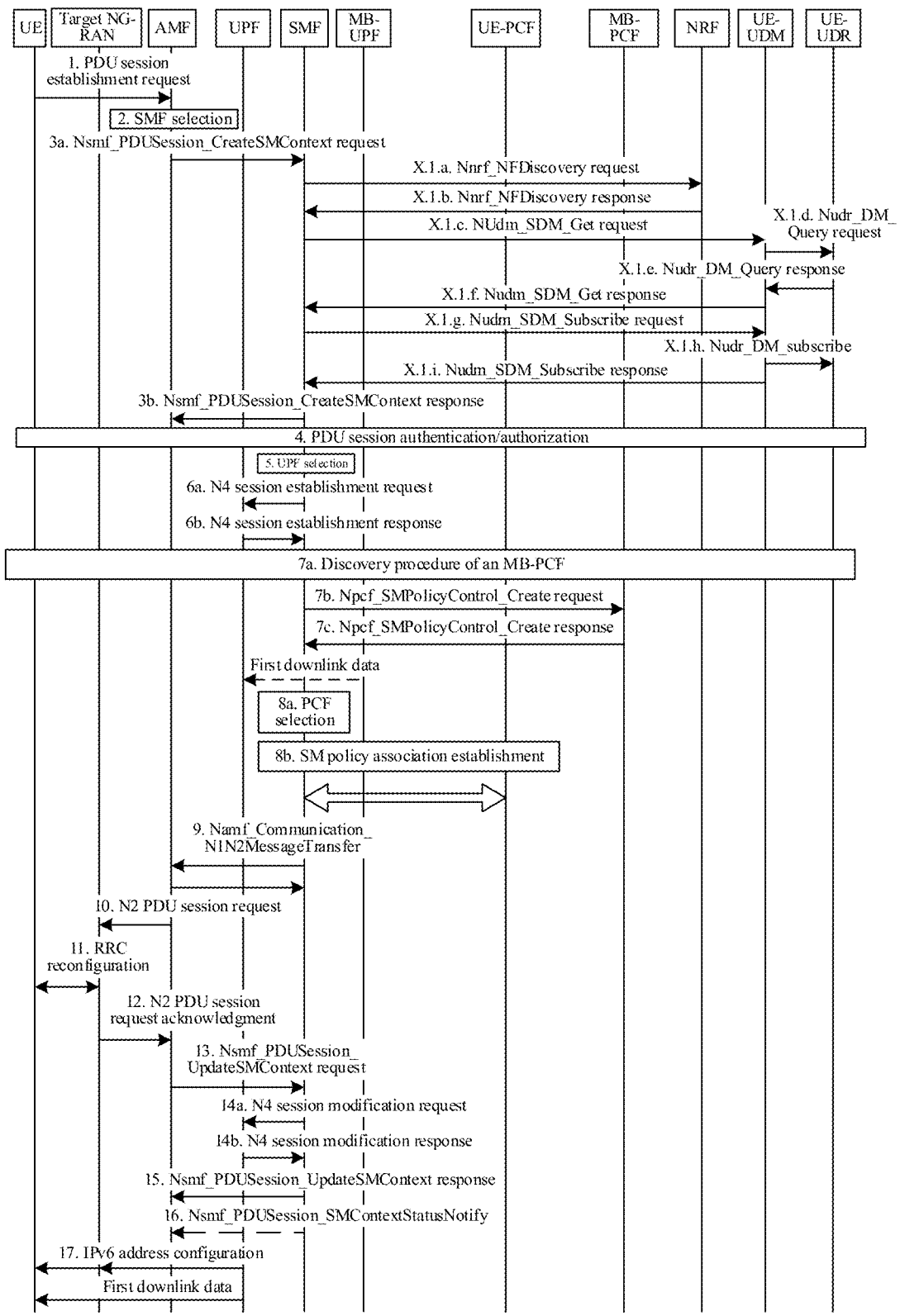
FIG. 6 is a schematic diagram of a process of triggering establishment of a PDU session on a side of a target NG-RAN according to certain embodiment(s) of the present disclosure.

The PDU session establishment procedure shown in FIG. 6 triggered by the UE and a communication procedure on a network side in FIG. 4 are independent. Therefore, the UE may trigger the PDU session establishment procedure at any moment between step 1a and step 8 in FIG. 4. That is, the PDU session establishment procedure shown in FIG. 6 may be triggered before step 9 in FIG. 4 or the PDU session establishment procedure shown in FIG. 6 may be triggered after step 9 in FIG. 4. In addition, step 9 in FIG. 4 is performed.

The steps in FIG. 4 are briefly described below.

Step 1a in FIG. 4 is optional. When or in response to a determination that a public land mobile network (PLMN) has configured a secondary radio access technology (RAT) usage report, in a handover execution phase, a source NG-RAN node may provide a RAN usage data report to an AMF, that is, a RAN usage data Report (N2 SM information (Secondary RAT usage data), Handover Flag, Source to Target transparent container). Handover Flag indicates that the AMF may cache N2 SM information before forwarding, where the N2 SM information includes a usage data report. Source to Target transparent container refers to a transparent container from a source to a target.

Step 1b in FIG. 4 is optional. The target NG-RAN transmits an N2 path switch request, that is, N2 Path Switch Request, to the AMF, to notify that the UE has moved to a new target cell, and provides a PDU session list for handover.

In step 2 in FIG. 4, the AMF transmits an Nsmf_PDUSession_UpdateSMContext request, that is, a PDU session update session management context request, to an SMF.

In step 3 in FIG. 4, the SMF transmits an N4 session modification request, that is, N4 Session Modification Request, to the UPF.

In step 4 in FIG. 4, the UPF transmits an N4 Session Modification response, that is, an N4 session modification response, to the SMF.

In step 5 in FIG. 4, for a reordering function in a secondary target NG-RAN, the UPF transmits one or more end marker packets for each N3 tunnel. The UPF starts to transmit downlink data to the target NG-RAN.

In step 6 in FIG. 4, the SMF transmits an Nsmf_PDUSession_UpdateSMContext response, that is, a PDU session update session management context response, to the AMF.

In step 7 in FIG. 4, the AMF transmits an N2 Path Switch Request Ack (that is, an N2 path switch request acknowledgment) to the target NG-RAN.

In step 8 in FIG. 4, a release resource message is transmitted to the source NG-RAN, and the target NG-RAN acknowledges that handover succeeds. The target NG-RAN triggers resource release of the source NG-RAN.

A registration procedure of step 9 in FIG. 4 is optional.

FIG. 5 is a schematic diagram of an execution phase of inter NG-RAN node N2 based handover according to an embodiment of the present disclosure. A preparation phase of inter NG-RAN node N2 based handover may be further included before FIG. 5.

An S-NG-RAN in FIG. 5 refers to a source NG-RAN supporting an MBS, which may be represented as an S-RAN, corresponding to an S-AMF and an S-UPF. A T-NG-RAN refers to a target NG-RAN not supporting an MBS, which may be represented as a T-RAN, corresponding to a target AMF (T-AMF) and a target UPF (T-UPF). A PSA in a UPF (PSA) is a PDU session anchor.

In step 1 in FIG. 5, the S-AMF transmits a handover command to the S-RAN.

In step 2 in FIG. 5, the S-RAN transmits the handover command to the UE.

Step 2a in FIG. 5 is optional, in which the S-RAN transmits an uplink RAN status transfer message to the S-AMF.

Step 2b in FIG. 5 is optional, in which the S-AMF transmits a Namf_Communication_N1N2MessageTransferservice operation, that is, a T-AMF acknowledgment, to the T-AMF.

Step 2c in FIG. 5 is optional, in which when or in response to a determination that the S-AMF or the AMF is relocated, the T-AMF transmits a downlink RAN status transfer message to the T-RAN.

Uplink packets in FIG. 5 are transmitted from the T-RAN to the T-UPF and the UPF (PSA). Downlink packets are transmitted from the UPF (PSA) to the S-RAN through the S-UPF. The S-RAN may start to forward downlink data to the T-RAN. The forwarding may be direct data forwarding (step 3a in FIG. 5) or indirect data forwarding (step 3b in FIG. 5). Steps 3a and 3b in FIG. 5 are optional. The UE is synchronized to a new cell (that is, a target cell corresponding to the target base station).

In step 4 in FIG. 5, the UE transmits a handover confirm message to the T-RAN. That is, the UE indicates to the network that the UE has been handed over to the target RAN. After the UE has been successfully synchronized to a target cell, the UE transmits a handover confirm message to the T-RAN. It is considered according to the handover confirm message that the UE has been successfully handed over. After the UE has been synchronized to a new cell or it is confirmed that the UE has been successfully handed over, the UE may trigger the PDU session establishment procedure in the embodiment in FIG. 5 at any time, to establish a PDU session on the side of target base station.

In step 5 in FIG. 5, the T-RAN transmits a Handover Notify to the T-AMF.

Step 6a in FIG. 5 is optional, in which the T-AMF transmits Namf_Communication_N2InfoNotify to the S-AMF.

Step 6b in FIG. 5 is optional, in which the S-AMF transmits an Namf_Communication_N2InfoNotify ACK to the T-AMF.

Step 6c in FIG. 5 is optional, in which the S-AMF transmits an Nsmf_PDUSession_ReleaseSMContext Request to an SMF.

In step 7 in FIG. 5, the T-AMF transmits an Nsmf_PDUSession_UpdateSMContext Request to the SMF.

Step 8a in FIG. 5 is optional, in which the SMF transmits an N4 Session Modification Request (an N4 session modification request) to the T-UPF.

Step 8b in FIG. 5 is optional, in which the T-UPF transmits an N4 Session Modification Response to the SMF.

Step 9a in FIG. 5 is optional, in which the SMF transmits the N4 Session Modification Request to the S-UPF.

Step 9b in FIG. 5 is optional, in which the S-UPF transmits the N4 Session Modification Response to the SMF.

Step 10a in FIG. 5 is optional, in which the SMF transmits the N4 Session Modification Request to the UPF (PSA).

Step 10b in FIG. 5 is optional, in which the UPF (PSA) transmits the N4 Session Modification Response to the SMF.

In step 11 in FIG. 5, the SMF transmits an Nsmf_PDUSession_UpdateSMContext Response to the T-AMF.

In step 12 in FIG. 5, the UE triggers a registration procedure.

The UE may trigger the following PDU session establishment procedure in FIG. 6 and FIG. 7 before the registration procedure of step 12 or after the registration procedure of step 12 in FIG. 5.

Step 13a in FIG. 5 is optional, in which the SMF transmits an N4 Session Release Request (N4 session release request) to the S-UPF.

Step 13b in FIG. 5 is optional, in which the S-UPF transmits an N4 Session Release Response (N4 session release response) to the SMF.

In step 14a in FIG. 5, an AMF transmits a UE Context Release Command ( ) to the S-RAN.

In step 14b in FIG. 5, the S-RAN transmits a UE Context Release Command Complete ( ) to the AMF.

Step 15a in FIG. 5 is optional, in which the SMF transmits the N4 Session Modification Request to the T-UPF.

Step 15b in FIG. 5 is optional, in which the T-UPF transmits the N4 Session Modification Response to the SMF.

In the embodiments of the present disclosure, when or in response to a determination that a PDU session associated with an MBS session has not been established on the side of the source base station, after determining that the target base station does not support an MBS, the UE triggers establishment of a PDU session on the side of the target base station. The determining, by the UE, that the target base station does not support an MBS may include: receiving, by the UE, a system information block broadcast by the target base station, and determining, according to the system information block, that the target base station does not support an MBS; or acquiring a target service area of an MBS, and determining, according to the target service area, that the target base station does not support an MBS.

In certain embodiment(s), after the UE is handed over from the source base station supporting an MBS to the target base station not supporting an MBS, the UE may learn from a system information block (SIB) message broadcast by a target cell system corresponding to the target base station that the target cell does not support an MBS multicast/broadcast session. For example, the SIB message broadcast by the target base station may indicate that an MBS is completely not supported or which S-NSSAI or which DNN or which combination of S-NSSAI and a DNN does not support an MBS session. The UE may determine, according to the indicated information of the broadcast SIB message, to establish one or more corresponding PDU sessions at the target base station. Alternatively, the information may be obtained in another manner. For example, it is determined, according to a target service area of an MBS multicast/broadcast session, whether the target base station supports the MBS multicast/broadcast session. A manner in which the UE determines whether the target base station supports an MBS is not limited in the present disclosure.

When or in response to a determination that a plurality of MBS multicast/broadcast sessions are established at the same time and each MBS multicast/broadcast session corresponds to one combination of S-NSSAI and a DNN, the UE may determine, according to the indicated information in the broadcast SIB message, to establish a corresponding PDU session the side of the target NG-RAN. The plurality of MBS multicast/broadcast sessions may be switched in parallel to respective corresponding PDU sessions, or a sequential order of switching may be decided depending on whether there is a service (that is, whether an MBS session has been activated, and whether there is a QoS flow of an MBS session).

For example, when or in response to a determination that the UE has five MBS multicast/broadcast sessions, because the target NG-RAN does not support an MBS multicast/broadcast session, the five MBS multicast/broadcast sessions may be simultaneously switched to respective corresponding PDU sessions. Switching procedures of the MBS multicast/broadcast sessions may be independent, for example, may be in parallel, and are subject to no sequential order relationship. Alternatively, some, for example, three MBS multicast/broadcast sessions with a service in the five MBS multicast/broadcast sessions are switched first, and some other, for example, two MBS multicast/broadcast sessions without a service are switched last. In this way, it can be ensured that an MBS multicast/broadcast session with a service is switched in real time, thereby keeping the continuity of the service.

In other embodiments, when or in response to a determination that the UE determines that the target base station after the handover also support an MBS, the continuity of a service can be implemented through direct switching from the activated MBS session of the source base station to an MBS session of the target base station.

In the embodiment in FIG. 6, it is assumed that the source base station to which the UE is connected before the handover supports an MBS, the UE has established an MBS session at the source base station before being handed over to the target base station, the MBS session has been activated before the handover, and at the same time the UE has not established a PDU session associated with the MBS session before the handover. FIG. 6 is a schematic diagram of a process of triggering establishment of a PDU session on a side of a target NG-RAN according to an embodiment of the present disclosure.

In step 1 in FIG. 6, the UE transmits a non-access stratum (NAS) message to an AMF. The NAS message may carry a request type. The request type indicates that there is an existing MBS session, so that the AMF selects an SMF for a newly established PDU session according to the value of the request type.

In an exemplary embodiment, the NAS message may further carry the S-NSSAI, the DNN, and an MBS session identity of the MBS session, so that the SMF establishes the PDU session according to the S-NSSAI, the DNN, and the MBS session identity.

In an exemplary embodiment, the NAS message may further carry a PDU session identity (ID) of the PDU session and an N1 session management (SM) container. The N1 session management container carries a PDU session establishment request.

For example, after the UE is handed over to a target base station not supporting an MBS and it is determined that the target base station does not support an MBS, the UE may initiate a PDU session establishment procedure, to establish a PDU session on the side of target base station. The UE may transmit the NAS message to the AMF, and the NAS message carries the following parameters: S-NSSAI, DNN, PDU Session ID, Request Type, MBS Session ID (for example, may include MBS Multicast Session/Broadcast Session ID, which may also be recorded as an Old MBS Multicast/Broadcast Session ID hereinafter for the correspondence with an original source base station), and N1 SM container. N1 SM container carries PDU Session Establishment Request. That is, the parameters may be represented as a NAS Message (S-NSSAI(s), UE Requested DNN, PDU Session ID, Request type, Old MBS Session ID, N1 SM container (PDU Session Establishment Request, [Port Management Information Container])).

In the embodiments of the present disclosure, Request Type indicates Existing MBS Session. Existing MBS Session may include Existing MBS Multicast/Broadcast Session. After the AMF receives the NAS message transmitted by the UE, Request Type indicates Existing MBS Multicast/Broadcast Session as a newly established PDU session for processing, that is, selects a new SMF. The AMF may establish a PDU session by interacting with the SMF, and establish one or more QoS flows corresponding to the activated MBS session in the PDU session.

Old MBS Session ID indicates Old MBS Multicast/Broadcast Session ID, representing an MBS multicast/broadcast session identity corresponding to MBS Multicast/Broadcast Session (which is sometimes directly represented hereinafter as MBS Multicast/Broadcast Session ID). Old MBS Session ID indicates Old MBS Multicast Session ID, representing that an MBS multicast service is switched, and Old MBS Session ID indicates Old MBS Broadcast Session ID, representing that an MBS broadcast service is switched.

An N1 SM container, that is, an N1 session management container, carries a PDU Session Establishment Request (PDU session establishment request). Port Management Information Container represents a port management information container.

The combination of S-NSSAI and a DNN in the NAS message is a combination of S-NSSAI and a DNN corresponding to Old MBS Multicast/Broadcast Session. The PDU Session established on the side of the target NG-RAN is used to replace an MBS multicast/broadcast session on the side of the source NG-RAN. Therefore, a combination of S-NSSAI and a DNN of the PDU Session on the target NG-RAN is the same as a combination of S-NSSAI and a DNN of the original MBS Multicast/Broadcast Session. In this way, the continuity of a service can be kept.

In the example, an example in which one NAS message carries S-NSSAI, a DNN, a PDU session ID, a Request Type, an MBS Session ID, and an N1 SM Container is used for exemplary description. However, the present disclosure is not limited thereto. In other embodiments, the UE may directly or indirectly transmit a plurality of NAS messages to the AMF. Each NAS message respectively carries at least a part of the content, or the UE may directly or indirectly transmit one or more messages in other forms to the AMF, provided that the information can be transferred to the AMF, to inform the AMF that currently a PDU session may be created and the PDU session is used to replace an MBS session that has been established on the side of the source base station but has not been activated. Specific values and expression forms of the information are not limited to the example.

In the embodiment in FIG. 6, an interface is provided between the SMF and the PCF. That is, two PCFs may appear in FIG. 6. One PCF is connected to the MB-SMF, is referred to as a multicast broadcast-policy control function (MB-PCF), and may be configured to provide context information of an MBS multicast/broadcast session for policy control of the entire 5G MBS session. The other PCF connected to the SMF is referred to as a user equipment policy control function (UE-PCF), and is configured to control the policy of a PDU session. It may be understood that the MB-PCF and the UE-PCF are logically independent, or may be the same PCF entity. The SMF and the MB-SMF are logically independent, or may be the same SMF entity. Similarly, the UPF and the MB-UPF are completely logically independent, or may be the same UPF entity.

In step 2 in FIG. 6, for the AMF, Request Type indicates Existing MBS Multicast/Broadcast Session as a newly established PDU session for processing (that is, the SMF in FIG. 6 is different from the MB-SMF). The AMF selects one SMF according to the S-NSSAI and DNN provided by the UE.

In step 3a in FIG. 6, the AMF transmits an Nsmf_PDUSession_CreateSMContext request message (that is, a protocol data unit (PDU) session create session management context request message) to the selected SMF. The Nsmf_PDUSession_CreateSMContext request message carries a DNN, an S-NSSAI, a Request Type, an Old MBS Session ID, and an N1 SM container, that is, Nsmf_PDUSession_CreateSMContext Request (SUPI, selected DNN, UE requested DNN, S-NSSAI(s), PDU session ID, AMF ID, Request Type (indicating Existing MBS Multicast/Broadcast Session), Old MBS Session ID, PCF ID, Priority Access, [Small Data Rate Control Status], N1 SM container (PDU Session Establishment Request), User location information, Access Type, RAT Type, PEI, GPSI, UE presence in LADN service area, Subscription For PDU Session Status Notification, DNN Selection Mode, Trace Requirements, Control Plane CIoT 5GS Optimization indication, or Control Plane Only indicator).

The Nsmf_PDUSession_CreateSMContext Request carries a subscription permanent identifier (SUPI), a DNN, and S-NSSAI, a Request type (=Existing MBS Multicast/Broadcast Session), and an Old MBS Session ID=Old MBS Multicast/Broadcast Session ID, and the like. Priority Access represents priority access. Small Data Rate Control Status represents a small data rate control status. User location information represents user location information. Access Type represents an access type. RAT Type represents a RAT type. PEI stands for Permanent Equipment Identifier. GPSI stands for Generic Public Subscription Identifier. UE presence in LADN service area represents that UE exists in a local area data network (LADN) service area. Subscription For PDU Session Status Notification represents defining a PDU session status notification. DNN Selection Mode represents a DNN selection mode. Trace Requirements represents a trace requirement. Control Plane CIoT 5GS Optimization indication represents a control plane Cell Internet of Things (CIoT) 5GS optimization indication. Control Plane Only indicator represents a control plane only indicator.

In the exemplary description, the AMF directly transmits one Nsmf_PDUSession_CreateSMContext Request message to the SMF. One Nsmf_PDUSession_CreateSMContext Request message carries various information such as a DNN, S-NSSAI, a Request Type, an Old MBS Multicast/Broadcast Session ID, and an N1 SM container. However, the present disclosure is not limited thereto. In other embodiments, the AMF may directly or indirectly transmit one or more Nsmf_PDUSession_CreateSMContext Request messages to the SMF. Each Nsmf_PDUSession_CreateSMContext Request message respectively carries at least a part of all the information, or another message form may be used. This is not limited in the present disclosure, provided that the SMF can eventually acquire the desired information.

Step X.1 in FIG. 6 may include the following steps X.1.a to X.1.i.

In step X.1.a, the SMF transmits an Nnrf_NFDiscovery request message (a network function (NF) discovery request message) to an NRF, the Nnrf_NFDiscovery request message carrying a SUPI and an NF Type of the UE, the NF Type indicating a UDM to indicate that an ID of an UDM is acquired from the NRF.

In step X.1.b, after receiving the Nnrf_NFDiscovery request message (a SUPI and an NF Type indicating a UDM), in response to the Nnrf_NFDiscovery request message (the SUPI and the NF Type indicating a UDM), the NRF finds an identity (ID) of a UDM corresponding to the UE, referred to as a user equipment unified data manager function identity (UE-UDM ID) corresponding to a user equipment unified data manager function, and returns an Nnrf_NFDiscovery response message (the UE-UDM ID) to the SMF, that is, an NF discovery response message.

In step X.1.c, after receiving the Nnrf_NFDiscovery response message from the NRF, the SMF may learn the UDM corresponding to the UE according to the UE-UDM ID carried in the Nnrf_NFDiscovery response message. Therefore, the SMF may transmit an Nudm_SDM_Get request message (data management get request message) to the UE-UDM corresponding to the UE-UDM ID, the Nudm_SDM_Get request message carrying the UE-UDM ID and the SUPI of the UE.

In step X.1.d, after the UE-UDM receives the Nudm_SDM_Get request message from the SMF, the UE-UDM may transmit an Nudr_DM_Query request message (data management query request message) to the UE-UDR, the Nudr_DM_Query request message carrying the SUPI of the UE.

In the embodiments of the present disclosure, a UDR corresponding to the UE-UDM is referred to as a user equipment unified data repository (UE-UDR). A UDM corresponding to an MBS session such as an MBS Multicast/Broadcast Session is referred to as a multicast broadcast unified data manager function (MB-UDM), and a UDR corresponding to an MB-UDM is referred to as a multicast broadcast unified data repository (MB-UDR).

It may be understood that in the embodiments of the present disclosure, the MB-UDR and the UE-UDR may be the same UDR or may be different UDRs.

In step X.1.e, after receiving the Nudr_DM_Query request message from the UE-UDM, the UE-UDR may return an Nudr_DM_Query response message (data management query response message) to the UE-UDM in response to the Nudr_DM_Query request message, the Nudr_DM_Query response message including MBS session management subscription data of the MBS multicast/broadcast session.

In step X.1.f, after the UE-UDM receives the Nudr_DM_Query response message returned by the UE-UDR, the UE-UDM may return an Nudm_SDM_Get response message (a data management get response message) to the SMF in response to the Nudm_SDM_Get request message, the Nudm_SDM_Get response message carrying the MBS session management subscription data of the MBS multicast/broadcast session.

In step X.1.g, after receiving the Nudm_SDM_Get response message, the SMF may transmit an Nudm_SDM_Subscribe request message (data management subscribe request message) to the UE-UDM, the Nudm_SDM_Subscribe request message carrying a SUPI, the MBS session management subscription data of the MBS multicast/broadcast session, a DNN, and S-NSSAI.

In step X.1.h, after receiving the Nudm_SDM_Subscribe request message, the UE-UDM may transmit an Nudr_DM_Subscribe message (data management subscribe message) to the UE-UDR, the Nudr_DM_Subscribe message carrying the MBS session management subscription data of the MBS multicast/broadcast session.

In step X.1.i, the UE-UDM may return an Nudm_SDM_Subscribe response message (data management subscribe response message) to the SMF.

In step X.1 in the embodiment in FIG. 6, Session Management Subscription data in Nudm_SDM_Get (including a request message and a response message) and Nudm_SDM_Subscribe (including a request message and a response message) indicate MBS session Management Subscription data. Similarly, Session Management Subscription data in Nudr_DM_Query (including a request message and a response message) and Nudr_DM_Subscribe (including a request message and a response message) indicate MBS session Management Subscription data.

In Step X.1 in the embodiment in FIG. 6, the SMF queries the NRF through the SUPI of the UE to obtain the UE-UDM. The UE-UDM in step X.1 in the embodiment in FIG. 6 is configured to store the MBS session management subscription data of the UE, and it may be learned according to the MBS session management subscription data whether S-NSSAI and a DNN have been subscribed. If not, it is rejected to perform subsequent steps in FIG. 6. That is, in step X.1, it is checked whether it is allowed to establish a PDU session. The MBS session management subscription data includes a lot of information, for example, an allowable maximum bandwidth, charging, and the like.

When or in response to a determination that a plurality of MBS multicast/broadcast sessions of the UE are simultaneously switched to a corresponding unicast PDU session, the UE performs the entire procedure in FIG. 6 for each PDU session, because the S-NSSAI and DNN of the PDU session corresponding to each MBS multicast/broadcast session have been specified in all procedures.

In step 3b in FIG. 6, the SMF returns an Nsmf_PDUSession_CreateSMContext response message (that is, a protocol data unit session create session management context response message, PDU session create session management context response message) in response to Nsmf_PDUSession_CreateSMContext request message to the AMF.

In step 4 in FIG. 6, PDU session authentication/authorization is performed.

In step 5 in FIG. 6, the SMF selects a UPF, and when or in response to a determination that the SMF discovers that the SMF itself is the MB-SMF, the SMF directly selects the MB-UPF as the UPF.

In step 6a in FIG. 6, the SMF transmits an N4 Session Establishment Request (N4 session establishment request) message to the selected UPF.

In step 6b in FIG. 6, the UPF returns an N4 Session Establishment Response (N4 session establishment response) message to the SMF to perform acknowledgment.

In step 7a in FIG. 6, for a procedure of discovering the MB-PCF by the SMF, reference may be made to the embodiments in FIG. 8 and FIG. 9 below for details. Step 7a in FIG. 6 may only be performed before step 7b in FIG. 6, and is subject to no sequential relationship with other steps.

In step 7b in FIG. 6, the SMF transmits an Npcf_SMPolicyControl_Create request message, that is, a first session management policy control create request message, to the MB-PCF discovered in step 7a. The first session management policy control create request message may carry the MBS session identity, the S-NSSAI, the DNN and a data set identity (Data Set ID) indicating policy data.

The Npcf_SMPolicyControl_Create request message shown in FIG. 6 is only an exemplary description of the first session management policy control obtaining request message. The first session management policy control obtaining request message may further include any one of an Npcf_SMPolicyControl_Get request message (that is, a first session management policy control get request message) or an Npcf_MBSMPolicyControl_Get request message (that is, the first multicast broadcast session management policy control get request message), and the like. This is not limited in the present disclosure. The first session management policy control get request message and the first multicast broadcast session management policy control get request message may also carry the MBS session identity, the S-NSSAI, the DNN, and the data set identity indicating policy data.

In step 7c in FIG. 6, the MB-PCF receives an Npcf_SMPolicyControl_Create (or Npcf_SMPolicyControl_Get or Npcf_MBSMPolicyControl_Get) request message from the SMF, and returns an Npcf_SMPolicyControl_Create (or Npcf_SMPolicyControl_Get or Npcf_MBSMPolicyControl_Get) response message in response to the received Npcf_SMPolicyControl_Create (or Npcf_SMPolicyControl_Get or Npcf_MBSMPolicyControl_Get) request message to the SMF. That is, the first session management policy control obtaining response message may be any one of the first session management policy control create response message, the first session management policy control get response message, the first multicast broadcast session management policy control get response message, and the like. The first session management policy control obtaining response message may include all policy rule information and MB-UPF transfer information (a transport layer IP multicast address and a common tunnel endpoint identity (TEID) (C-TEID) corresponding to the activated MBS session of the MBS session.

In certain embodiment(s), after receiving the Npcf_SMPolicyControl_Create (or Npcf_SMPolicyControl_Get or Npcf_MBSMPolicyControl_Get) request message from the SMF, the MB-PCF may transmit an Nudr_DM_Query (Data Key=MBS session ID, Data Subkey=S-NSSAI and DNN, Data Set=Policy Data, and Data SubSet=MBS session Policy Data) message and an Nudr_DM_Subscribe (an MB-PCF ID, an MBS session ID, and a Notification Correlation ID) message to the MB-UDR, That is, a data set indicating an MBS session ID, a data subset indicating S-NSSAI and a DNN, a data set indicating policy data, and a data subset indicating MBS session policy data. Notification Correlation ID is a notification association identity. Next, the MB-PCF performs policy decision.

The SMF acquires MB-UPF transport information from the MB-PCF and provides the MB-UPF transport information to the UPF. The UPF establishes a user plane connection to the MB-UPF. For example, the UPF adds a transport layer IP multicast address allocated by the MB-UPF. Through the transport layer IP multicast address provided in the MB-UPF transport information and the common tunnel endpoint identity (TEID) (C-TEID), the UPF starts to receive downlink data transmitted by the MB-UPF. For the UPF, the downlink data is the first downlink data received by the UPF.

In step 8a in FIG. 6, when or in response to a determination that a PCF is deployed and a dynamic policy is used, in step 8a in FIG. 6, the SMF performs PCF selection (that is, the selection of the UE-PCF in FIG. 6) related to a PDU session. The SMF may reuse the MB-PCF selected in the MBS multicast/broadcast session as the UE-PCF, or may reselect a PCF different from the MB-PCF as the UE-PCF for the UE. In the embodiments of the present disclosure, an MB-PCF may be selected as the UE-PCF according to the MBS multicast/broadcast session ID.

In step 8b in FIG. 6, when or in response to a determination that a PCF is deployed and a dynamic policy is used, in step 8b in FIG. 6, an SM policy association establishment procedure is performed. The SMF provides the selected PCF with QoS information (Packet Filter, 5QI, ARP, and the like) of service flows corresponding to the MBS session acquired by the MB-PCF, to request the UE-PCF to check whether the QoS information of these service flows satisfies policy rules of a user and a network. The UE-PCF delivers new authorized policy rules according to policies of the user and the network, that is, the QoS information (Packet Filter, 5QI, ARP, and the like) of the service flows of each MBS session. Even if no modification is made to QoS information, the UE-PCF may still transmit the QoS information of the service flows of the MBS session provided by the SMF to the SMF again and at the same time provides a default PCC rule to the SMF.

In step 9 in FIG. 6, the SMF transmits Namf_Communication_N1N2MessageTransfer (that is, a first communication N1N2 message transfer message) to the AMF. The SMF requests the AMF to transfer a message on the N1 interface and a message on the N2 interface. The SMF wants the AMF to respectively forward related information related to the SM to the UE and the target NG-RAN. The SMF establishes one or more QoS flows corresponding to an MBS multicast/broadcast session on a PDU session according to the QoS information in a dynamic policy Rule provided by the PCF.

In certain embodiment(s), the SMF triggers Namf_Communication_N1N2MessageTransfer ([N2 SM information] (PDU session ID, QFI(s), QoS Profile(s), [Alternative QoS Profile(s)], Session-AMBR, [CN Tunnel Info(s)], QoS Monitoring indication, QoS Monitoring reporting frequency, [TSCAI(s)]), N1 SM container (PDU session Modification Command (PDU session ID, QoS rule(s), QoS flow level QoS parameters if desired for the QoS flow(s) associated with the QoS rule(s), QoS rule operation and QoS flow level QoS parameters operation, Session-AMBR))).

PDU session ID in Namf_Communication_N1N2MessageTransfer allows the AMF to learn which session of the UE the AMF is to provide a Transfer service to.

The N2 session management information (N2 SM information) is provided to the target NG-RAN, the main content of which includes: PDU Session ID, QFI(s), QoS Profile(s), core network tunnel information (CN Tunnel Info), Session-Aggregate Maximum Bit Rate (Session-AMBR), and PDU Session Type. QoS Profile(s) is used for the configuration of a plurality of QoS flows of one session by the target NG-RAN; and CN Tunnel Info is used for identifying a node on a UPF side of an N3 interface of the session.

N1 SM container (N1 session management container) is provided for the UE and is one SM message, that is, Session Established Accept, of which the main content includes: QoS Rule(s), S-NSSAI(s), DNN, an IP address, and Session-AMBR. QoS Rule(s) is used for the configuration of a plurality of QoS flows of one session by the UE; and the IP address is used for data routing of the UE from a UPF egress.

QoS Profile(s) and QoS Rule(s) discussed here refer to a QoS Profile and a QoS Rule corresponding to each QoS Flow. When or in response to a determination that a plurality of QoS flows are provided, one message includes a QoS Profile and a QoS Rule corresponding to each QoS flow. A plurality of QoS flows of one session may be configured at once in this manner in 5G, thereby greatly improving the signaling efficiency.

In step 10 in FIG. 6, the AMF transmits an N2 PDU session request (N2 PDU Session Request) message to the target NG-RAN.

In certain embodiment(s), the message is N2 PDU session Request (N2 SM information, the NAS message (PDU session ID, N1 SM container (PDU session Establishment Accept)), [CN assisted RAN parameters tuning]). That is, the N2 PDU session Request transmitted to the target NG-RAN by the AMF includes the NAS message and the N2 SM information received from the SMF. The NAS message includes the PDU session ID and PDU session Establishment Accept to be transmitted to the UE.

In step 11 in FIG. 6, radio resource control (RRC) reconfiguration is performed between the target NG-RAN and the UE.

In step 12 in FIG. 6, the target NG-RAN transmits an N2 PDU session request acknowledgment (N2 PDU Session Request Ack) message to the AMF.

In step 13 in FIG. 6, the AMF transmits an Nsmf_PDUSession_UpdateSMContext request message to the SMF.

The AMF transmits an Nsmf_PDUSession_UpdateSMContext Request (SM Context ID, N2 SM information, Request Type) to the SMF. The AMF delivers N2 SM information to the SMF by using an update SM context service provided by the SMF. Some parameters related to QoS flow(s) are provided in the N2 SM information, and the SMF may update the content of session context in time.

In step 14*a* in FIG. 6, the SMF transmits an N4 session modification request (N4 Session Modification Request) message to the UPF, and intends to transfer AN Tunnel Info (access network tunnel information) from the target NG-RAN to put through a downlink tunnel of N3, and eventually inform the UPF of a downlink forwarding rule. One parameter is provided in the N2 SM information: AN Tunnel Info, identifying a node on the side of the target NG-RAN of a session at an N3 interface. Once AN Tunnel Info is delivered by the SMF to the UPF, a downlink tunnel of the session on the N3 interface is put through.

In step 14*b* in FIG. 6, the UPF returns an N4 session modification response (N4 Session Modification Response) message to the SMF in response to the N4 Session Modification Request message.

In step 15 in FIG. 6, the SMF returns an Nsmf_PDUSession_UpdateSMContext response message to the AMF in response to the Nsmf_PDUSession_UpdateSMContext request message.

In step 16 in FIG. 6, the SMF transmits an Nsmf_PDUSession_SMContextStatusNotify message to the AMF.

In step 17 in FIG. 6, the UPF transmits an Internet Protocol Version 6 (IPv6) address configuration to the target NG-RAN, and the target NG-RAN transmits the IPv6 address configuration to the UE. The UPF transmits the first piece of downlink data to the UE.

In the method for implementing multicast broadcast service handover provided in the embodiments of the present disclosure, in one aspect, when or in response to a determination that a source base station of UE before handover has activated an MBS session and has not established a PDU session associated with the MBS session, after the UE is handed over from the source base station supporting an MBS to a target base station not supporting an MB, it is triggered to establish one PDU session on a side of the target base station not supporting an MBS, so that all policy rule information corresponding to the activated MBS session on the side of the source base station may be acquired through an MB-PCF, and all QoS flows corresponding to the activated MBS session are established on a PDU session associated with the MBS session, thereby simplifying a procedure of establishing a QoS flow on a PDU session associated with an MBS session by an SMF. All the QoS flows corresponding to the activated MBS session may include one or more QoS flows. In another aspect, this mode has minimal modification to a 5G system and implements switching of UE from an activated MBS session to a unicast PDU session during handover of the UE between a source base station supporting an MBS and a target base station not supporting an MBS.

The description of the PDU session establishment procedure in the embodiment in FIG. 6 is only about a scenario in which an MBS session has been activated before handover. When or in response to a determination that the MBS session has not been activated before the handover from a source base station to a target base station, in step 7*b* in the embodiment in FIG. 6, the SMF transmits the Npcf_SMPolicyControl_Create (or Npcf_SMPolicyControl_Get or Npcf_MBSMPolicyControl_Get) request message, that is, the second session management policy control obtaining request message, to the MB-PCF corresponding to the MBS session. That is, the second session management policy control obtaining request message may be any one of the second session management policy control create request message, the second session management policy control get request message, the second multicast broadcast session management policy control get request message, and the like. The second session management policy control obtaining request message carries the MBS session identity, the S-NSSAI, the DNN, and the data set identity indicating policy data.

In addition, in step 7c in FIG. 6, the MB-PCF transmits the Npcf_SMPolicyControl_Create (or Npcf_SMPolicyControl_Get or Npcf_MBSMPolicyControl_Get) response message to the SMF in response to the second session management policy control obtaining request message in the step 7b in FIG. 6. That is, the second session management policy control obtaining response message may be any one of the second session management policy control create response message, the second session management policy control get response message, the second multicast broadcast session management policy control get response message, and the like. The second session management policy control obtaining response message does not carry all policy rule information corresponding to the activated MBS session and does not carry the MB-UPF transport information (the transport layer IP multicast address and the C-TEID). According to this, the SMF may determine that the MBS session has not been activated at this time. Therefore, when or in response to a determination that an MBS session has not been activated before the handover, a QoS flow corresponding to an MBS session has not been established in the PDU session establishment procedure in FIG. 6.

In addition, in the step 9 in FIG. 6, the SMF transmits Namf_Communication_N1N2MessageTransfer (a second communication N1N2 message transfer message) to the AMF. Because all QoS flow information corresponding to the activated MBS session has not been acquired, in step 9 in FIG. 6, the SMF has not established one or more QoS flows corresponding to an MBS multicast/broadcast session on a PDU session.

A PDU session has been established on a side of a target RAN or a target NG-RAN by using the method in the embodiment shown in FIG. 6, and no QoS flow related to an MBS session is established in the embodiment in FIG. 6. In the embodiment in FIG. 7, after UE is successfully handed over from a source base station to a target base station, when or in response to a determination that an MBS session established on a side of the source base station to which the UE is connected before the handover is activated after the handover, an SMF triggers a procedure of modifying an established PDU session (a PDU session notification procedure). As the UE performs the triggered PDU session modification procedure, the SMF acquires all policy rule information corresponding to the activated MBS session from an MB-PCF, so that the SMF can establish all QoS flows corresponding to the activated MBS session on a PDU session, thereby implementing the continuity of data transfer of an MBS service.

FIG. 7 is a schematic diagram of a process of triggering modification of a PDU session on a side of a target NG-RAN or target RAN according to an embodiment of the present disclosure.

In step 1 FIG. 7, after a PDU session has been established on the side of the target RAN or the target NG-RAN, an MBS session is activated.

In step 1a in FIG. 7, the MB-PCF transmits an Npcf_SMPolicyControl_UpdateNotify (or Npcf_MBSMPolicyControl_UpdateNotify, not shown in the figure) request message, that is, a first session management policy control update notification request message (or a first multicast broadcast session management policy control update notification request message), to the SMF. The first session management policy control update notification request message (or the first multicast broadcast session management policy control update notification request message) includes all policy rule information corresponding to the activated MBS session.

In step 1b in FIG. 7, the SMF receives an Npcf_SMPolicyControl_UpdateNotify (or Npcf_MBSMPolicyControl_UpdateNotify) request message from the MB-PCF, and in response to the received Npcf_SMPolicyControl_UpdateNotify (or Npcf_MBSMPolicyControl_UpdateNotify) request message, the SMF returns an Npcf_SMPolicyControl_UpdateNotify (or Npcf_MBSMPolicyControl_UpdateNotify) response message, that is, a first session management policy control update notification response message (or a first multicast broadcast session management policy control update notification response message), to the MB-PCF.

In step 2 in FIG. 7, the SMF initiates a session management (SM) policy association modification of the PDU session to the UE-PCF.

When or in response to a determination that the UE-PCF is deployed and a dynamic policy is used, the SMF triggers SM policy association modification (the SMF initiated SM Policy Association Modification). The SMF provides the UE-PCF with QoS information (Packet Filter, 5QI, ARP, and the like) of service flows of the MBS session provided by the MB-SMF, and requests the UE-PCF to check whether the QoS information of these MBS session service flows satisfy policy rules of a user and a network. The UE-PCF delivers new authorized policy rules according to policies of the user and the network, that is, the QoS information (Packet Filter, 5QI, ARP, and the like) of the service flows of each MBS session. Even if no modification is made to QoS information, the UE-PCF may still transmit the QoS information of the service flows of the MBS session provided by the SMF to the rule to the SMF again.

The SMF generates the QoS flows according to the policy information provided by the UE-PCF.

In step 3a in FIG. 7, the SMF transmits an N4 session establishment/modification request (N4 Session Establishment/Modification Request) message to the UPF. One or more N4 rules corresponding to the QoS flows are transmitted to the UPF. For each QoS flow, a plurality of N4 rules may be provided.

In step 3b in FIG. 7, the UPF transmits an N4 session establishment/modification response (N4 Session Establishment/Modification Response) message to the SMF.

In step 4 in FIG. 7, the SMF transmits Namf_Communication_N1N2MessageTransfer (that is, a third communication N1N2 message transfer message) to the AMF. The SMF requests the AMF to transfer a message on the N1 interface and a message on the N2 interface. The SMF wants the AMF to respectively forward related information related to the SM to the UE and the target NG-RAN.

In certain embodiment(s), the SMF triggers Namf_Communication_N1N2MessageTransfer ([N2 SM information] (PDU session ID, QFI(s), QoS Profile(s), [Alternative QoS Profile(s)], Session-AMBR, [CN Tunnel Info(s)], QoS Monitoring indication, QoS Monitoring reporting frequency, [TSCAI(s)]), N1 SM container (PDU session Modification Command (PDU session ID, QoS rule(s), QoS flow level QoS parameters if desired for the QoS flow(s) associated with the QoS rule(s), QoS rule operation and QoS flow level QoS parameters operation, Session-AMBR))).

PDU session ID in Namf_Communication_N1N2MessageTransfer allows the AMF to learn which session of the UE the AMF is to provide a Transfer service to.

The N2 SM information is provided to the target NG-RAN, the main content of which includes: PDU Session ID, QFI(s), QoS Profile(s), core network tunnel information (CN Tunnel Info), Session-Aggregate Maximum Bit Rate (Session-AMBR), and PDU Session Type. QoS Profile(s) is used for the configuration of a plurality of QoS flows of one session by the target NG-RAN; and CN Tunnel Info is used for identifying a node on a UPF side of an N3 interface of the session.

N1 SM container is provided for the UE and is one SM message, that is, Session Established Accept, of which the main content includes: QoS Rule(s), S-NSSAI(s), DNN, an IP address, and Session-AMBR. QoS Rule(s) is used for the configuration of a plurality of QoS flows of one session by the UE; and the IP address is used for data routing of the UE from a UPF egress.

QoS Profile(s) and QoS Rule(s) discussed here refer to a QoS Profile and a QoS Rule corresponding to each QoS Flow. When or in response to a determination that a plurality of QoS flows are provided, one message includes a QoS Profile and a QoS Rule corresponding to each QoS flow. A plurality of QoS flows of one session may be configured at once in this manner in 5G, thereby greatly improving the signaling efficiency. Each QoS flow and parameters of the QoS flow respectively correspond to an MBS QoS flow corresponding to an MBS session and parameters of the MBS session. That is, the SMF respectively maps each MBS QoS flow corresponding to the MBS session and parameters of the MBS QoS flow to one QoS flow of this PDU session and parameters of the QoS flow.

In step 5 in FIG. 7, the AMF transmits an N2 message to the target RAN. The target RAN is instructed to establish the QoS flows.

In step 6 in FIG. 7, the UE transmits AN-specific resource modification transfer (including a PDU session modification command/acknowledgment, and a radio specific resource modification message, for example, an RRC Reconfiguration message, to establish a data radio bearer (DRB) for transferring each QoS flow) to the target RAN.

In step 7 in FIG. 7, the target RAN transmits an N2 message to the AMF, to acknowledge that radio resources corresponding to the QoS flows have been allocated.

In step 8a in FIG. 7, the AMF transmits an Nsmf_PDUSession_UpdateSMContext request message, that is, a PDU session update session management context request message, to an SMF.

In step 8b in FIG. 7, the SMF transmits an Nsmf_PDUSession_UpdateSMContext response message, that is, a PDU session update session management context request, to the AMF in response to the Nsmf_PDUSession_UpdateSMContext request message.

In step 9a in FIG. 7, the SMF transmits an N4 session modification request message to the UPF.

In step 9b in FIG. 7, the UPF returns an N4 session modification response message to the SMF in response to the N4 session modification request message.

In step 10 in FIG. 7, the UE transmits a PDU session modification command acknowledgment (PDU session Modification Command Ack) to the target RAN.

In step 11 in FIG. 7, the target RAN transmits N2 NAS uplink transfer (N2 NAS uplink transfer) to the AMF.

In step 12a in FIG. 7, the AMF transmits an Nsmf_PDUSession_UpdateSMContext request message to the SMF.

In step 12b in FIG. 7, the SMF transmits an Nsmf_PDUSession_UpdateSMContext response message to the AMF in response to the Nsmf_PDUSession_UpdateSMContext request message.

In step 13a in FIG. 7, the SMF transmits an N4 session modification request message to the UPF.

In step 13b in FIG. 7, the UPF transmits an N4 session modification response message to the SMF in response to the N4 session modification request message.

In step 14 in FIG. 7, the SMF triggers SM policy association modification.

In the method for implementing multicast broadcast service handover provided in the embodiments of the present disclosure, in one aspect, when or in response to a determination that UE is handed over from a source base station supporting an MBS to a target base station not supporting an MBS and an MBS session established on a side of the source base station has not been activated, after the UE is handed over from the source base station supporting an MBS to the target base station not supporting an MBS, it is triggered to establish a PDU session on the side of the target base station, and after the MBS session is activated, in a modification procedure of the PDU session, all policy rule information corresponding to the activated MBS session is transferred to an SMF through an MB-PCF, so that the SMF may establish all QoS flows corresponding to the activated MBS session on the PDU session associated with the MBS session, thereby simplifying a procedure of establishing QoS flow information corresponding to the MBS session by the SMF. In another aspect, this mode has minimal modification to a 5G system and implements switching of UE from an MBS session to a unicast PDU session during handover of the UE between a source base station supporting an MBS and a target base station not supporting an MBS. In addition, in the solutions provided in the embodiments of the present disclosure, even if a transfer plane of an MBS session of UE is not established, the UE supports the establishment of a unicast PDU session in an asynchronous manner after the UE is handed over to a target base station not supporting an MBS.

In addition, a PDU session associated with an MBS session is established only after UE is handed over to a target base station in the embodiments of the present disclosure. Therefore, a PDU session does not need to be associated during the establishment of an MBS session, so that resources of a PDU session are saved and the continuity of an MBS service can be kept. In certain existing art, before the handover of UE, an MBS session is associated with one PDU session, the PDU session is handed over to a target cell or a target RAN, and service data corresponding to the MBS session is transferred through the PDU session. However, UE does not learn beforehand when handover is to occur (for example, handover is triggered by a 5G network). Therefore, to support handover that may occur at any time, one PDU session may be established as soon as one MBS session is activated, and the MBS session may be associated with the PDU session before the UE is handed over to a target RAN. This causes a waste of a lot of resources because the UE may be handed over to a target base station not supporting an MBS or may be handed over to a target base station not supporting an MBS after a long time, for example, two hours.

The method provided in the embodiments of the present disclosure may further adapt to a scenario in which UE has established an MBS session on a side of a source base station before being handed over from the source base station to a target base station, a PDU session has been established, and the PDU session has been associated with the MBS session before the handover.

In the embodiments of the present disclosure, a UDM corresponding to an MBS session such as an MBS multicast/broadcast session is referred to as a multicast broadcast unified data manager (MB-UDM).

In the embodiments, before the SMF transmits the Npcf_SMPolicyControl_Create (or Npcf_SMPolicyControl_Get or Npcf_MBSMPolicyControl_Get) request message to the MB-PCF, the SMF may first perform a discovery procedure of an MB-PCF. FIG. 8 and FIG. 9 provide two different discovery procedures.

Figure 8:
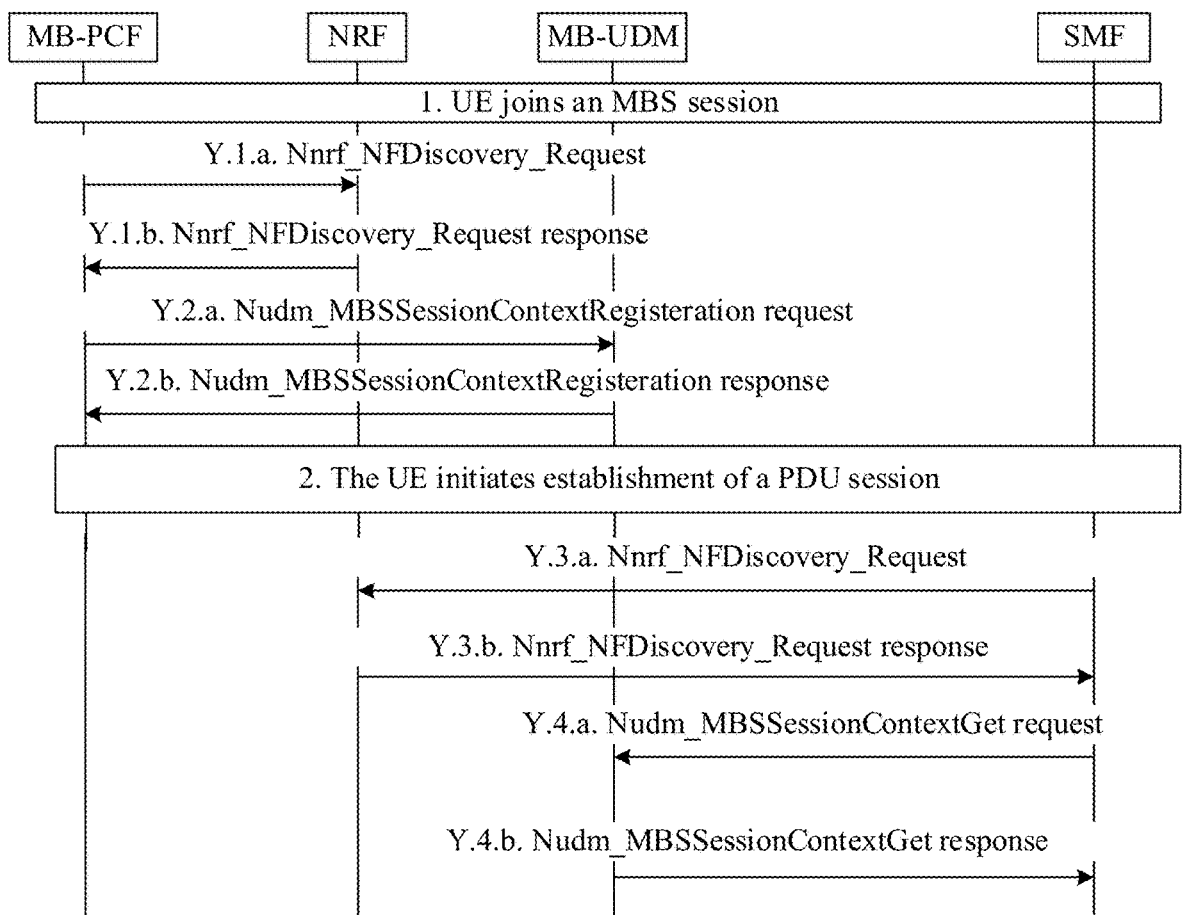
FIG. 8 is a schematic diagram of an MB-PCF discovery procedure according to certain embodiment(s) of the present disclosure.

FIG. 8 is a schematic diagram of an MB-PCF discovery procedure according to an embodiment of the present disclosure.

In step 1 in FIG. 8, the UE has joined one MBS multicast/broadcast session, and the MBS session has been established.

In step Y.1.a in FIG. 8, the MB-PCF transmits an Nnrf_NFDiscovery Request message (a third NF discovery request message) to an NRF, the Nnrf_NFDiscovery Request message carrying an MBS session ID and an NF type, the MBS session ID indicating an MBS multicast/broadcast session ID, the NF type indicating an MBS UDM.

In step Y.1.b in FIG. 8, after receiving the Nnrf_NFDiscovery Request message, the NRF finds a corresponding MB-UDM ID according to the MBS multicast/broadcast session ID carried in the Nnrf_NFDiscovery Request message and the NF type indicating the MBS UDM, and returns an Nnrf_NFDiscovery Request response message (a third NF discovery request response message) to the MB-PCF, the Nnrf_NFDiscovery Request response message carrying the MB-UDM ID.

In step Y.2.a in FIG. 8, after receiving the Nnrf_NFDiscovery Request response message, the MB-PCF may transmit an Nudm_MBSSessionContextRegister request (an MBS session context register request message) to a corresponding MB-UDM according to the MB-UDM ID carried in the Nnrf_NFDiscovery response message, the Nudm_MBSSessionContextRegister request carrying the MBS session ID (indicating the MBS multicast/broadcast session ID) and an MB-PCF ID.

In step Y.2.b in FIG. 8, after receiving the Nudm_MBSSessionContextRegister request, the MB-UDM registers the MB-PCF in the MB-UDM, and returns an Nudm_MBSSessionContextRegister response, that is, an MBS session context register response message, to the MB-PCF.

A plurality of MBS sessions may be handed over to a target RAN (or different target RANs) not supporting an MBS, and corresponding MB-PCFs may also be different. Therefore, through the steps, a plurality of MB-PCFs may be registered with the MB-UDM.

In step 2 in FIG. 8, a PDU session may be established by using the method in the embodiment in FIG. 6 after handover.

In step Y.3.a in FIG. 8, the SMF transmits an Nnrf_NFDiscovery_Request message (a first NF discovery request message) to an NRF, the Nnrf_NFDiscovery_Request message carrying an MBS session ID indicating an MBS multicast/broadcast session ID and an NF type indicating an MBS UDM.

In step Y.3.b in FIG. 8, after receiving the Nnrf_NFDiscovery_Request message, the NRF finds a corresponding MB-UDM ID according to the MBS multicast/broadcast session ID carried in the Nnrf_NFDiscovery_Request message and the NF type indicating the MBS UDM, and returns an Nnrf_NFDiscovery_Request response message (a first NF discovery request response message) to the SMF, the Nnrf_NFDiscovery_Request response message carrying the MB-UDM ID.

In step Y.4.a in FIG. 8, after receiving the Nnrf_NFDiscovery_Request response message, the SMF may transmit an Nudm_MBSSessionContextGet request (an MBS session context get request message) to a corresponding MB-UDM according to the MB-UDM ID carried in the Nnrf_NFDiscovery_Request response message, the Nudm_MBSSessionContextGet request carrying the MBS session ID (indicating the MBS multicast/broadcast session ID), a Notification Correlation ID, and an MB-PCF ID.

A plurality of SMFs may be provided. For different SMFs, different PDU session modification procedures corresponding to the SMFs are performed. The Notification Correlation ID is used for the SMF to learn UE of which a PDU session corresponds to the message.

In step Y.4.b in FIG. 8, after receiving the Nudm_MBSSessionContextGet request message, the MB-UDM returns an Nudm_MBSSessionContextGet response message, that is, an MBS session context get response message, to the SMF, the Nudm_MBSSessionContextGet response message carrying the MBS session ID and the MB-PCF ID.

Figure 9:
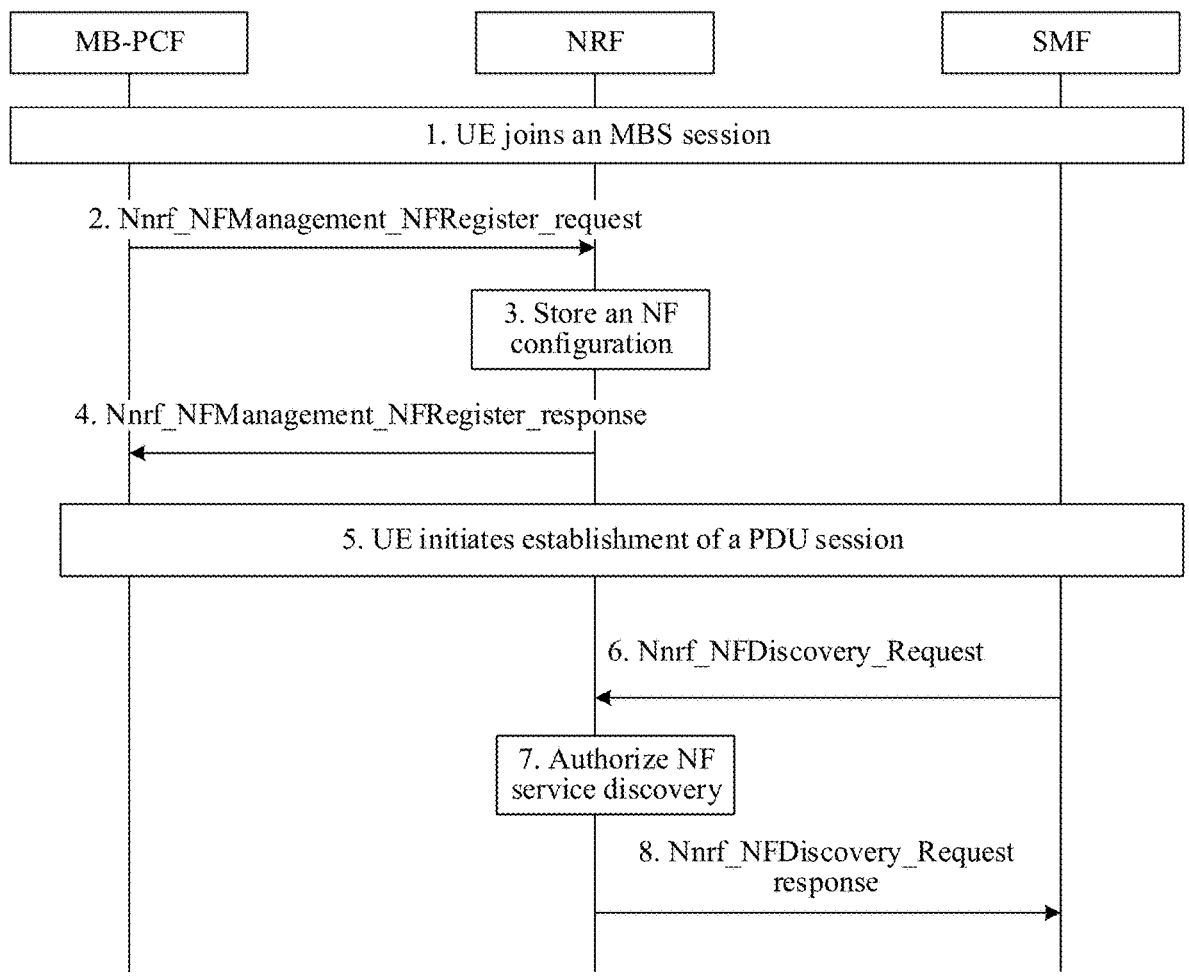
FIG. 9 is a schematic diagram of an MB-PCF discovery procedure according to certain embodiment(s) of the present disclosure.

FIG. 9 is a schematic diagram of an MB-PCF discovery procedure according to another embodiment of the present disclosure.

In step 1 in FIG. 9, the UE has joined one MB S multicast/broadcast session, and the MBS session has been established.

In step 2 in FIG. 9, the MB-PCF transmits an Nnrf_NFManagement_NFRegister request message (an NF management NF register request message) to the NRF, the Nnrf_NFManagement_NFRegister request message carrying the MBS session ID (indicating the MBS multicast/broadcast session ID) and the MB-PCF ID.

In step 3 in FIG. 9, after receiving the Nnrf_NFManagement_NFRegister request message, the NRF stores the NF configuration, that is, stores the MBS session ID and the MB-PCF ID in an associated manner in the NRF.

In step 4 in FIG. 9, the NRF transmits an Nnrf_NFManagement_NFRegister response message (an NF management NF register response message) to the MB-PCF in response to the Nnrf_NFManagement_NFRegister request message.

In step 5 in FIG. 9, a PDU session may be established by using the method in the embodiment in FIG. 6.

In step 6 in FIG. 9, the SMF transmits an Nnrf_NFDiscovery_Request message (a second NF discovery request message) to an NRF, the Nnrf_NFDiscovery_Request message carrying an MBS session ID indicating an MBS multicast/broadcast session ID and an NF type indicating an MBS PCF.

In step 7 in FIG. 9, after receiving the Nnrf_NFDiscovery_Request message, the NRF authorizes NF service discovery according to the MBS multicast/broadcast session ID carried in the Nnrf_NFDiscovery_Request message and the NF Type indicating an MBS PCF, and finds that an NF Type corresponding to the MBS multicast/broadcast session ID indicates an MB-PCF ID of the MB S PCF.

In step 8 in FIG. 9, the NRF returns an Nnrf_NFDiscovery_Request response message (that is, a second NF discovery request response message) to the SMF, the Nnrf_NFDiscovery_Request response message carrying the MB-PCF ID.

Figure 10:
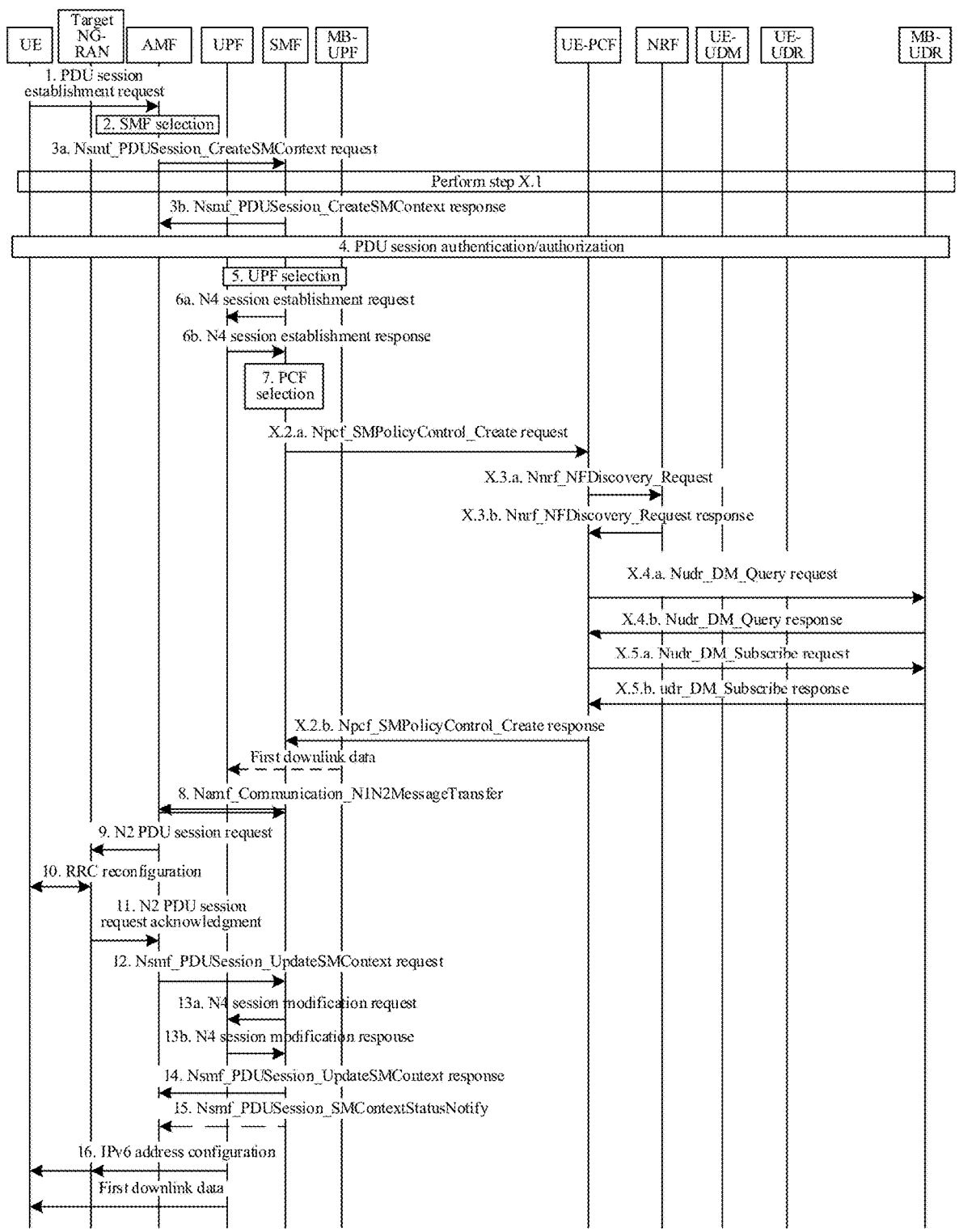
FIG. 10 is a schematic diagram of a process of triggering establishment of a PDU session on a side of a target NG-RAN according to certain embodiment(s) of the present disclosure.

In the embodiment in FIG. 10, it is assumed that the source base station to which the UE is connected before the handover supports an MBS, the UE has established an MBS session at the source base station before being handed over to the target base station, the MBS session has been activated before the handover, and at the same time the UE has not established a PDU session associated with the MBS session before the handover. FIG. 10 is a schematic diagram of a process of triggering establishment of a PDU session on a side of a target NG-RAN according to an embodiment of the present disclosure.

Step 1, step 2, step 3a, step X.1, step 3b, step 4, step 5, step 6a, and step 6b in FIG. 10 are respectively the same as step 1, step 2, step 3a, step X.1, step 3b, step 4, step 5, step 6a, and step 6b in the embodiment in FIG. 6.

In step 7 in FIG. 10, it is assumed that the PCF selected by the SMF is a UE-PCF rather than an MB-PCF.

Step X.2 in FIG. 10 may include the following steps X.2.a and X.2.b.

In step X.2.a in FIG. 10, the SMF transmits an Npcf_SM-PolicyControl_Create (or Npcf_SMPolicyControl_Get or Npcf_MBSMPolicyControl_Get, not shown in the figure) request message to the UE-PCF selected in step 7. That is, the third session management policy control obtaining request message may be any one of the third session management policy control create request message, the third session management policy control get request message, the third multicast broadcast session management policy control get request message, and the like. The third session management policy control obtaining request message carries the MBS session identity, the S-NSSAI, the DNN, and the data set identity indicating policy data, so that the UE-PCF acquires all policy rule information corresponding to the activated MBS session and the MB-UPF transport information (the transport layer IP multicast address and the C-TEID) from the MB-UDR according to the MBS session identity and the data set identity indicating policy data.

Step X.3 in FIG. 10 may include the following steps X.3.a and X.3.b.

In step X.3.a in FIG. 10, after receiving the Npcf_SM-PolicyControl_Create (or Npcf_SMPolicyControl_Get or Npcf_MBSMPolicyControl_Get) request message from the SMF, the UE-PCF transmits an Nnrf_NFDiscovery_Request message (a fourth NF discovery request message) to the NRF, the Nnrf_NFDiscovery_Request message carrying the MBS session ID and the NF type indicating an MBS UDR.

In step X.3.b in FIG. 10, after receiving the Nnrf_NF-Discovery_Request message from the UE-PCF, the NRF finds an MB-UDR ID corresponding to the MBS session ID according to the carried MBS session ID and the NF type indicating an MBS UDR, and returns an Nnrf_NFDiscovery_Request response message, that is, a fourth NF discovery request response message to the UE-PCF, the Nnrf_NF-Discovery_Request response message carrying the MB-UDR ID.

Step X.4 in FIG. 10 may include the following steps X.4.a and X.4.b.

In step X.4.a in FIG. 10, the UE-PCF receives the Nnrf_NFDiscovery_Request response message returned by the NRF, acquires the MB-UDR ID, and transmits an Nudr_DM_Query request message (a data management query request message) to an MB-UDR corresponding to the MB-UDR ID, the Nudr_DM_Query request message carrying data set identity indicating policy data, data subset identity (Data Subset ID) indicating an MBS session policy, a data key indicating an MBS session ID, and a data subkey indicating S-NSSAI and a DNN.

In step X.4.b in FIG. 10, the MB-UDR receives the Nudr_DM_Query request message transmitted by the UE-PCF, and returns an Nudr_DM_Query response message, that is, a data management query response message to the UE-PCF, the Nudr_DM_Query response message carrying a policy rule list corresponding to the MBS session identity and MB-UPF transport information (an transport layer IP multicast address and a C-TEID).

In step X.5.a in FIG. 10, after receiving the Nudr_DM_Query response message, the UE-PCF transmits an Nudr_DM_Subscribe message (a data management subscribe message) to the MB-UDR, the Nudr_DM_Subscribe message carrying a data set identity indicating policy data, a data subset identity (Data Subset ID) indicating an MBS session policy, a data key indicating an MBS session ID, a data subkey (Data Subkey) indicating S-NSSAI and a DNN, a Notification Correlation ID, and a UE-PCF ID.

In step X.5.b in FIG. 10, the MB-UDR returns an Nudm_SDM_Subscribe response message (data management subscribe response message) to the UE-PCF.

In step X.2.b in FIG. 10, the UE-PCF receives the Nudr_DM_Query response message returned by the MB-UDR, and returns an Npcf_SMPolicyControl_Create (or Npcf_SMPolicyControl_Get or Npcf_MBSMPolicyControl_Get) response message to the SMF in response to the Npcf_SMPolicyControl_Create request message received from the SMF. That is, third session management policy control obtaining response message may be any one of the third session management policy control create response message, the third session management policy control get response message, the third multicast broadcast session management policy control get response message, and the like. The third session management policy control obtaining response message carries all policy rule information corresponding to the activated MBS session and the MB-UPF transport information (the transport layer IP multicast address and the C-TEID).

The SMF acquires MB-UPF transport information (the transport layer IP multicast address and the C-TEID) from the UE-PCF and provides the MB-UPF transport information to the UPF. The UPF establishes a user plane connection to the MB-UPF. For example, the UPF adds a transport layer IP multicast address allocated by the MB-UPF. Through the transport layer IP multicast address and the common tunnel endpoint identity (TEID) (C-TEID), the UPF starts to receive downlink data transmitted by the MB-UPF. For the UPF, the downlink data is the first downlink data received by the UPF.

In step 8 in FIG. 10, the SMF transmits Namf_Communication_N1N2MessageTransfer (that is, a fourth communication N1N2 message transfer message) to the AMF. The SMF requests the AMF to transfer a message on the N1 interface and a message on the N2 interface. The SMF wants the AMF to respectively forward related information related to the SM to the UE and the target NG-RAN. The SMF establishes one or more QoS flows corresponding to an MBS multicast/broadcast session on a PDU session according to the QoS information in a dynamic policy Rule provided by the PCF.

In certain embodiment(s), the SMF triggers Namf_Communication_N1N2MessageTransfer ([N2 SM information] (PDU session ID, QFI(s), QoS Profile(s), [Alternative QoS Profile(s)], Session-AMBR, [CN Tunnel Info(s)], QoS Monitoring indication, QoS Monitoring reporting frequency, [TSCAI(s)]), N1 SM container (PDU session Modification Command (PDU session ID, QoS rule(s), QoS flow level QoS parameters if desired for the QoS flow(s) associated with the QoS rule(s), QoS rule operation and QoS flow level QoS parameters operation, Session-AMBR))).

PDU session ID in Namf_Communication_N1N2MessageTransfer allows the AMF to learn which session of the UE the AMF is to provide a Transfer service to.

The N2 SM information is provided to the target NG-RAN, the main content of which includes: PDU Session ID, QFI(s), QoS Profile(s), core network tunnel information (CN Tunnel Info), Session-Aggregate Maximum Bit Rate (Session-AMBR), and PDU Session Type. QoS Profile(s) is used for the configuration of a plurality of QoS flows of one session by the target NG-RAN; and CN Tunnel Info is used for identifying a node on a UPF side of an N3 interface of the session.

N1 SM container is provided for the UE and is one SM message, that is, Session Established Accept, of which the main content includes: QoS Rule(s), S-NSSAI(s), DNN, an IP address, and Session-AMBR. QoS Rule(s) is used for the configuration of a plurality of QoS flows of one session by the UE; and the IP address is used for data routing of the UE from a UPF egress.

QoS Profile(s) and QoS Rule(s) discussed here refer to a QoS Profile and a QoS Rule corresponding to each QoS Flow. When or in response to a determination that a plurality of QoS flows are provided, one message includes a QoS Profile and a QoS Rule corresponding to each QoS flow. A plurality of QoS flows of one session may be configured at once in this manner in 5G, thereby greatly improving the signaling efficiency.

In step 9 in FIG. 10, the AMF transmits an N2 PDU session request (N2 PDU Session Request) message to the target NG-RAN.

In certain embodiment(s), the message is N2 PDU session Request (N2 SM information, the NAS message (PDU session ID, N1 SM container (PDU session Establishment Accept)), [CN assisted RAN parameters tuning]). That is, the N2 PDU session Request transmitted to the target NG-RAN by the AMF includes the NAS message and the N2 SM information received from the SMF. The NAS message includes the PDU session ID and PDU session Establishment Accept to be transmitted to the UE.

In step 10 in FIG. 10, radio resource control (RRC) reconfiguration is performed between the target NG-RAN and the UE.

In step 11 in FIG. 10, the target NG-RAN transmits an N2 PDU session request acknowledgment (N2 PDU Session Request Ack) message to the AMF.

In step 12 in FIG. 10, the AMF transmits an Nsmf_PDUSession_UpdateSMContext request message to the SMF.

The AMF transmits an Nsmf_PDUSession_UpdateSMContext Request (SM Context ID, N2 SM information, Request Type) to the SMF. The AMF delivers N2 SM information to the SMF by using an updateSM context service provided by the SMF. Some parameters related to QoS flow(s) are provided in the N2 SM information, and the SMF may update the content of session context in time.

In step 13*a* in FIG. 10, the SMF transmits an N4 session modification request (N4 Session Modification Request) message to the UPF, and intends to transfer AN Tunnel Info (access network tunnel information) from the target NG-RAN to put through a downlink tunnel of N3, and eventually inform the UPF of a downlink forwarding rule. One parameter is provided in the N2 SM information: AN Tunnel Info, identifying a node on the side of the target NG-RAN of a session at an N3 interface. Once AN Tunnel Info is delivered by the SMF to the UPF, a downlink tunnel of the session on the N3 interface is put through.

In step 13*b* in FIG. 10, the UPF returns an N4 session modification response (N4 Session Modification Response) message to the SMF in response to the N4 Session Modification Request message.

In step 14 in FIG. 10, the SMF returns an Nsmf_PDUSession_UpdateSMContext response message to the AMF in response to the Nsmf_PDUSession_UpdateSMContext request message.

In step 15 in FIG. 10, the SMF transmits an Nsmf_PDUSession_SMContextStatusNotify message to the AMF.

In step 18 in FIG. 10, the UPF transmits an IPv6 address configuration to the target NG-RAN, and the target NG-RAN transmits the IPv6 address configuration to the UE. The UPF transmits the first piece of downlink data to the UE.

In the method for implementing multicast broadcast service handover provided in the embodiments of the present disclosure, in one aspect, when or in response to a determination that a source base station of UE before handover has activated an MBS session and has not established a PDU session associated with the MBS session, after the UE is handed over from the source base station supporting an MBS to a target base station not supporting an MB, it is triggered to establish one PDU session on a side of the target base station not supporting an MBS, so that all policy rule information corresponding to the activated MBS session on the side of the source base station may be acquired from an MB-UDR through a UE-PCF and transmitted to an SMF, so that the SMF establishes all QoS flows corresponding to the activated MBS session on a PDU session associated with the MBS session. All the QoS flows corresponding to the activated MBS session may include one or more QoS flows. In another aspect, this mode has minimal modification to a 5G system and implements switching of UE from an activated MBS session to a unicast PDU session during handover of the UE between a source base station supporting an MBS and a target base station not supporting an MBS.

Figure 11:
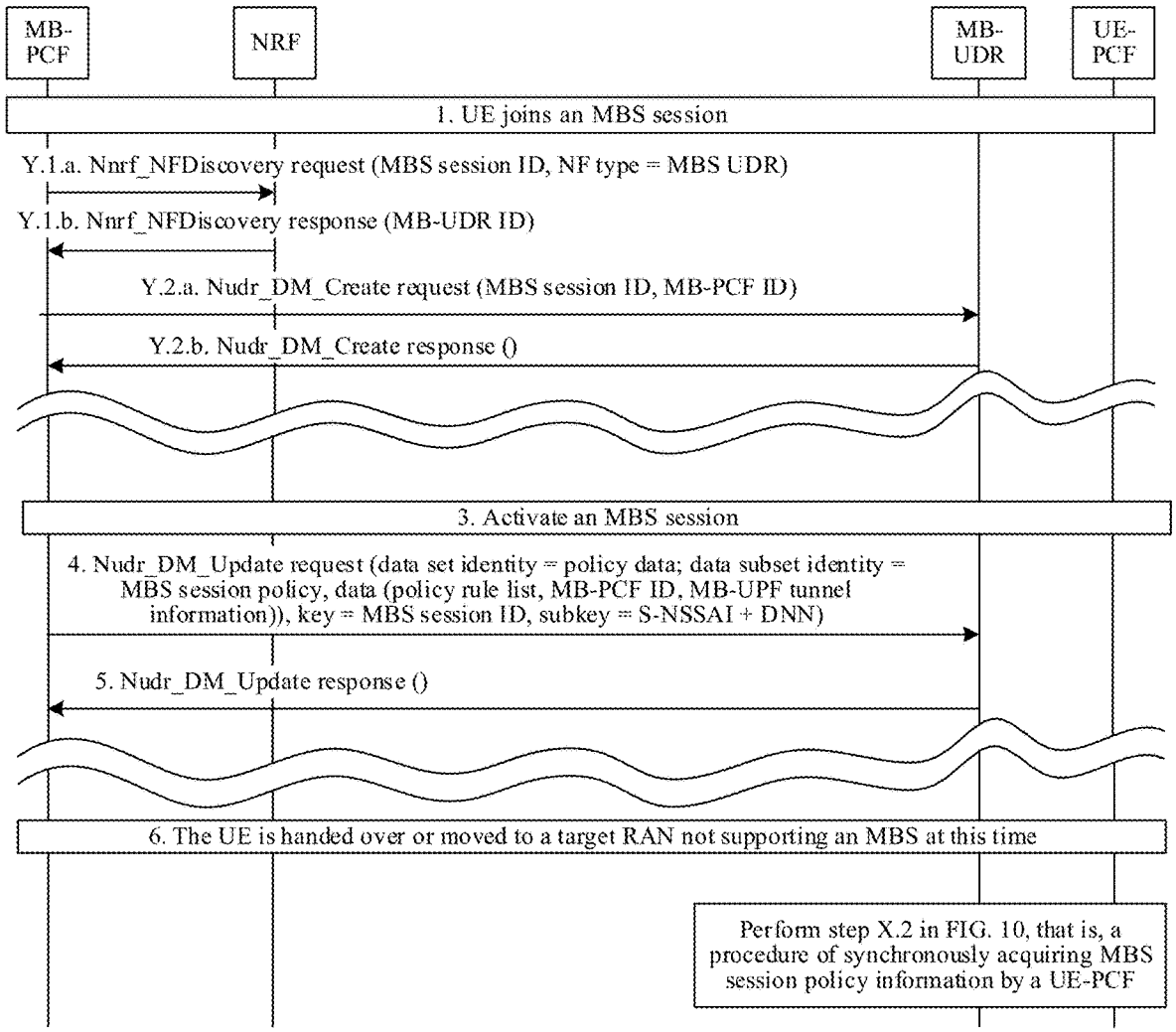
FIG. 11 is a schematic diagram of storing MBS session policy information in an MB-UDR by an MB-PCF and acquiring the MBS session policy information from the MB-UDR by a UE-PCF according to certain embodiment(s) of the present disclosure.

FIG. 11 is a schematic diagram of storing MBS session policy information in an MB-UDR by an MB-PCF and acquiring the MBS session policy information from the MB-UDR by a UE-PCF according to an embodiment of the present disclosure.

In step X.4 in the embodiment in FIG. 10, the UE-PCF acquires the MBS session policy information from the MB-UDR. Therefore, in an activation procedure of an MBS session such as an MBS multicast/broadcast session in the embodiment in FIG. 10, related information is stored in a dedicated UDR, which is referred to as an MB-UDR.

In step 1 in FIG. 11, the UE has joined an MBS multicast/broadcast session. That is, before handover, the UE has established an MBS session at a source base station.

In step Y.1.*a*, the MB-PCF transmits an Nnrf_NFDiscovery_Request message, that is, a fifth NF discovery request message, to an NRF, the Nnrf_NFDiscovery_Request message carrying an MBS session ID indicating an MBS multicast/broadcast session ID and an NF type indicating an MBS UDR.

In step Y.1.*b* in FIG. 11, after receiving Nnrf_NFDiscovery_Request, the NRF finds a corresponding MB-UDR ID according to the MBS multicast/broadcast session ID carried in Nnrf_NFDiscovery_Request and the NF type indicating the MBS UDR, and returns an Nnrf_NFDiscovery_Request response message, that is, a fifth NF discovery request response message, to the MB-PCF, the Nnrf_NFDiscovery_Request response message carrying the MB-UDR ID.

In step Y.2.*a* in FIG. 11, after receiving the Nnrf_NFDiscovery_Request response message, the MB-PCF may transmit an Nudr_DM_Create request message (a data management request message) to a corresponding MB-UDR according to the MB-UDR ID carried in the Nnrf_NFDiscovery_Request response message, the Nudr_DM_Create request message carrying a data set identity indicating policy data, a data subset identity indicating an MBS session policy, data including the policy rule list corresponding to the MBS session identity and the MB-PCF identity, a data key indicating an MBS session identity, and a data subkey indicating S-NSSAI and a DNN, so that the MB-UDR stores the policy rule list corresponding to the MBS session identity, the MB-UPF transport information (the transport layer IP multicast address and the C-TEID), and the MB-PCF identity in the MB-UDR in an associated manner.

In step Y.2.*b* in FIG. 11, after receiving the Nudr_DM_Create request message, the MB-UDR makes the MB-PCF subscribe to the MB-UDR, and returns an Nudr_DM_Create response message, that is, a data management update response message, to the MB-PCF.

Delay wavy lines between step Y.2.*b* and step 3 in FIG. 11 are used for representing that a procedure before step 3 and step 3 and all procedures following step 3 may not be performed together immediately. That is, step 3 may be performed some time after step Y.2.*b* has been performed.

In step 3 in FIG. 11, the 5G network activates an MBS session such as an MBS multicast/broadcast session corresponding to an MBS multicast/broadcast session ID, one or more QoS flows of the MBS session are established, and an MB-UPF is selected for the MBS session.

In step 4 in FIG. 11, after the MBS session is activated and the MB-UPF is selected for the MBS session, the multicast broadcast-policy control function (MB-PCF) transmits an Nudr_DM_Update request (data management update) message to the MB-UDR, the Nudr_DM_Update request message carrying a data set identity indicating policy data, a data subset identity indicating an MBS session policy, data, a key indicating an MBS session ID, and a subkey indicating S-NSSAI and a DNN, the data further including the policy rule list, the MB-PCF ID, and the MB-UPF transport information (the transport layer IP multicast address and a common TEID (C-TEID)).

In step 5 in FIG. 11, after receiving the Nudr_DM_Update request message, the MB-UDR transmits an Nudr_DM_Update response message to the MB-PCF.

Delay wavy lines between step 5 and step 6 in FIG. 11 are used for representing that a procedure before step 6 and a procedure of step 6 may not be performed together immediately. That is, step 6 may be performed some time after step 5 has been performed.

In step 6 in FIG. 11, the UE is handed over from a source RAN supporting an MBS to a target RAN not supporting an MBS. Step X.2 (including steps in X.2) in the embodiment in FIG. 10 is performed between the MB-UDR and the UE-PCF. That is, the procedure of synchronously acquiring MBS session policy information in the embodiment in FIG. 10 is used.

The description of the PDU session establishment procedure in the embodiment in FIG. 10 is only about a scenario in which an MBS session has been activated before handover. When or in response to a determination that the MBS session has not been activated before the handover from a source base station to a target base station, in step X.2.*a* in the embodiment in FIG. 10, the SMF transmits the Npcf_SMPolicyControl_Create (or Npcf_SMPolicyControl_Get or Npcf_MBSMPolicyControl_Get) request message to the UE-PCF. That is, the fourth session management policy control obtaining request message may be any one of the fourth session management policy control create request message, the fourth session management policy control get request message, the fourth multicast broadcast session management policy control get request message, and the like. The fourth session management policy control obtaining request message carries the MBS session identity, the S-NSSAI, the DNN, and the data set identity indicating policy data.

In addition, in step X.4.*b* in FIG. 10, the MB-UDR receives the Nudr_DM_Query request message transmitted by the UE-PCF, and returns an Nudr_DM_Query response message to the UE-PCF. The Nudr_DM_Query response message does not carry all policy rule information corresponding to the activated MBS session, that is, does not carry the policy rule list corresponding to the MBS session identity.

In step X.2.*b* in FIG. 10, the UE-PCF receives the Nudr_DM_Query response message returned by the MB-UDR, and returns an Npcf_SMPolicyControl_Create (or Npcf_SMPolicyControl_Get or Npcf_MBSMPolicyControl_Get) response message to the SMF in response to the Npcf_SMPolicyControl_Create (or Npcf_SMPolicyControl_Get or Npcf_MBSMPolicyControl_Get) request message received from the SMF. That is, the fourth session management policy control obtaining response message may be any one of the fourth session management policy control create response message, the fourth session management policy control get response message, the fourth multicast broadcast session management policy control get response message and the like, and the Npcf_SMPolicyControl_Create (or Npcf_SMPolicyControl_Get or Npcf_MBSMPolicyControl_Get) response message does not carry all policy rule information corresponding to the activated MBS session.

In addition, in step 8 in FIG. 10, the SMF transmits Namf_Communication_N1N2MessageTransfer (a fifth communication N1N2 message transfer message) to the AMF. Because all QoS flow information corresponding to the activated MBS session has not been acquired, in step 8, the SMF has not established one or more QoS flows corresponding to an MBS multicast/broadcast session on a PDU session.

A PDU session has been established on a side of a target RAN or a target NG-RAN by using the method in the embodiment shown in FIG. 10, and no QoS flow related to an MBS session is established in the embodiment in FIG. 10. In the embodiment in FIG. 12, after UE is successfully handed over from a source base station to a target base station, when or in response to a determination that an MBS session established on a side of the source base station to which the UE is connected before the handover is activated after the handover, an SMF triggers a procedure of modifying an established PDU session (a PDU session notification procedure). As the UE performs the triggered PDU session modification procedure, the UE-PCF acquires all policy rule information corresponding to the activated MBS session from an MB-UDR, so that the SMF can establish all QoS flows corresponding to the activated MBS session on a PDU session, thereby implementing the continuity of data transfer of an MB S service.

Figure 12:
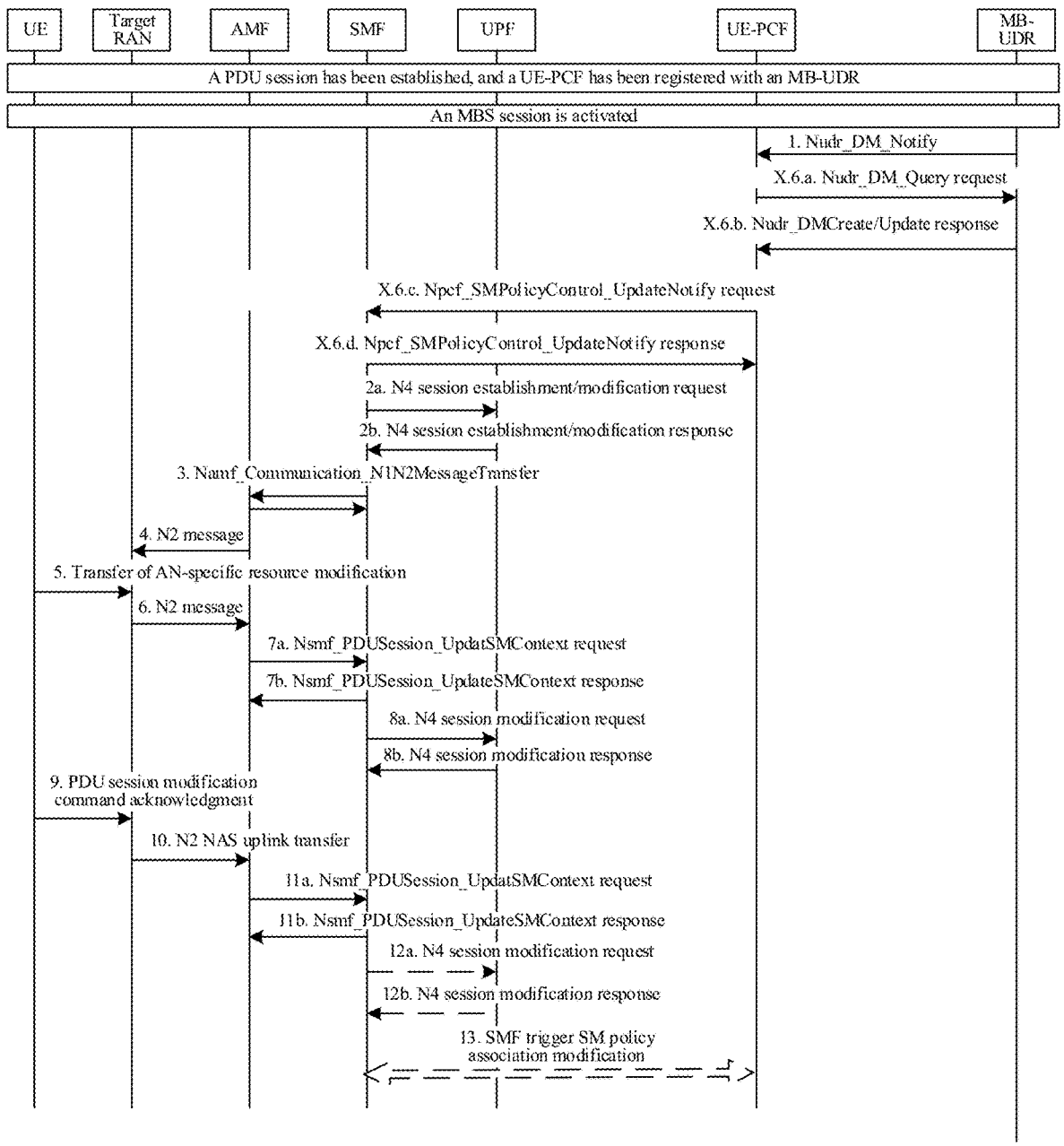
FIG. 12 is a schematic diagram of a process of triggering modification of a PDU session on a side of a target NG-RAN according to certain embodiment(s) of the present disclosure.

FIG. 12 is a schematic diagram of a process of triggering modification of a PDU session on a side of a target NG-RAN or target RAN according to an embodiment of the present disclosure.

Before step 1 in FIG. 12 is performed, after a PDU session has been established on the side of the target RAN or the target NG-RAN, an MBS session is activated.

In step 1 in FIG. 12, the MB-UDR transmits an Nudr_DM_Notify message to the UE-PCF, the Nudr_DM_Notify message carrying a data key indicating an MBS session ID, a data subkey indicating S-NSSAI and a DNN, a data set identity indicating policy data, and a notification association ID.

In step X.6.*a* in FIG. 12, after receiving the Nudr_DM_Notify message transmitted by the MB-UDR, the UE-PCF transmits an Nudr_DM_Query request message to the MB-UDR, the Nudr_DM_Query request message carrying the data key indicating the MBS session ID, the data set identity indicating policy data, and a data subset identity indicating MBS session policy data.

In step X.6.*b* in FIG. 12, after receiving the Nudr_DM_Query request message transmitted by the UE-PCF, the MB-UDR returns an Nudr_DMCreate/Update response message to the UE-PCF. The Nudr_DMCreate/Update response message may carry a key indicating an MBS session ID, a type indicating MBSSessionInformation, and data. The data may further include an MB-SMF ID, an MB-UPF ID, an MB-PCF ID, a TMGI, and a policy rule list.

In step X.6.*c* in FIG. 12, after receiving the Nudr_DM-Create/Update response message from the MB-UDR, the MB-PCF transmits an Npcf_SMPolicyControl_UpdateNotify (or Npcf_MBSMPolicyControl_UpdateNotify, not shown in the figure) request message, that is, a second session management policy control update notification request message (or a second multicast broadcast session management policy control update notification request message), to the SMF. The second session management policy control update notification request message (or the second multicast broadcast session management policy control update notification request message) carries the MBS session ID, the MB-SMF ID, the MB-UPF ID, the MB-PCF ID, the TMGI, and the policy rule list, that is, includes all policy rule information corresponding to the activated MBS session.

In step X.6.*d* in FIG. 12, after receiving the Npcf_SM-PolicyControl_UpdateNotify (or Npcf_MBSMPolicyControl_UpdateNotify) request message transmitted by the UE-PCF, the SMF returns an Npcf_SMPolicyControl_UpdateNotify (or Npcf_MBSMPolicyControl_UpdateNotify) response message, that is, the second session management policy control update notification response message (or the second multicast broadcast session management policy control update notification response message), to the UE-PCF.

In step 2*a* in FIG. 12, the SMF transmits an N4 session establishment/modification request (N4 Session Establishment/Modification Request) message to the UPF. One or more N4 rules corresponding to the QoS flows are transmitted to the UPF. For each QoS flow, a plurality of N4 rules may be provided.

In step 2*b* in FIG. 12, the UPF transmits an N4 session establishment/modification response (N4 Session Establishment/Modification Response) to the SMF.

In step 3 in FIG. 12, the SMF transmits Namf_Communication_N1N2MessageTransfer (that is, a sixth communication N1N2 message transfer message) to the AMF. The SMF requests the AMF to transfer a message on the N1 interface and a message on the N2 interface. The SMF wants the AMF to respectively forward related information related to the SM to the UE and the target NG-RAN.

In step 4 in FIG. 12, the AMF transmits an N2 message to the target RAN. The target RAN is instructed to establish the QoS flows.

In step 5 in FIG. 12, the UE transmits AN-specific resource modification transfer (including a PDU session modification command/acknowledgment, and a radio specific resource modification message, for example, an RRC Reconfiguration message, to establish a data radio bearer (DRB) for transferring each QoS flow) to the target RAN.

In step 6 in FIG. 12, the target RAN transmits an N2 message to the AMF, to acknowledge that radio resources corresponding to the QoS flows have been allocated.

In step 7*a* in FIG. 12, the AMF transmits an Nsmf_PDUSession_UpdateSMContext request message, that is, a PDU session update session management context request message, to an SMF In step 7*b* in FIG. 12, the SMF transmits an Nsmf_PDUSession_UpdateSMContext response message, that is, a PDU session update session management context request, to the AMF in response to the Nsmf_PDUSession_UpdateSMContext request message.

In step 8*a* in FIG. 12, the SMF transmits an N4 session modification request message to the UPF.

In step 8*b* in FIG. 12, the UPF returns an N4 session modification response message to the SMF in response to the N4 session modification request message.

In step 9 in FIG. 12, the UE transmits a PDU session modification command acknowledgment (PDU session Modification Command Ack) to the target RAN.

In step 10 in FIG. 12, the target RAN transmits N2 NAS uplink transfer (N2 NAS uplink transfer) to the AMF.

In step 11*a* in FIG. 12, the AMF transmits an Nsmf_PDUSession_UpdateSMContext request message to the SMF.

In step 11*b* in FIG. 12, the SMF transmits an Nsmf_PDUSession_UpdateSMContext response message to the AMF in response to the Nsmf_PDUSession_UpdateSMContext request message.

In step 12*a* in FIG. 12, the SMF transmits an N4 session modification request message to the UPF.

In step 12*b* in FIG. 12, the UPF transmits an N4 session modification response message to the SMF in response to the N4 session modification request message.

In step 13 in FIG. 12, the SMF triggers SM policy association modification.

Figure 13:
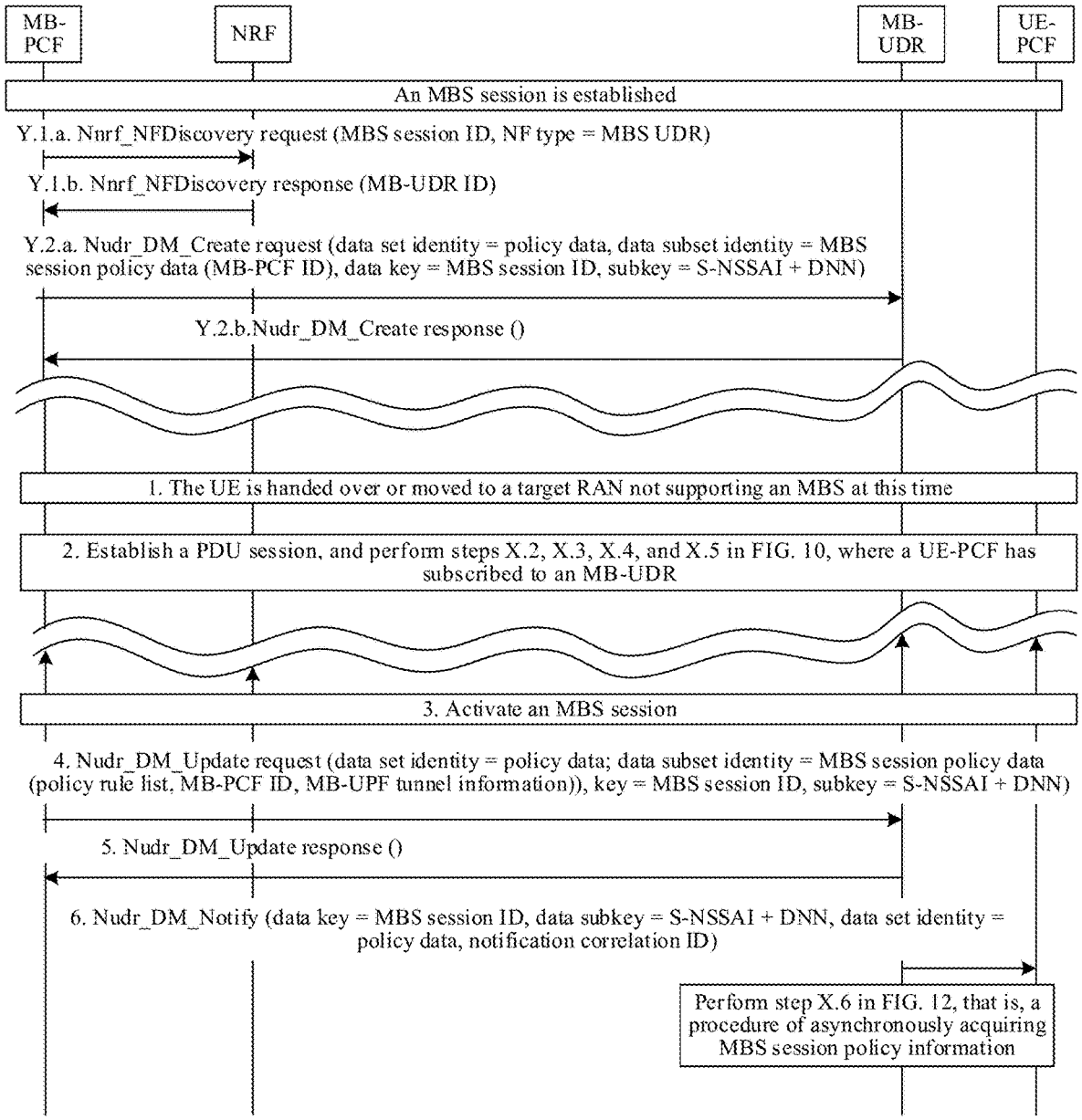
FIG. 13 is a schematic diagram of storing MBS session policy information in an MB-UDR by an MB-PCF and acquiring the MBS session policy information from the MB-UDR by a UE-PCF according to certain embodiment(s) of the present disclosure.

FIG. 13 is a schematic diagram of storing MBS session policy information in an MB-UDR by an MB-PCF and acquiring the MBS session policy information from the MB-UDR by a UE-PCF according to another embodiment of the present disclosure.

In step X.3 in the embodiment in FIG. 12, the UE-PCF may acquire the MBS session policy information from the MB-UDR. Therefore, in an activation procedure of an MBS session such as an MBS multicast/broadcast session in the embodiment in FIG. 13, related information is stored in a dedicated UDR, which is referred to as an MB-UDR.

In step 1 in the embodiment in FIG. 13, the UE has joined one MBS multicast/broadcast session, and the MBS session has been established and has not been activated.

In step Y.1.*a* in FIG. 13, the MB-PCF transmits an Nnrf_NFDiscovery request message (a fifth NF discovery request message) to the NRF, the Nnrf_NFDiscovery request message carrying an MBS session ID indicating an MBS multicast/broadcast session ID and an NF Type indicating an MBS UDR.

In step Y.1.*b* in FIG. 13, after receiving the Nnrf_NFDiscovery request message, the NRF finds a corresponding MB-UDR ID according to the MBS multicast/broadcast session ID carried in the Nnrf_NFDiscovery request message and the NF type indicating the MBS UDR, and returns an Nnrf_NFDiscovery response message (a fifth NF discovery response message) to the MB-PCF, the Nnrf_NFDiscovery response message carrying the MB-UDR ID.

In step Y.2.*a* in FIG. 13, after receiving the Nnrf_NFDiscovery response message, the MB-PCF may transmit an Nudr_DM_Create request message (a data management create request message) to a corresponding MB-UDR according to the MB-UDR ID carried in the Nnrf_NFDiscovery response message, the Nudr_DM_Create request carrying the data set identity indicating policy data, the data subset identity indicating MBS session policy data, the data key indicating an MBS session ID, and the data subkey indicating S-NSSAI and a DNN. The MBS session policy data includes an MB-PCF ID.

In step Y.2.*b* in FIG. 13, after receiving the Nudr_DM_Create request message, the MB-UDR makes the MB-PCF subscribe to the MB-UDR, and returns an Nudr_DM_Create response message, that is, a data management create response message, to the MB-PCF.

A plurality of UEs may be handed over to a target RAN (or different target RANs) not supporting an MBS, different UEs respectively establish different PDU sessions, and corresponding MB-PCFs may also be different. Therefore, through the steps, a plurality of MB-PCFs may subscribe to the MB-UDR.

Delay wavy lines between step Y.2.*b* and step 1 in FIG. 13 are used for representing that a procedure before step 1 and step 1 and all procedures following step 1 may not be performed together immediately. That is, step 1 is performed some time after step Y.2.*b* has been performed, that is, the steps are asynchronous.

In step 1 in FIG. 13, the UE is handed over or moved to a target RAN not supporting an MBS. At this time, the MBS session is still not activated.

In step 2 in FIG. 13, the method in the embodiment in FIG. 6 may be used, a PDU session is established, steps X.2, X.3, X.4, and X.5 in the embodiment in FIG. 10 are performed, and the UE-PCF has been subscribed to the MB-UDR.

Delay wavy lines between step 2 and step 3 in FIG. 13 are used for representing that a procedure before step 2 and step 3 and all procedures following step 3 are not performed together immediately. That is, step 3 is performed some time after step 2 has been performed, that is, the steps are asynchronous.

In step 3 in FIG. 13, at this time, the 5G network activates an MBS session such as an MBS multicast/broadcast session corresponding to an MBS multicast/broadcast session ID, one or more QoS flows corresponding to the activated MBS session are established, an MB-UPF is selected for the MBS session, and MB-UPF ID is determined.

In step 4 in FIG. 13, after the MBS session is activated and the MB-UPF is selected for the MBS session, the MB-PCF transmits an Nudr_DM_Update request (data management update request) message to the MB-UDR, the Nudr_DM_Update request message carrying a data set identity indicating policy data, a data subset identity indicating MBS session policy data, a data key indicating an MBS session ID, and a data subkey indicating S-NSSAI and a DNN. The MBS session policy data may include the policy rule list, the MB-PCF ID, and the MB-UPF transport information (the transport layer IP multicast address and a common TED (C-TEID).

In step 5 in FIG. 13, after receiving the Nudr_DM_Update request message, the MB-UDR returns an Nudr_DM_Update response message, that is, a data management update response message, to the MB-PCF.

In step 6 in FIG. 13, after the MB-UDR discovers that the UE-PCF has subscribed to the policy data of the MBS session ID, the S-NSSAI, and the DNN identity, the MB-UDR activates a notification procedure, and transmits an Nudr_DM_Notify message (a data management notification message) to the UE-PCF according to the UE-PCF ID and Notification Correlation ID subscribed be forehand, the Nudr_DM_Notify message carrying the data set identity indicating policy data, the data key indicating an MBS session ID, the data subkey indicating S-NSSAI and a DNN, an Notification Correlation ID (notification association identity), and MB-UPF transport information (the transport layer IP multicast address and a C-TEID (common TED).

After the UE-PCF receives the Nudr_DM_Notify message, the UE-PCF may perform step X.6 in the embodiment in FIG. 12 to asynchronously acquire MBS session policy information.

In step 6 in FIG. 13, a plurality of UE-PCFs may subscribe to the MB-UDR. In this step, the MB-UDR respectively transmits an Nudr_DM_Notify message to these different subscribing UE-PCFs. For different UE-PCFs, different PDU session modification procedures corresponding to the UE-PCFs are performed. The Notification Correlation ID is used for the UE-PCF to learn UE of which a PDU session corresponds to the Nudr_DM_Notify message.

Further, the embodiments of the present disclosure further provide a method for implementing multicast broadcast service handover, applied to a PCF corresponding to user equipment, a source base station to which the user equipment is connected before handover supporting an MBS, the user equipment having established an MBS session with the source base station before the handover, a target base station to which the user equipment is connected after the handover not supporting an MBS. The method includes: after the user equipment is handed over from the source base station to the target base station, transferring policy rule information corresponding to the activated MBS session to an SMF, one or more pieces of policy rule information being provided, so that the SMF establishes a quality of service flow corresponding to the activated MBS session on a PDU session associated with the MBS session according to the policy rule information corresponding to the activated MBS session, one or more quality of service flows being provided. S-NSSAI of the PDU session is the same as S-NSSAI of the MBS session, and a DNN of the PDU session is the same as a DNN of the MBS session.

In an exemplary embodiment, the PCF may include an MB-PCF. The user equipment has activated the MBS session at the source base station and has not established a PDU session associated with the MBS session before the handover. The transferring policy rule information corresponding to the activated MBS session to an SMF may include: in a procedure of establishing the PDU session on a side of the target base station after the handover, receiving, by the MB-PCF, a first session management policy control obtaining request message from the SMF, the first session management policy control obtaining request message carrying the MBS session identity and a data set identity indicating policy data; and generating, by the MB-PCF, a first session management policy control obtaining response message in response to the first session management policy control obtaining request message, and transmitting the first session management policy control obtaining response message to the SMF, the first session management policy control obtaining response message including the policy rule information corresponding to the activated MBS session.

In an exemplary embodiment, the PCF may include an MB-PCF. The user equipment has not activated the MBS session at the source base station and has not established a PDU session associated with the MBS session before the handover. Before the transferring policy rule information corresponding to the activated MBS session to an SMF, the method may further include: in a procedure of establishing the PDU session on a side of the target base station after the handover, receiving, by the MB-PCF, a second session management policy control obtaining request message from the SMF, the second session management policy control obtaining request message carrying the MBS session identity and a data set identity indicating policy data; and generating, by the MB-PCF, a second session management policy control obtaining response message in response to the second session management policy control obtaining request message, and transmitting the second session management policy control obtaining response message to the SMF, the second session management policy control obtaining response message not including the policy rule information corresponding to the activated MBS session, so that the SMF determines, according to the second session management policy control obtaining response message, that the MBS session has not been activated.

In an exemplary embodiment, the transferring policy rule information corresponding to the activated MBS session to an SMF may include: after the MBS session is activated, in a modification procedure of the PDU session by the MB-PCF, transmitting a first session management policy control update notification request message to the SMF, the first session management policy control update notification request message including the policy rule information corresponding to the activated MBS session; and receiving a first session management policy control update notification response message returned by the SMF in response to the first session management policy control update notification request message.

In an exemplary embodiment, the transferring policy rule information corresponding to the activated MBS session to an SMF may include: after the MBS session is activated, in a modification procedure of the PDU session by the MB-PCF, transmitting a first multicast broadcast session management policy control update notification request message to the SMF, the first multicast broadcast session management policy control update notification request message including the policy rule information corresponding to the activated MBS session; and receiving a first multicast broadcast session management policy control update notification response message returned by the SMF in response to the first multicast broadcast session management policy control update notification request message.

In an exemplary embodiment, before the user equipment triggers an establishment procedure of the PDU session, the method may further include: transmitting, by the MB-PCF, a third NF discovery request message to an NRF, the third NF discovery request message carrying the MBS session identity and a network type indicating an MBS UDM; receiving, by the MB-PCF, a third NF discovery request response message returned by the NRF in response to the third NF discovery request message, the third NF discovery request response message carrying an MB-UDM identity; transmitting, by the MB-PCF, an MBS session context register request message to an MB-UDM according to the MB-UDM identity, the MBS session context register request message carrying the MBS session identity and an MB-PCF identity, so that the MBS session identity and the MB-PCF identity are associated and stored in the MB-UDM; and receiving, by the MB-PCF, an MBS session context register response message returned by the MB-UDM in response to the MBS session context register request message.

In an exemplary embodiment, before the user equipment triggers an establishment procedure of the PDU session, the method further includes: transmitting, by the MB-PCF an NF management NF register request message to an NRF, the NF management NF register request message carrying the MBS session identity and an MB-PCF identity, so that the MBS session identity and the MB-PCF identity are associated and stored in the MB-UDM; and receiving, by the MB-PCF, an NF management NF register response message returned by the NRF in response to the NF management NF register request message, the NF management NF register response message carrying the MB-PCF identity of the MB-PCF.

In an exemplary embodiment, the PCF includes a UE-PCF. The user equipment has activated the MBS session at the source base station and has not established a PDU session associated with the MBS session before the handover. The transferring policy rule information corresponding to the activated MBS session to an SMF may include: in a procedure of establishing the PDU session on a side of the target base station after the handover, receiving, by the UE-PCF, a third session management policy control obtaining request message from the SMF, the third session management policy control obtaining request message carrying the MBS session identity and a data set identity indicating policy data; acquiring, by the UE-PCF, the policy rule information corresponding to the activated MBS session from an MB-UDR according to the MBS session identity and the data set identity indicating policy data; and returning, by the UE-PCF, a third session management policy control obtaining response message to the SMF in response to the third session management policy control obtaining request message, the third session management policy control obtaining response message carrying the policy rule information corresponding to the activated MBS session.

In an exemplary embodiment, the acquiring, by the UE-PCF, the policy rule information corresponding to the activated MBS session from an MB-UDR according to the MBS session identity and the data set identity indicating policy data may include: transmitting, by the UE-PCF, a data management query request message to the MB-UDR, the data management query request message carrying the data set identity indicating policy data, a data subset identity indicating an MBS session policy, a data key indicating the MBS session identity, and a data subkey indicating the S-NSSAI and the DNN; and receiving, by the UE-PCF, a data management query response message returned by the MB-UDR in response to the data management query request message, the data management query response message carrying the policy rule information corresponding to the activated MBS session.

In an exemplary embodiment, before the acquiring, by the UE-PCF, the policy rule information corresponding to the activated MBS session from an MB-UDR according to the MBS session identity and the data set identity indicating policy data, the method may further include: transmitting, by the UE-PCF, a fourth NF discovery request message to an NRF, the fourth NF discovery request message carrying the MBS session identity and an NF type indicating an MBS UDR; receiving, by the UE-PCF, a fourth NF discovery request response message returned by the NRF in response to the fourth NF discovery request message, the fourth NF discovery request response message carrying an MB-UDR identity of the MB-UDR; transmitting, by the UE-PCF, a data management subscribe request message to the MB-UDR according to the MB-UDR identity, the data management subscribe request message carrying the MBS session identity and a UE-PCF identity, so that the MB-UDR allows the UE-PCF to subscribe to the MB-UDR according to the MBS session identity and the UE-PCF identity; and receiving, by the UE-PCF, a data management subscribe response message returned by the MB-UDR in response to the data management subscribe request message.

In an exemplary embodiment, the PCF may include an MB-PCF. The method may further include: after the MBS session is activated, transmitting, by the MB-PCF, a data management update request message to the MB-UDR, the data management update request message carrying the data set identity indicating policy data, the data subset identity indicating the MBS session policy, data including a policy rule list corresponding to the MBS session identity and an MB-PCF identity, the data key indicating the MBS session identity, and the data subkey indicating the S-NSSAI and the DNN, so that the MB-UDR associates and stores the policy rule list corresponding to the MBS session identity and the MB-PCF identity in the MB-UDR; and receiving a data management update response message returned by the MB-UDR in response to the data management update request message.

In an exemplary embodiment, before the user equipment is handed over from the source base station to the target base station, the method may further include: transmitting, by the MB-PCF, a fifth NF discovery request message to an NRF, the fifth NF discovery request message including the MBS session identity and an NF type indicating an MBS UDR; receiving, by the MB-PCF, a fifth NF discovery request response message returned by the NRF in response to the fifth NF discovery request message, the fifth NF discovery request response message including an MB-UDR identity; and transmitting a data management create request message to the MB-UDR according to the MB-UDR identity, the data management create request message carrying the MBS session identity and the MB-PCF identity, so that the MB-PCF subscribes to the MB-UDR.

In an exemplary embodiment, the PCF includes a UE-PCF. The user equipment has not activated the MBS session at the source base station and has not established a PDU session associated with the MBS session before the handover. Before the transferring policy rule information corresponding to the activated MBS session to an SMF, the method may further include: in a procedure of establishing the PDU session on a side of the target base station after the handover, receiving, by the UE-PCF, a fourth session management policy control obtaining request message from the SMF, the fourth session management policy control obtaining request message carrying the MBS session identity and a data set identity indicating policy data; transmitting, by the UE-PCF, a fourth session management policy control obtaining response message to the SMF in response to the fourth session management policy control obtaining request message, the fourth session management policy control obtaining response message not carrying the policy rule information corresponding to the activated MBS session, so that the SMF determines, according to the fourth session management policy control obtaining response message, that the MBS session has not been activated.

In an exemplary embodiment, the transferring policy rule information corresponding to the activated MBS session to an SMF may include: after the MBS session is activated, in a modification procedure of the PDU session, obtaining, by the UE-PCF, the policy rule information corresponding to the activated MBS session from an MB-UDR; transmitting, by the UE-PCF, a second session management policy control update notification request message to the SMF, the second session management policy control update notification request message including the policy rule information corresponding to the activated MBS session; and receiving, by the UE-PCF, a second session management policy control update notification response message returned by the SMF in response to the second session management policy control update notification request message.

In an exemplary embodiment, the transferring policy rule information corresponding to the activated MBS session to an SMF may include: after the MBS session is activated, in a modification procedure of the PDU session, obtaining, by the UE-PCF, the policy rule information corresponding to the activated MBS session from an MB-UDR; transmitting, by the UE-PCF, a second multicast broadcast session management policy control update notification request message to the SMF, the second multicast broadcast session management policy control update notification request message including the policy rule information corresponding to the activated MBS session; and receiving, by the UE-PCF, a second multicast broadcast session management policy control update notification response message returned by the SMF in response to the second multicast broadcast session management policy control update notification request message.

Figure 14:
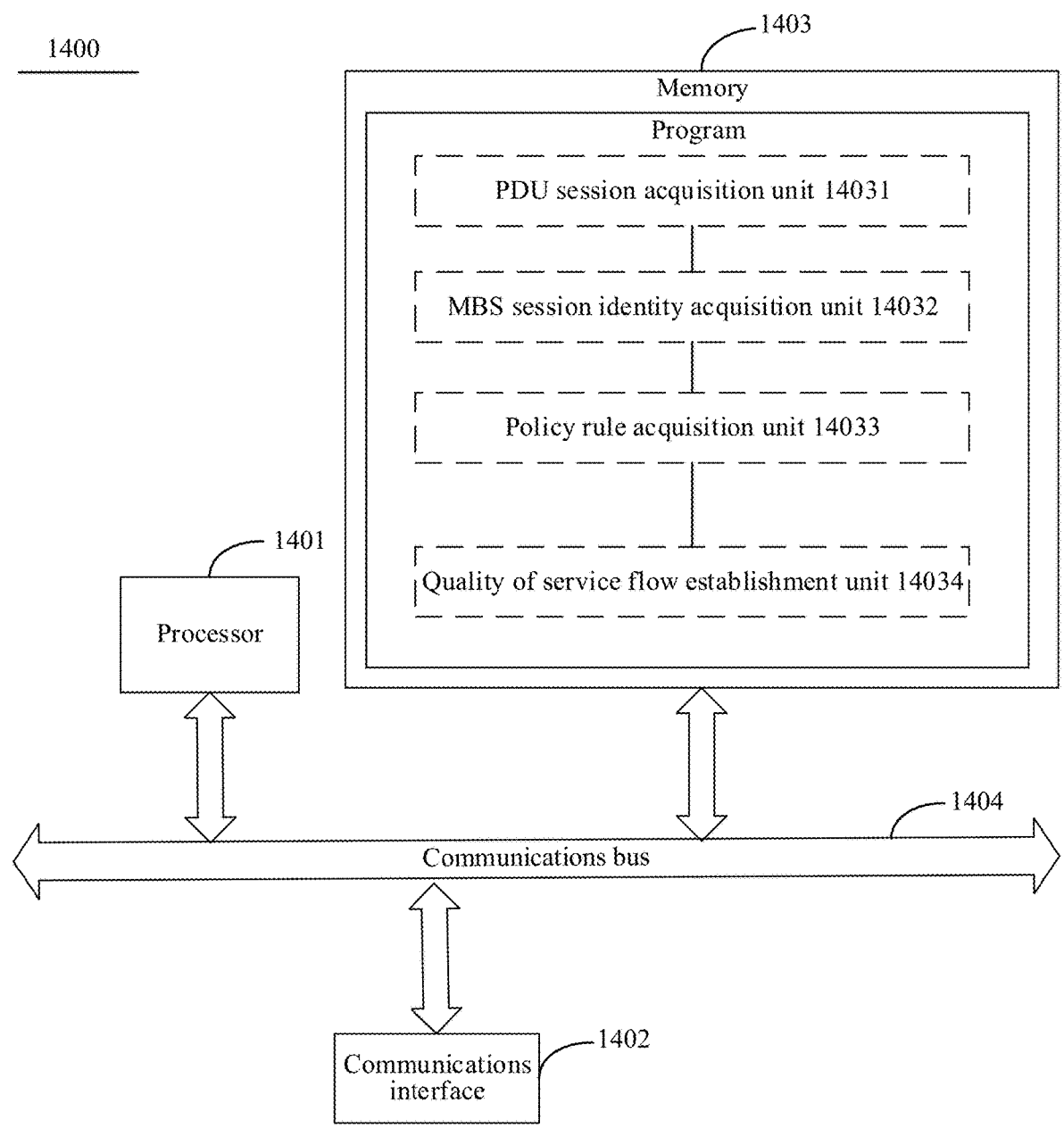
FIG. 14 is a schematic block diagram of a session management function device according to certain embodiment(s) of the present disclosure.

FIG. 14 is a block diagram of a session management function device according to an embodiment of the present disclosure. As shown in FIG. 14, the session management function device 1400 corresponding to user equipment provided in the embodiments of the present disclosure may include: one or more processors 1401; and a memory 1403, configured to store one or more programs, the one or more programs, when executed by the one or more processors 1401, causing the one or more processors 1401 to implement the method in any embodiment. A source base station to which the user equipment is connected before handover supports an MBS. The user equipment has established an MBS session with the source base station before the handover. A target base station to which the user equipment is connected after the handover does not support an MBS.

The program may be further configured to: acquiring a PDU session associated with the MBS session, S-NSSAI of the PDU session being the same as S-NSSAI of the MBS session, a DNN of the PDU session being the same as a DNN of the MBS session; acquiring an MBS session identity of the MBS session; acquiring policy rule information corresponding to the activated MBS session from a PCF according to the MBS session identity, the policy rule information corresponding to the activated MBS session including one or more pieces of policy rule information; and establishing a quality of service flow corresponding to the activated MBS session on the PDU session according to the policy rule information corresponding to the activated MBS session, one or more quality of service flows being provided.

Referring to FIG. 14, the program may further include: a PDU session acquisition unit 14031, which may be configured to acquire a PDU session associated with the MBS session, S-NSSAI of the PDU session being the same as S-NSSAI of the MBS session, a DNN of the PDU session being the same as a DNN of the MBS session; an MBS session identity acquisition unit 14032, which may be configured to acquire an MBS session identity of the MBS session; a policy rule acquisition unit 14033, which may be configured to acquire policy rule information corresponding to the activated MBS session from a PCF according to the MBS session identity, one or more pieces of policy rule information being provided; and a quality of service flow establishment unit 14034, which may be configured to establish a quality of service flow corresponding to the activated MBS session on the PDU session according to the policy rule information corresponding to the activated MBS session, one or more quality of service flows being provided.

In an exemplary embodiment, the PCF includes an MB-PCF. The user equipment has activated the MBS session at the source base station and has not established a PDU session associated with the MBS session before the handover. The policy rule acquisition unit 14033 may be configured to: in a procedure of establishing the PDU session on a side of the target base station after the handover, transmit a first session management policy control obtaining request message to the MB-PCF, the first session management policy control obtaining request message carrying the MBS session identity and a data set identity indicating policy data; and receive a first session management policy control obtaining response message returned by the MB-PCF in response to the first session management policy control obtaining request message, the first session management policy control obtaining response message including the policy rule information corresponding to the activated MBS session.

In an exemplary embodiment, the first session management policy control obtaining request message includes a first session management policy control create request message, and the first session management policy control obtaining response message includes a first session management policy control create response message; or the first session management policy control obtaining request message includes a first session management policy control get request message, and the first session management policy control obtaining response message includes a first session management policy control get response message; or the first session management policy control obtaining request message includes a first multicast broadcast session management policy control get request message, and the first session management policy control obtaining response message includes a first multicast broadcast session management policy control get response message.

In an exemplary embodiment, the PCF may include an MB-PCF. The user equipment has not activated the MBS session at the source base station and has not established a PDU session associated with the MBS session before the handover. The program may further include: a second session management policy control obtaining request message transmission unit, which may be configured to: before the policy rule information corresponding to the activated MBS session is acquired from the PCF according to the MBS session identity, in a procedure of establishing the PDU session on a side of the target base station after the handover, transmit a second session management policy control obtaining request message to the MB-PCF, the second session management policy control obtaining request message carrying the MBS session identity and a data set identity indicating policy data; a second session management policy control obtaining response message receiving unit, which may be configured to receive a second session management policy control obtaining response message returned by the MB-PCF in response to the second session management policy control obtaining request message, the second session management policy control obtaining response message not including the policy rule information corresponding to the activated MBS session; and an MBS session inactivation determining unit, which may be configured to determine, according to the second session management policy control obtaining response message, that the MBS session has not been activated.

In an exemplary embodiment, the second session management policy control obtaining request message includes a second session management policy control create request message, and the second session management policy control obtaining response message includes a second session management policy control create response message; or the second session management policy control obtaining request message includes a second session management policy control get request message, and the second session management policy control obtaining response message includes a second session management policy control get response message; or the second session management policy control obtaining request message includes a second multicast broadcast session management policy control get request message, and the second session management policy control obtaining response message includes a second multicast broadcast session management policy control get response message.

In an exemplary embodiment, the policy rule acquisition unit 14033 may be configured to: after the MBS session is activated, trigger a modification procedure of the PDU session; in the modification procedure of the PDU session, receive a first session management policy control update notification request message from the MB-PCF, the first session management policy control update notification request message including the policy rule information corresponding to the activated MBS session; and return a first session management policy control update notification response message to the MB-PCF in response to the first session management policy control update notification request message.

In an exemplary embodiment, the acquiring policy rule information corresponding to the activated MBS session from a PCF according to the MBS session identity includes: after the MBS session is activated, triggering a modification procedure of the PDU session; in the modification procedure of the PDU session, receiving a first multicast broadcast session management policy control update notification request message from the MB-PCF, the first multicast broadcast session management policy control update notification request message including the policy rule information corresponding to the activated MBS session; and returning a first multicast broadcast session management policy control update notification response message to the MB-PCF in response to the first multicast broadcast session management policy control update notification request message.

In an exemplary embodiment, the program may further include: a first NF discovery request message transmission unit, which may be configured to: before the policy rule information corresponding to the activated MBS session is acquired from the PCF according to the MBS session identity, transmit a first NF discovery request message to an NRF, the first NF discovery request message carrying the MBS session identity and a network type indicating an MBS UDM; a first NF discovery request response message receiving unit, which may be configured to receive a first NF discovery request response message returned by the NRF in response to the first NF discovery request message, the first NF discovery request response message carrying an MB-UDM identity; an MBS session context get request message transmission unit, which may be configured to transmit an MBS session context get request message to an MB-UDM according to the MB-UDM identity, the MBS session context get request message carrying the MBS session identity; and an MBS session context get response message receiving unit, which may be configured to receive an MBS session context get response message returned by the MB-UDM in response to the MBS session context get request message, the MBS session context get response message carrying an MB-PCF identity of the MB-PCF.

In an exemplary embodiment, the program may further include: a second NF discovery request message transmission unit, which may be configured to: before the policy rule information corresponding to the activated MBS session is acquired from the PCF according to the MBS session identity, transmit a second NF discovery request message to an NRF, the second NF discovery request message carrying the MBS session identity and a network type indicating an MBS PCF; a second NF discovery request response message receiving unit, which may be configured to receive a second NF discovery request response message returned by the NRF in response to the second NF discovery request message, the second NF discovery request response message carrying an MB-PCF identity of the MB-PCF.

In an exemplary embodiment, the PCF may include a UE-PCF. The user equipment has activated the MBS session at the source base station and has not established a PDU session associated with the MBS session before the handover. The policy rule acquisition unit 14033 may be configured to: in a procedure of establishing the PDU session on a side of the target base station after the handover, transmit a third session management policy control obtaining request message to the UE-PCF, the third session management policy control obtaining request message carrying the MBS session identity and a data set identity indicating policy data, so that the UE-PCF acquires the policy rule information corresponding to the activated MBS session from an MB-UDR according to the MBS session identity and the data set identity indicating policy data; and receive a third session management policy control obtaining response message returned by the UE-PCF in response to the third session management policy control obtaining request message, the third session management policy control obtaining response message carrying the policy rule information corresponding to the activated MBS session.

In an exemplary embodiment, the third session management policy control obtaining request message includes a third session management policy control create request message, and the third session management policy control obtaining response message includes a third session management policy control create response message; or the third session management policy control obtaining request message includes a third session management policy control get request message, and the third session management policy control obtaining response message includes a third session management policy control get response message; or the third session management policy control obtaining request message includes a third multicast broadcast session management policy control get request message, and the third session management policy control obtaining response message includes a third multicast broadcast session management policy control get response message.

In an exemplary embodiment, the PCF may include a UE-PCF. The user equipment has not activated the MBS session at the source base station and has not established a PDU session associated with the MBS session before the handover. The program may further include: a fourth session management policy control obtaining request message transmission unit, which may be configured to: before the policy rule information corresponding to the activated MBS session is acquired from the PCF according to the MBS session identity, in a procedure of establishing the PDU session on a side of the target base station after the handover, transmit a fourth session management policy control obtaining request message to the UE-PCF, the fourth session management policy control obtaining request message carrying the MBS session identity and a data set identity indicating policy data; a fourth session management policy control obtaining response message receiving unit, which may be configured to receive a fourth session management policy control obtaining response message returned by the UE-PCF in response to the fourth session management policy control obtaining request message, the fourth session management policy control obtaining response message not carrying the policy rule information corresponding to the activated MBS session; and an MBS session inactivated determining unit, which may be configured to determine, according to the fourth session management policy control obtaining response message, that the MBS session has not been activated.

In an exemplary embodiment, the fourth session management policy control obtaining request message includes include a fourth session management policy control create request message, and the fourth session management policy control obtaining response message includes include a fourth session management policy control create response message; or the fourth session management policy control obtaining request message includes include a fourth session management policy control get request message, and the fourth session management policy control obtaining response message includes include a fourth session management policy control get response message; or the fourth session management policy control obtaining request message includes include a fourth multicast broadcast session management policy control get request message, and the fourth session management policy control obtaining response message includes include a fourth multicast broadcast session management policy control get response message.

In an exemplary embodiment, the policy rule acquisition unit 14033 may be configured to: after the MBS session is activated, trigger a modification procedure of the PDU session; in the modification procedure of the PDU session, receive a second session management policy control update notification request message from the UE-PCF, the second session management policy control update notification request message including the policy rule information corresponding to the activated MBS session, the policy rule information corresponding to the activated MBS session being obtained by the UE-PCF from an MB-UDR; and return a second session management policy control update notification response message to the UE-PCF in response to the second session management policy control update notification request message.

In an exemplary embodiment, the policy rule acquisition unit 14033 may be configured to: after the MBS session is activated, trigger a modification procedure of the PDU session; in the modification procedure of the PDU session, receive a second multicast broadcast session management policy control update notification request message from the UE-PCF, the second multicast broadcast session management policy control update notification request message including the policy rule information corresponding to the activated MBS session, the policy rule information corresponding to the activated MBS session being obtained by the UE-PCF from an MB-UDR; and return a second multicast broadcast session management policy control update notification response message to the UE-PCF in response to the second multicast broadcast session management policy control update notification request message.

For specific implementation of the session management function device provided in the embodiments of the present disclosure, reference may be made to the content of the method for implementing multicast broadcast service handover. Details are not described again.

FIG. 15 is a block diagram of a policy control function device according to an embodiment of the present disclosure. As shown in FIG. 15, the policy control function device 1500 corresponding to user equipment provided in the embodiments of the present disclosure may include: one or more processors 1501; and a memory 1503, configured to store one or more programs, the one or more programs, when executed by the one or more processors 1501, causing the one or more processors 1501 to implement the method in any embodiment. A source base station to which the user equipment is connected before handover supports an MBS. The user equipment has established an MBS session with the source base station before the handover. A target base station to which the user equipment is connected after the handover does not support an MBS.

The program may be further configured to: after the user equipment is handed over from the source base station to the target base station, transfer policy rule information corresponding to the activated MBS session to an SMF, one or more pieces of policy rule information being provided, so that the SMF establishes a quality of service flow corresponding to the activated MBS session on a PDU session associated with the MBS session according to the policy rule information corresponding to the activated MBS session, one or more quality of service flows being provided, S-NSSAI of the PDU session being the same as S-NSSAI of the MBS session, and a DNN of the PDU session being the same as a DNN of the MBS session.

Referring to FIG. 15, the program may further include: a policy rule transfer unit 15031, which may be configured to: after the user equipment is handed over from the source base station to the target base station, transfer policy rule information corresponding to the activated MBS session to an SMF, one or more pieces of policy rule information being provided, so that the SMF establishes a quality of service flow corresponding to the activated MBS session on a PDU session associated with the MBS session according to the policy rule information corresponding to the activated MBS session, one or more quality of service flows being provided.

In an exemplary embodiment, the PCF may include an MB-PCF. The user equipment has activated the MBS session at the source base station and has not established a PDU session associated with the MBS session before the handover. The policy rule transfer unit 15031 may be configured to: in a procedure of establishing the PDU session on a side of the target base station after the handover, receive, by the MB-PCF, a first session management policy control obtaining request message from the SMF, the first session management policy control obtaining request message carrying the MBS session identity and a data set identity indicating policy data; and generate, by the MB-PCF, a first session management policy control obtaining response message in response to the first session management policy control obtaining request message, and transmit the first session management policy control obtaining response message to the SMF, the first session management policy control obtaining response message including the policy rule information corresponding to the activated MBS session.

In an exemplary embodiment, the PCF may include an MB-PCF. The user equipment has not activated the MBS session at the source base station and has not established a PDU session associated with the MBS session before the handover. The program may further include: a second session management policy control obtaining request message receiving unit, which may be configured to: before the policy rule information corresponding to the activated MBS session is transferred to the SMF, in a procedure of establishing the PDU session on a side of the target base station after the handover, receive, by the MB-PCF, a second session management policy control obtaining request message from the SMF, the second session management policy control obtaining request message carrying the MBS session identity and a data set identity indicating policy data; and a second session management policy control obtaining response message transmission unit, which may be configured to: generate, by the MB-PCF, a second session management policy control obtaining response message in response to the second session management policy control obtaining request message, and transmit the second session management policy control obtaining response message to the SMF, the second session management policy control obtaining response message not including the policy rule information corresponding to the activated MBS session, so that the SMF determines, according to the second session management policy control obtaining response message, that the MBS session has not been activated.

In an exemplary embodiment, the policy rule transfer unit 15031 may be configured to: after the MBS session is activated, in a modification procedure of the PDU session by the MB-PCF, transmit a first session management policy control update notification request message to the SMF, the first session management policy control update notification request message including the policy rule information corresponding to the activated MBS session; and receive a first session management policy control update notification response message returned by the SMF in response to the first session management policy control update notification request message.

In an exemplary embodiment, the policy rule transfer unit 15031 may be configured to: after the MBS session is activated, in a modification procedure of the PDU session by the MB-PCF, transmit a first multicast broadcast session management policy control update notification request message to the SMF, the first multicast broadcast session management policy control update notification request message including the policy rule information corresponding to the activated MBS session; and receive a first multicast broadcast session management policy control update notification response message returned by the SMF in response to the first multicast broadcast session management policy control update notification request message.

In an exemplary embodiment, the program may further include: a third NF discovery request message transmission unit, which may be configured to: before the user equipment triggers the establishment procedure of the PDU session, transmit, by the MB-PCF, a third NF discovery request message to an NRF, the third NF discovery request message carrying the MBS session identity and a network type indicating an MBS UDM; a third NF discovery request response message receiving unit, which may be configured to receive, by the MB-PCF, a third NF discovery request response message returned by the NRF in response to the third NF discovery request message, the third NF discovery request response message carrying an MB-UDM identity; an MBS session context register request message transmission unit, which may be configured to transmit, by the MB-PCF, an MBS session context register request message to an MB-UDM according to the MB-UDM identity, the MBS session context register request message carrying the MBS session identity and an MB-PCF identity, so that the MBS session identity and the MB-PCF identity are associated and stored in the MB-UDM; and an MBS session context register response message receiving unit, which may be configured to receive, by the MB-PCF, an MBS session context register response message returned by the MB-UDM in response to the MBS session context register request message.

In an exemplary embodiment, the program may further include: an NF management NF register request message transmission unit, which may be configured to: before the user equipment triggers the establishment procedure of the PDU session, transmit, by the MB-PCF an NF management NF register request message to an NRF, the NF management NF register request message carrying the MBS session identity and an MB-PCF identity, so that the MBS session identity and the MB-PCF identity are associated and stored in the MB-UDM; and an NF management NF register response message receiving unit, which may be configured to receive, by the MB-PCF, an NF management NF register response message returned by the NRF in response to the NF management NF register request message, the NF management NF register response message carrying the MB-PCF identity of the MB-PCF.

In an exemplary embodiment, the PCF may include a UE-PCF. The user equipment has activated the MBS session at the source base station and has not established a PDU session associated with the MBS session before the handover. The policy rule transfer unit 15031 may further include: a third session management policy control obtaining request message receiving unit, which may be configured to: in a procedure of establishing the PDU session on a side of the target base station after the handover, receive, by the UE-PCF, a third session management policy control obtaining request message from the SMF, the third session management policy control obtaining request message carrying the MBS session identity and a data set identity indicating policy data; a UE-PCF policy rule information acquisition unit, which may be configured to: acquire, by the UE-PCF, the policy rule information corresponding to the activated MBS session from an MB-UDR according to the MBS session identity and the data set identity indicating policy data; and return, by the UE-PCF, a third session management policy control obtaining response message to the SMF in response to the third session management policy control obtaining request message, the third session management policy control obtaining response message carrying the policy rule information corresponding to the activated MBS session.

In an exemplary embodiment, the UE-PCF policy rule information acquisition unit may be configured to: transmit, by the UE-PCF, a data management query request message to the MB-UDR, the data management query request message carrying the data set identity indicating policy data, a data subset identity indicating an MBS session policy, a data key indicating the MBS session identity, and a data subkey indicating the S-NSSAI and the DNN; and receive, by the UE-PCF, a data management query response message returned by the MB-UDR in response to the data management query request message, the data management query response message carrying the policy rule information corresponding to the activated MBS session.

In an exemplary embodiment, the program may further include: a fourth NF discovery request message transmission unit, which may be configured to: before the UE-PCF acquires the policy rule information corresponding to the activated MBS session from the MB-UDR according to the MBS session identity and the data set identity indicating policy data, transmit, by the UE-PCF, a fourth NF discovery request message to an NRF, the fourth NF discovery request message carrying the MBS session identity and an NF type indicating an MB-UDR; a fourth NF discovery request response message receiving unit, which may be configured to receive, by the UE-PCF, a fourth NF discovery request response message returned by the NRF in response to the fourth NF discovery request message, the fourth NF discovery request response message carrying an MB-UDR identity of the MB-UDR; a data management subscribe request message transmission unit, which may be configured to transmit, by the UE-PCF, a data management subscribe request message to the MB-UDR according to the MB-UDR identity, the data management subscribe request message carrying the MBS session identity and a UE-PCF identity, so that the MB-UDR allows the UE-PCF to subscribe to the MB-UDR according to the MBS session identity and the UE-PCF identity; and a data management subscribe response message receiving unit, which may be configured to receive, by the UE-PCF, a data management subscribe response message returned by the MB-UDR in response to the data management subscribe request message.

In an exemplary embodiment, the PCF may include an MB-PCF. The program may further include: a data management update request message transmission unit, which may be configured to: after the MBS session is activated, transmit, by the MB-PCF, a data management update request message to the MB-UDR, the data management update request message carrying the data set identity indicating policy data, the data subset identity indicating the MBS session policy, data including a policy rule list corresponding to the MBS session identity and an MB-PCF identity, the data key indicating the MBS session identity, and the data subkey indicating the S-NSSAI and the DNN, so that the MB-UDR associates and stores the policy rule list corresponding to the MBS session identity and the MB-PCF identity in the MB-UDR; and a data management update response message receiving unit, which may be configured to receive a data management update response message returned by the MB-UDR in response to the data management update request message.

In an exemplary embodiment, the program may further include: a fifth NF discovery request message transmission unit, which may be configured to: before the user equipment is handed over from the source base station to the target base station, transmit, by the MB-PCF, a fifth NF discovery request message to an NRF, the fifth NF discovery request message including the MBS session identity and an NF type indicating an MB-UDR; a fifth NF discovery request response message receiving unit, which may be configured to receive, by the MB-PCF, a fifth NF discovery request response message returned by the NRF in response to the fifth NF discovery request message, the fifth NF discovery request response message including an MB-UDR identity; and a data management create request message transmission unit, which may be configured to transmit a data management create request message to the MB-UDR according to the MB-UDR identity, the data management create request message carrying the MBS session identity and the MB-PCF identity, so that the MB-PCF subscribes to the MB-UDR.

In an exemplary embodiment, the PCF may include a UE-PCF. The user equipment has not activated the MBS session at the source base station and has not established a PDU session associated with the MBS session before the handover. The program may further include: a fourth session management policy control obtaining request message receiving unit, which may be configured to: before the policy rule information corresponding to the activated MBS session is transferred to the SMF, in a procedure of establishing the PDU session on a side of the target base station after the handover, receive, by the UE-PCF, a fourth session management policy control obtaining request message from the SMF, the fourth session management policy control obtaining request message carrying the MBS session identity and a data set identity indicating policy data; and a fourth session management policy control obtaining response message transmission unit, which may be configured to transmit, by the UE-PCF, a fourth session management policy control obtaining response message to the SMF in response to the fourth session management policy control obtaining request message, the fourth session management policy control obtaining response message not carrying the policy rule information corresponding to the activated MBS session, so that the SMF determines, according to the fourth session management policy control obtaining response message, that the MBS session has not been activated.

In an exemplary embodiment, the policy rule transfer unit 15031 may be configured to: after the MBS session is activated, in a modification procedure of the PDU session, obtain, by the UE-PCF, the policy rule information corresponding to the activated MBS session from an MB-UDR; transmit, by the UE-PCF, a second session management policy control update notification request message to the SMF, the second session management policy control update notification request message including the policy rule information corresponding to the activated MBS session; and receive, by the UE-PCF, a second session management policy control update notification response message returned by the SMF in response to the second session management policy control update notification request message.

In an exemplary embodiment, the policy rule transfer unit 15031 may be configured to: after the MBS session is activated, in a modification procedure of the PDU session, obtain, by the UE-PCF, the policy rule information corresponding to the activated MBS session from an MB-UDR; transmit, by the UE-PCF, a second multicast broadcast session management policy control update notification request message to the SMF, the second multicast broadcast session management policy control update notification request message including the policy rule information corresponding to the activated MBS session; and receive, by the UE-PCF, a second multicast broadcast session management policy control update notification response message returned by the SMF in response to the second multicast broadcast session management policy control update notification request message.

For specific implementation of the policy control function device provided in the embodiments of the present disclosure, reference may be made to the content of the method for implementing multicast broadcast service handover. Details are not described again.

FIG. 14 and FIG. 15 are respectively schematic structural diagrams of the session management function device 1400 and the policy control function device 1500 suitable for implementing the embodiments of the present disclosure. The structures shown in FIG. 14 and FIG. 15 are merely examples, and do not impose any limitation on a function and use scope of the embodiments of the present disclosure.

Referring to FIG. 14 and FIG. 15, each of the session management function device 1400 and the policy control function device 1500 provided in the embodiments of the present disclosure may further include a communications interface (1402, 1502) and a communications bus (1404, 1504).

Communication among the processor (1401, 1501), the communications interface (1402, 1502), and the memory (1403, 1503) is implemented through the communications bus (1404, 1504).

In certain embodiment(s), the communications interface (1402, 1502) may be an interface of a communication module, for example, an interface of a Global System for Mobile communications (GSM) module. The processor (1401, 1501) is configured to execute a program. The memory (1403, 1503) is configured to store the program. The program may include a computer program, and the computer program includes computer operating instructions.

The processor (1401, 1501) may be a Central Processing Unit (CPU) or an Application Specific Integrated Circuit (ASIC) or may be configured as one or more integrated circuits for implementing the embodiments of the present disclosure.

The memory (1403, 1503) may include a high-speed random access memory (RAM), and may also include a non-volatile memory, for example, at least one magnetic disk memory.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Particularly, according to the embodiments of the present disclosure, the processes described in the following by referring to the flowcharts may be implemented as computer software programs. For example, an embodiment of the present disclosure includes a computer program product, including a computer program carried on a computer-readable medium. The computer program includes program code for performing the method shown in the flowchart.

The computer-readable medium shown in the present disclosure may be a computer-readable signal medium, a computer-readable storage medium, or any combination thereof.

According to another aspect, the present disclosure further provides a computer-readable storage medium. The computer-readable storage medium may be included in the electronic device, or may exist alone and be not assembled in the electronic device. The computer-readable storage medium carries one or more programs, the one or more programs, when executed by the electronic device, causing the electronic device to implement the method described in the embodiments.

What is claimed is:

1. A method for implementing multicast broadcast service handover, applied to a session management function (SMF) corresponding to user equipment, a source base station to which the user equipment is connected before handover supporting a multicast broadcast service (MBS), the user equipment having established an MBS session with the source base station before the handover, a target base station to which the user equipment is connected after the handover not supporting an MBS, the method comprising:

acquiring a protocol data unit (PDU) session associated with the MBS session, single network slice selection assistance information (S-NSSAI) of the PDU session being the same as S-NSSAI of the MBS session, a data network name (DNN) of the PDU session being the same as a DNN of the MBS session;

acquiring an MBS session identity of the MBS session;

after the MBS session is activated, acquiring policy rule information corresponding to the activated MBS session from a policy control function (PCF) according to the MBS session identity; and establishing a quality of service flow corresponding to the activated MBS session on the PDU session according to the policy rule information corresponding to the activated MBS session, wherein acquiring the policy rule information corresponding to the activated MBS session from the PCF according to the MBS session identity comprises: in a case that the user equipment has activated the MBS session on the source base station and has not activated the PDU session associated with the MBS session before the handover, in a procedure of establishing the PDU session on a side of the target base station after the handover, transmitting a session management policy control obtaining request message to the PCF, the session management policy control obtaining request message carrying the MBS session identity and a data set identity indicating policy data; and receiving a session management policy control obtaining response message returned by the PCF in response to the session management policy control obtaining request message, the session management policy control obtaining response message including the policy rule information corresponding to the activated MBS session.

2. The method according to claim 1, wherein the PCF includes a multicast broadcast-policy control function (MB-PCF), the session management policy control obtaining request message includes a first session management policy control obtaining request message transmitted to the MB-PCF, and the session management policy control obtaining response message includes a first session management policy control obtaining response message returned by the MB-PCF in response to the first session management policy control obtaining request message.

3. The method according to claim 2, wherein the first session management policy control obtaining request message includes a first session management policy control create request message, and the first session management policy control obtaining response message includes a first session management policy control create response message; or the first session management policy control obtaining request message includes a first session management policy control get request message, and the first session management policy control obtaining response message includes a first session management policy control get response message; or the first session management policy control obtaining request message includes a first multicast broadcast session management policy control get request message, and the first session management policy control obtaining response message includes a first multicast broadcast session management policy control get response message.

4. The method according to claim 1, wherein the PCF includes an MB-PCF, and in a case that the user equipment has not activated the MBS session on the source base station and has not activated the PDU session associated with the MBS session before the handover, the method further comprises:

in the procedure of establishing the PDU session on the side of the target base station after the handover, transmitting a second session management policy control obtaining request message to the MB-PCF, the second session management policy control obtaining request message carrying the MBS session identity and a data set identity indicating policy data;

receiving a second session management policy control obtaining response message returned by the MB-PCF in response to the second session management policy control obtaining request message, the second session management policy control obtaining response message not including the policy rule information corresponding to the activated MBS session; and determining, according to the second session management policy control obtaining response message, that the MBS session has not been activated.

5. The method according to claim 4, wherein the second session management policy control obtaining request message includes a second session management policy control create request message, and the second session management policy control obtaining response message includes a second session management policy control create response message; or the second session management policy control obtaining request message includes a second session management policy control get request message, and the second session management policy control obtaining response message includes a second session management policy control get response message; or the second session management policy control obtaining request message includes a second multicast broadcast session management policy control get request message, and the second session management policy control obtaining response message includes a second multicast broadcast session management policy control get response message.

6. The method according to claim 4, wherein acquiring the policy rule information comprises:

triggering a modification procedure of the PDU session;

in the modification procedure of the PDU session, receiving a first session management policy control update notification request message from the MB-PCF, the first session management policy control update notification request message including the policy rule information corresponding to the activated MBS session; and returning a first session management policy control update notification response message to the MB-PCF in response to the first session management policy control update notification request message.

7. The method according to claim 4, wherein acquiring the policy rule information comprises:

triggering a modification procedure of the PDU session;

in the modification procedure of the PDU session, receiving a first multicast broadcast session management policy control update notification request message from the MB-PCF, the first multicast broadcast session management policy control update notification request message including the policy rule information corresponding to the activated MBS session; and returning a first multicast broadcast session management policy control update notification response message to the MB-PCF in response to the first multicast broadcast session management policy control update notification request message.

8. The method according to claim 2, further comprising:
transmitting a first network function (NF) discovery request message to a network repository function (NRF), the first NF discovery request message carrying the MBS session identity and a network type indicating an MBS UDM;

receiving a first NF discovery request response message returned by the NRF in response to the first NF discovery request message, the first NF discovery request response message carrying an MB-UDM identity;

transmitting an MBS session context get request message to an MB-UDM according to the MB-UDM identity, the MBS session context get request message carrying the MBS session identity; and receiving an MBS session context get response message returned by the MB-UDM in response to the MBS session context get request message, the MBS session context get response message carrying an MB-PCF identity of the MB-PCF.

9. The method according to claim 2, further comprising:
transmitting a second NF discovery request message to an NRF, the second NF discovery request message carrying the MBS session identity and a network type indicating an MBS PCF; and receiving a second NF discovery request response message returned by the NRF in response to the second NF discovery request message, the second NF discovery request response message carrying an MB-PCF identity of the MB-PCF.

10. The method according to claim 1, wherein the PCF includes a UE-PCF, the session management policy control obtaining request message includes a third session management policy control obtaining request message transmitted to the UE-PCF, that the UE-PCF acquires the policy rule information corresponding to the activated MBS session from an MB-UDR according to the MBS session identity and the data set identity indicating policy data; and the session management policy control obtaining response message includes a third session management policy control obtaining response message returned by the UE-PCF in response to the third session management policy control obtaining request message.

11. The method according to claim 10, wherein the third session management policy control obtaining request message includes a third session management policy control create request message, and the third session management policy control obtaining response message includes a third session management policy control create response message; or the third session management policy control obtaining request message includes a third session management policy control get request message, and the third session management policy control obtaining response message includes a third session management policy control get response message; or the third session management policy control obtaining request message includes a third multicast broadcast session management policy control get request message, and the third session management policy control obtaining response message includes a third multicast broadcast session management policy control get response message.

12. The method according to claim 1, wherein the PCF includes a user equipment (UE)-PCF, and in a case that the user equipment has not activated the MBS session on the source base station and has not activated the PDU session associated with the MBS session before the handover, the method further comprises:

in the procedure of establishing the PDU session on the side of the target base station after the handover, transmitting a fourth session management policy control obtaining request message to the UE-PCF, the fourth session management policy control obtaining request message carrying the MBS session identity and a data set identity indicating policy data;

receiving a fourth session management policy control obtaining response message returned by the UE-PCF in response to the fourth session management policy control obtaining request message, the fourth session management policy control obtaining response message not carrying the policy rule information corresponding to the activated MBS session; and determining, according to the fourth session management policy control obtaining response message, that the MBS session has not been activated.

13. The method according to claim 12, wherein acquiring the policy rule information comprises:

after the MBS session is activated, triggering a modification procedure of the PDU session;

in the modification procedure of the PDU session, receiving a second session management policy control update notification request message from the UE-PCF, the second session management policy control update notification request message including the policy rule information corresponding to the activated MBS session, the policy rule information corresponding to the activated MBS session being obtained by the UE-PCF from an MB-UDR; and returning a second session management policy control update notification response message to the UE-PCF in response to the second session management policy control update notification request message.

14. The method according to claim 12, wherein acquiring the policy rule information comprises:

after the MBS session is activated, triggering a modification procedure of the PDU session;

in the modification procedure of the PDU session, receiving a second multicast broadcast session management policy control update notification request message from the UE-PCF, the second multicast broadcast session management policy control update notification request message including the policy rule information corresponding to the activated MBS session, the policy rule information corresponding to the activated MBS session being obtained by the UE-PCF from an MB-unified data repository (UDR); and returning a second multicast broadcast session management policy control update notification response message to the UE-PCF in response to the second multicast broadcast session management policy control update notification request message.

15. A session management function device, comprising: one or more processors; and a storage apparatus configured to store one or or programs, the one or more programs, when executed by the one or more processors, causing the one or more processors to perform a multicast broadcast service (MBS) handover, applied to a session management function (SMF) corresponding to user equipment, a source base station to which the user equipment is connected before handover supporting an MBS, the user equipment having established an MBS session with the source base station before the handover, a target base station to which the user equipment is connected after the handover not supporting an MBS, the one or more processors being configured to perform:
- acquiring a protocol data unit (PDU) session associated with the MBS session, single network slice selection assistance information (S-NSSAI) of the PDU session being the same as S-NSSAI of the MBS session, a data network name (DNN) of the PDU session being the same as a DNN of the MBS session;
- acquiring an MBS session identity of the MBS session;
- after the MBS session is activated, acquiring policy rule information corresponding to the activated MBS session from a policy control function (PCF) according to the MBS session identity;
- establishing a quality of service flow corresponding to the activated MBS session on the PDU session according to the policy rule information corresponding to the activated MBS session, one or more quality of service flows being provided,
- wherein acquiring the policy rule information corresponding to the activated MBS session from the PCF according to the MBS session identity comprises: in a case that the user equipment has activated the MBS session on the source base station and has not activated the PDU session associated with the MBS session before the handover,
  - in a procedure of establishing the PDU session on a side of the target base station after the handover, transmitting a session management policy control obtaining request message to the PCF, the session management policy control obtaining request message carrying the MBS session identity and a data set identity indicating policy data; and
  - receiving a session management policy control obtaining response message returned by the PCF in response to the session management policy control obtaining request message, the session management policy control obtaining response message including the policy rule information corresponding to the activated MBS session.

16. The device according to claim 15, wherein the PCF includes a multicast broadcast-policy control function (MB-PCF),
- the session management policy control obtaining request message includes a first session management policy control obtaining request message transmitted to the MB-PCF, and
- the session management policy control obtaining response message includes a first session management policy control obtaining response message returned by the MB-PCF in response to the first session management policy control obtaining request message.

17. The device according to claim 16, wherein the first session management policy control obtaining request message includes a first session management policy control create request message, and the first session management policy control obtaining response message includes a first session management policy control create response message; or the first session management policy control obtaining request message includes a first session management policy control get request message, and the first session management policy control obtaining response message includes a first session management policy control get response message; or the first session management policy control obtaining request message includes a first multicast broadcast session management policy control get request message, and the first session management policy control obtaining response message includes a first multicast broadcast session management policy control get response message.

18. The device according to claim 15, wherein the PCF includes an MB-PCF, and in a case that the user equipment has not activated the MBS session on the source base station and has not activated the PDU session associated with the MBS session before the handover, the one or more processors are further configured to perform:
- in the procedure of establishing the PDU session on the side of the target base station after the handover, transmitting a second session management policy control obtaining request message to the MB-PCF, the second session management policy control obtaining request message carrying the MBS session identity and a data set identity indicating policy data;
- receiving a second session management policy control obtaining response message returned by the MB-PCF in response to the second session management policy control obtaining request message, the second session management policy control obtaining response message not including the policy rule information corresponding to the activated MBS session; and
- determining, according to the second session management policy control obtaining response message, that the MBS session has not been activated.

19. The device according to claim 18, wherein the second session management policy control obtaining request message includes a second session management policy control create request message, and the second session management policy control obtaining response message includes a second session management policy control create response message; or the second session management policy control obtaining request message includes a second session management policy control get request message, and the second session management policy control obtaining response message includes a second session management policy control get response message; or the second session management policy control obtaining request message includes a second multicast broadcast session management policy control get request message, and the second session management policy control obtaining response message includes a second multicast broadcast session management policy control get response message.

20. A non-transitory computer-readable storage medium storing computer program instructions executable by at least one processor to perform a multicast broadcast service (MBS) handover, applied to a session management function (SMF) corresponding to user equipment, a source base station to which the user equipment is connected before handover supporting an MBS, the user equipment having established an MBS session with the source base station before the handover, a target base station to which the user equipment is connected after the handover not supporting an MBS, the computer program instructions causing the at least one processor to implement:
- acquiring a protocol data unit (PDU) session associated with the MBS session, single network slice selection assistance information (S-NSSAI) of the PDU session being the same as S-NSSAI of the MBS session, a data network name (DNN) of the PDU session being the same as a DNN of the MBS session;

acquiring an MBS session identity of the MBS session;

after the MBS session is activated, acquiring policy rule information corresponding to the activated MBS session from a policy control function (PCF) according to the MBS session identity; and establishing a quality of service flow corresponding to the activated MBS session on the PDU session according to the policy rule information corresponding to the activated MBS session, wherein acquiring the policy rule information corresponding to the activated MBS session from the PCF according to the MBS session identity comprises: in a case that the user equipment has activated the MBS session on the source base station and has not activated the PDU session associated with the MBS session before the handover, in a procedure of establishing the PDU session on a side of the target base station after the handover, transmitting a session management policy control obtaining request message to the PCF, the session management policy control obtaining request message carrying the MBS session identity and a data set identity indicating policy data; and receiving a session management policy control obtaining response message returned by the PCF in response to the session management policy control obtaining request message, the session management policy control obtaining response message including the policy rule information corresponding to the activated MBS session.

* * * * *